(12) United States Patent
Byun et al.

(10) Patent No.: US 12,554,341 B2
(45) Date of Patent: Feb. 17, 2026

(54) FERRITE CORE AND STYLUS PEN INCLUDING THE SAME

(71) Applicant: HiDeep Inc., Seongnam-si (KR)

(72) Inventors: Mun Sub Byun, Seongnam-si (KR); Kiung Kim, Seongnam-si (KR); Seyeob Kim, Seongnam-si (KR); Chongkuk Paek, Seongnam-si (KR); Kiryoung Jung, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/770,812

(22) Filed: Jul. 12, 2024

(65) Prior Publication Data

US 2025/0021174 A1 Jan. 16, 2025

(30) Foreign Application Priority Data

Jul. 13, 2023 (KR) .......................... 10-2023-0091400
Jul. 31, 2023 (KR) .......................... 10-2023-0099565
Jun. 19, 2024 (KR) .......................... 10-2024-0079437

(51) Int. Cl.
*G06F 3/0354* (2013.01)

(52) U.S. Cl.
CPC ................................. *G06F 3/03545* (2013.01)

(58) Field of Classification Search
CPC ... G06F 3/03545; G06F 3/04162; G06F 3/046
See application file for complete search history.

(56) References Cited

U.S. PATENT DOCUMENTS

| 2002/0070927 | A1 | 6/2002 | Fujitsuka et al. |
| 2014/0152627 | A1 | 6/2014 | Wong et al. |
| 2016/0162049 | A1* | 6/2016 | Horie .................. G06F 3/03545 29/605 |

FOREIGN PATENT DOCUMENTS

| CN | 101876858 B | 8/2012 |
| KR | 100915344 B1 | 9/2009 |
| KR | 10-2013-0116203 A | 10/2013 |
| KR | 10-2016-0011177 A | 1/2016 |
| KR | 10-2018-0021781 A | 3/2018 |

(Continued)

OTHER PUBLICATIONS

European Search Report 24188359.4, Issued on Nov. 13, 2024.
Office Action issued for counterpart Korean Application No. 10-2024-0079437 and English Translation. Issued May 15, 2025.

*Primary Examiner* — Jonathan A Boyd
(74) *Attorney, Agent, or Firm* — The Belles Group, P.C.

(57) ABSTRACT

A stylus pen may be optimized to a housing having a specific shape and may improve a magnitude of a pen signal. A ferrite core is mounted in a stylus pen and has a through-hole formed along a longitudinal direction of the stylus pen. The ferrite core has a first cross-sectional shape in a first vertical direction perpendicular to the longitudinal direction and a second cross-sectional shape in a second vertical direction perpendicular to both the longitudinal direction and the first vertical direction, the first cross-sectional shape is different from the second cross-sectional shape, the ferrite core includes a curved portion disposed at one end of the ferrite core, and the curved portion includes at least two curved surfaces that are curved from one side surface of one end of the ferrite core to a portion adjacent to the through-hole of the ferrite core in a direction toward the through-hole.

19 Claims, 44 Drawing Sheets

(56) References Cited

FOREIGN PATENT DOCUMENTS

| KR | 10-2022-0016258 A | 2/2022 |
| KR | 10-2022-0084286 A | 6/2022 |
| TW | 201142660 A | 12/2011 |
| WO | 2023/068872 A1 | 4/2023 |

\* cited by examiner

| Decease in relative height of ferrite core [mm] | Amount of increase in magnitude of pen signal |
|---|---|
| 0 | - |
| 0.5 | 6% increase |
| 1mm | 17% increase |
| 1.5 | 29% increase |

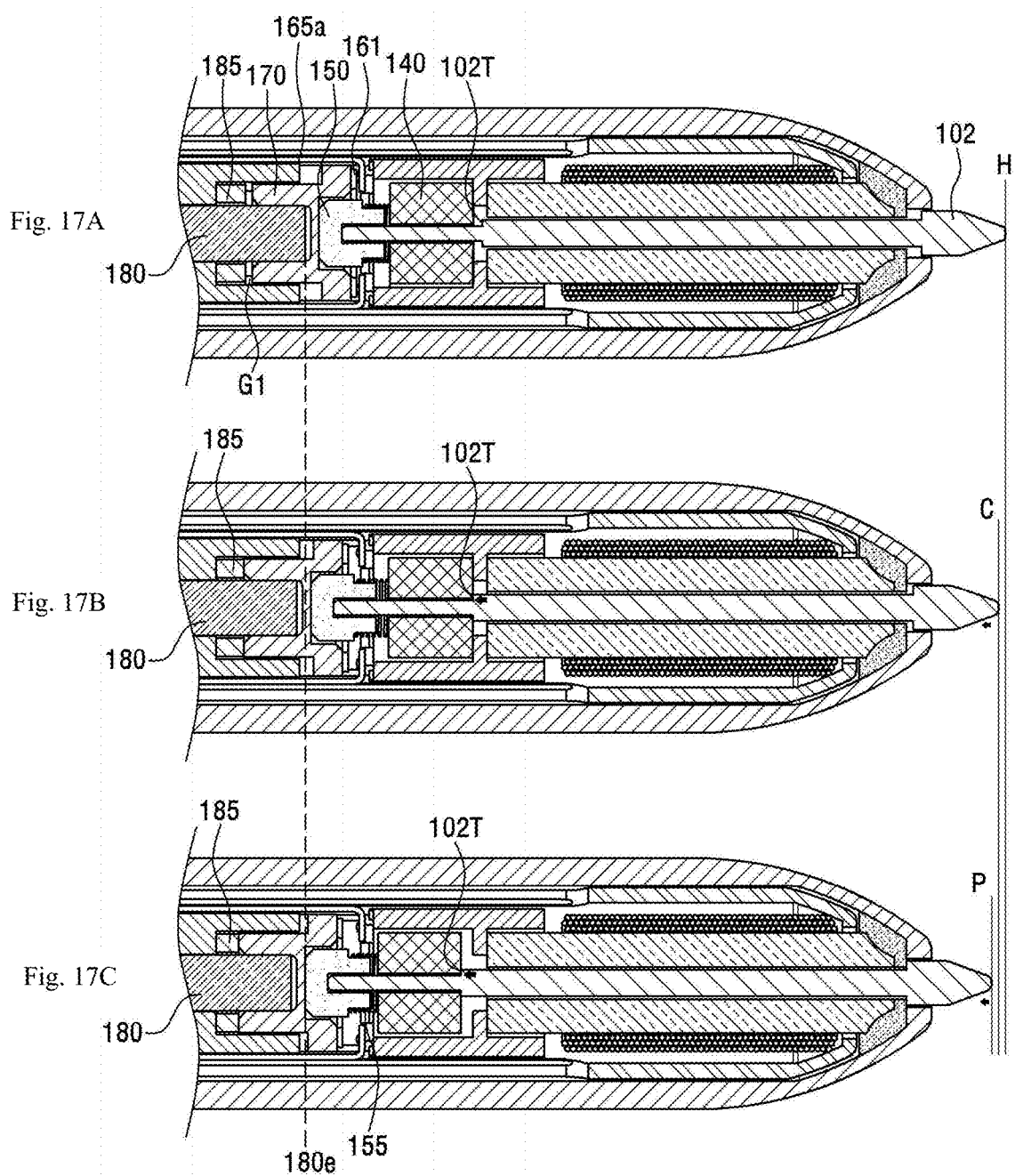

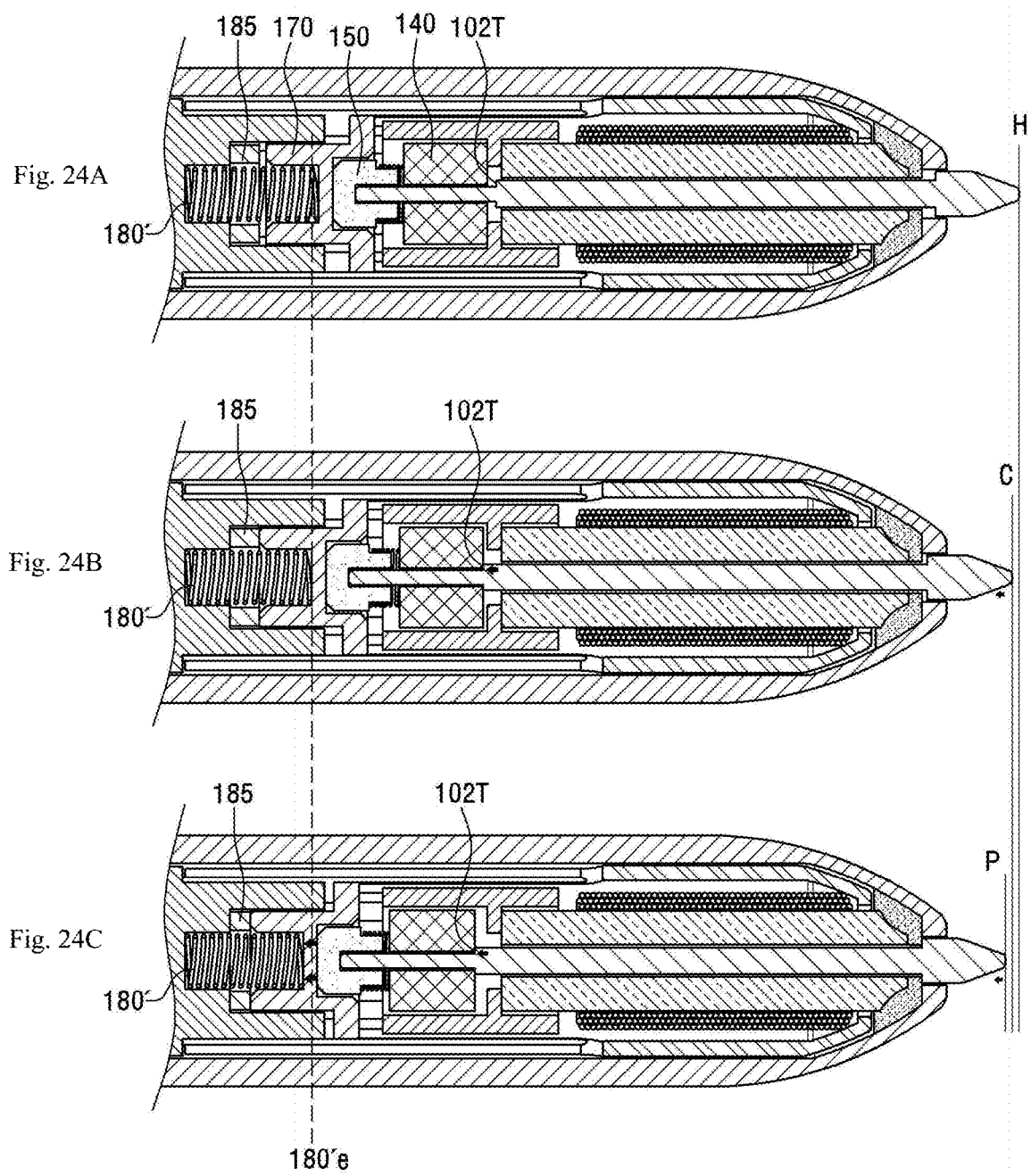

FERRITE CORE AND STYLUS PEN INCLUDING THE SAME

CROSS-REFERENCE TO RELATED APPLICATIONS

This U.S. Non-Provisional Patent application claims priority under 35 USC § 119 of Korean Patent Application 10-2023-0091400, filed on Jul. 13, 2023; Korean Patent Application No. 10-2023-0099565, filed on Jul. 31, 2023; and Korean Patent Application No. 10-2024-0079437, filed on Jun. 19, 2024; the entire contents of all of which are hereby incorporated by reference herein, for all purposes.

BACKGROUND

The present disclosure relates to a ferrite core and a stylus pen including the same, and more particularly, to a ferrite core for a stylus pen, which is capable of improving a magnitude of a pen signal received by a receiver and a stylus pen including the same.

A stylus pen is a pen-shaped device capable of inputting data by lightly touching a screen while dragging or clicking on the screen. A user may use the stylus pen for a precise touch input.

The stylus pen may be classified into an active stylus pen and a passive stylus pen depending on whether the stylus pen includes a battery and an electronic component therein.

Although the active stylus pen has an advantage of having an excellent basic performance and providing additional functions (pen pressure, hovering, and buttons) in comparison with the passive stylus pen, the active stylus pen has a disadvantage in that most of users substantially do not use the active stylus pen except for some advanced users because the active stylus pen is expensive and uses a rechargeable battery as power.

Although the passive stylus pen has an advantage in that the passive stylus pen is inexpensive and does not require a battery in comparison with the active stylus pen, the passive stylus pen has a disadvantage in that the passive stylus pen is difficult to recognize a precise touch in comparison with the active stylus pen. In recent years, however, technologies of an electro magnetic resonance (EMR) method that is an inductive resonance method and a capacitive resonance method are proposed to realize a passive stylus pen capable of recognizing a precise touch.

Although the EMR method is excellent in writing and drawing quality that is a key function of the stylus pen, the EMR method has a disadvantage of having a great thickness and requiring more costs because a separate EMR sensor panel and a separate EMR driving IC are necessarily added in addition to a capacitance touch panel.

The capacitive resonance method uses a general capacitance touch sensor and a general touch controller IC to increase a performance of the IC and support a pen touch without additional costs.

In the EMR method or the capacitive resonance method, a resonance signal is required to have a great amplitude to more accurately distinguish a touch caused by the stylus pen. Thus, a driving signal transmitted to the stylus pen needs to have the almost same resonance frequency as that of the resonance circuit contained in the stylus pen. However, according to the typical EMR method or capacitive resonance method, although the resonance frequency is the same as a frequency of the driving signal, signal transmission is difficult because of extremely great attenuation of the signal transmission. As a result, despite a lot of attempts of many touch controller IC vendors for a long time, no companies have succeeded in mass production because a sufficient output signal is not produced.

Thus, a feature of how to design structures of an internal resonance circuit and a pen is a key factor to manufacture an EMR or capacitive resonance stylus pen capable of producing a maximum output signal.

FIGS. 1A to 1C are views for explaining one requirement of a typical stylus pen.

An outer design of the typical stylus pen including the stylus pens 10a and 10b in FIGS. 1A to 1C needs to satisfy a predetermined requirement in consideration of user's environments.

One of the requirements is that the typical stylus pens 10a and 10b may perform a drawing in a state of being inclined at a predetermined angle (e.g., 60°) with a predetermined contact surface 31.

In particular, each of the stylus pens 10a and 10b is required to perform a drawing even in a state of being inclined at a predetermined angle (e.g., 60°) as a pen tip is pressed such that, when the stylus pen contacts a surface of a display panel 300 and then a predetermined force F is applied, the pen tip is pressed, and a portion thereof is retracted into a housing 19.

As a result, when the typical stylus pen 10a or 10b is inclined to the contact surface 31, an inclination of the predetermined angle (e.g., 60°) needs not to be disturbed by an outer component (e.g., housing 19) of the stylus pen 10a or 10b.

FIG. 2 is a schematic view illustrating an inner structure of a typical stylus pen.

Each of the typical stylus pens 10c and 10d in FIG. 2 includes a pen tip 11, an inductor unit 13 and 13', a capacitor unit 15, and a housing 19. The typical stylus pen further includes other additional components in addition to the above-described components.

The inductor unit 13 and 13' includes a ferrite core 131 and 131' and a coil 133. The pen tip 11 has a portion that is inserted into a through-hole of the ferrite core 131 and 131'.

The inductor unit 13 and 13' and the capacitor unit 15 are electrically connected to form an LC resonance unit. The LC resonance unit may be resonated by a driving signal provided by a transmitter disposed outside the stylus pen 10c and 10d and emit a predetermined signal (hereinafter, referred to as a pen signal).

A ferrite core 131' of the inductor unit 13' of the stylus pen 10d illustrated at a right side of FIG. 2 has a shape different from that of a ferrite core 131 of the inductor unit 13 in the stylus pen 10c illustrated at a left side. Specifically, the ferrite core 131' of the stylus pen 10d illustrated at the right side has a shape (hereinafter, referred to as a taper shape) having a width that gradually decreases in a downward direction. Through the taper shape, the ferrite core 131' may be disposed closer to a lower end (or pen tip side) in the housing 19 by a predetermined distance H.

In the typical stylus pens 10c and 10d in FIG. 2, a magnitude of the pen signal received by the receiver disposed outside the stylus pen 10c and 10d may be varied according to a position of the inductor unit 13 and 13' in the housing 19. The position of the inductor unit 13 and 13' may be determined to maximize the magnitude of the pen signal.

Since the ferrite core 131' of the stylus pen 10d at the right side is disposed closer to the pen tip than the ferrite core 131 of the stylus pen 10c at the left side, the magnitude of the pen signal received by the receiver is relatively great. However, there is a limitation in maximizing the magnitude of the pen signal received by the receiver by using only the taper shape of the ferrite core 131' of the stylus pen 10*d*.

Furthermore, while maximizing the magnitude of the pen signal received by the receiver, it is required to stably accommodate the inductor unit 13 and 13' in the housing 19.

SUMMARY

The present disclosure provides a ferrite core optimized to a housing having a specific shape and a stylus pen including the same.

The present disclosure also provides a ferrite core capable of improving a magnitude of a pen signal received by a receiver and a stylus pen including the same.

The present disclosure also provides a ferrite core capable of clearly distinguishing a hover state and a contact state of a stylus pen and a stylus pen including the same.

The present disclosure also provides a ferrite core capable of synchronizing a magnetic body with a movement of a core body and a stylus pen including the same.

The present disclosure also provides a ferrite core capable of electrically connecting electrical components without using an inner wire and a stylus pen including the same.

The present disclosure also provides a ferrite core capable of minimizing a stylus pen and a stylus pen including the same.

The present disclosure also provides a ferrite core capable of stably accommodating an inductor unit in a housing and a stylus pen including the same.

The present disclosure also provides a ferrite core capable of drawing even in a state of being inclined at a predetermined angle and a stylus pen including the same.

An embodiment of the present invention provides a ferrite core mounted in a stylus pen and having a through-hole formed along a longitudinal direction of the stylus pen. Here, the ferrite core has a first cross-sectional shape in a first vertical direction perpendicular to the longitudinal direction and a second cross-sectional shape in a second vertical direction perpendicular to both the longitudinal direction and the first vertical direction, the first cross-sectional shape is different from the second cross-sectional shape, the ferrite core includes a curved portion disposed at one end of the ferrite core, and the curved portion includes at least two curved surfaces that are curved from one side surface of one end of the ferrite core to a portion adjacent to the through-hole of the ferrite core in a direction toward the through-hole.

In an embodiment of the present invention, a stylus pen includes: a housing; a core body having one end disposed outside the housing and the rest disposed in the housing and moved along a longitudinal direction by external force applied to the one end; an inductor unit including a ferrite core disposed in the housing and having a through-hole through which the core body passes and a coil wound around an outer surface of the ferrite core; a fixing bracket fixed in the housing and coupled to the other end of the ferrite core; and a moving bracket disposed in the fixing bracket, surrounding the other end of the core body, and synchronized with a movement of the core body in conjunction with the core body. Here, the ferrite core has a first cross-sectional shape in a first vertical direction perpendicular to the longitudinal direction and a second cross-sectional shape in a second vertical direction perpendicular to both the longitudinal direction and the first vertical direction, the first cross-sectional shape is different from the second cross-sectional shape, the ferrite core includes a curved portion disposed at one end of the ferrite core, and the curved portion includes at least two curved surfaces that are curved from one side surface of one end of the ferrite core to a portion adjacent to the through-hole of the ferrite core in a direction toward the through-hole.

BRIEF DESCRIPTION OF THE FIGURES

The accompanying drawings are included to provide a further understanding of the inventive concept and are incorporated in and constitute a part of this specification. The drawings illustrate exemplary embodiments of the inventive concept and, together with the description, serve to explain principles of the inventive concept. In the drawings:

FIGS. 17A to 17C are views for explaining an operation of the stylus pen 100 in FIGS. 9 to 16B;

FIGS. 24A to 24C are view for explaining an operation of the stylus pen in FIGS. 22 and 23B;

DETAILED DESCRIPTION

Figure 1A:
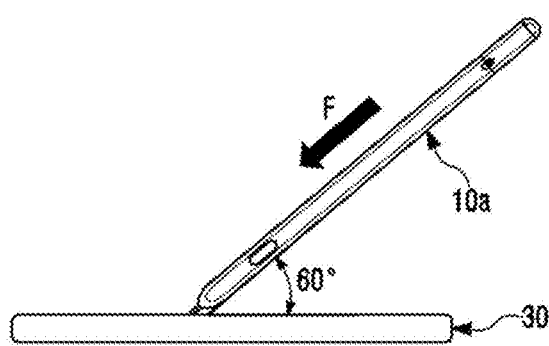
FIGS. 1A to 1C are views for explaining one requirement of a typical stylus pen.
Figure 1B:
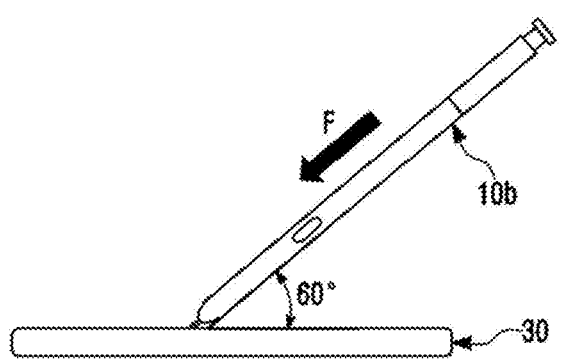
Figure 1C:
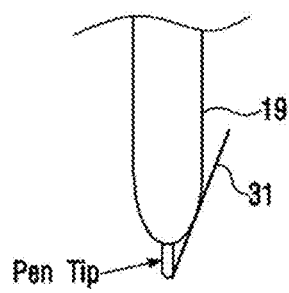

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing from the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

Figure 3:
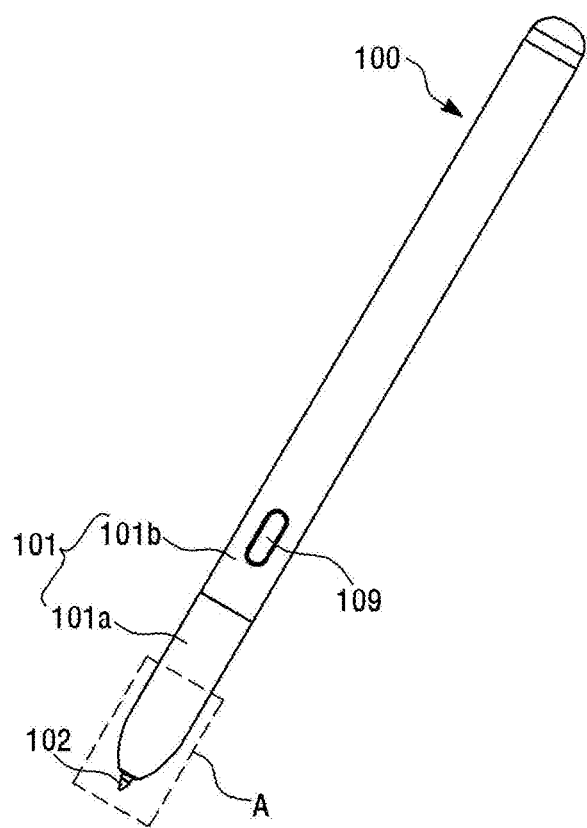
FIG. 3 is a perspective view illustrating a stylus pen 100 according to an embodiment of the present invention.

FIG. 3 is a perspective view illustrating a stylus pen 100 according to an embodiment of the present invention.

Referring to FIG. 3, a stylus pen according to an embodiment of the present invention includes a housing 101 and a core body 102.

The housing 101 defines an appearance of the stylus pen 100. The housing 101 of the stylus pen includes an inner predetermined space and has an elongated shape in one direction. The housing 101 may be formed such that two or more parts are coupled to each other or integrated into one piece.

The housing 101 may be made of a non-conductive synthetic resin material.

The housing 101 may include a first housing 101a and a second housing 101b. The first housing 101a and the second housing 101b may be coupled to each other to form the appearance of the stylus pen 100. Various components are embedded in the first housing 101a and the second housing 101b.

A button part 109 may be disposed on the housing 101. The button part 109 may be disposed at an intermediate portion of an outer surface of the second housing 101b. The button part 109 is designed to perform a specific operation of the stylus pen 100. For example, the button part 109 may be a mechanical or touch-type button used for a cancel operation.

The core body 102 includes one end that is disposed outside the housing 101, and the rest portion except the one end is disposed in the housing 101. Here, the one end of the core body 102 may be referred to as a pen tip.

One portion of the one end of the core body 102 may move inward into the housing 101 by external force applied from the outside. As the external force increases, a volume of the one portion of the one end of the core body 102, which is moved into the housing 101, may increase. When the applied external force decreases, the one portion of the one end of the core body 102 is moved out of the housing 101 by a mechanical operation of components in the housing 101. When external force is not applied, the one portion of the one end of the core body 102 is returned to an original state.

Hereinafter, an inner structure of the housing 101 will be described with reference to FIGS. 4 to 5.

Figure 4:
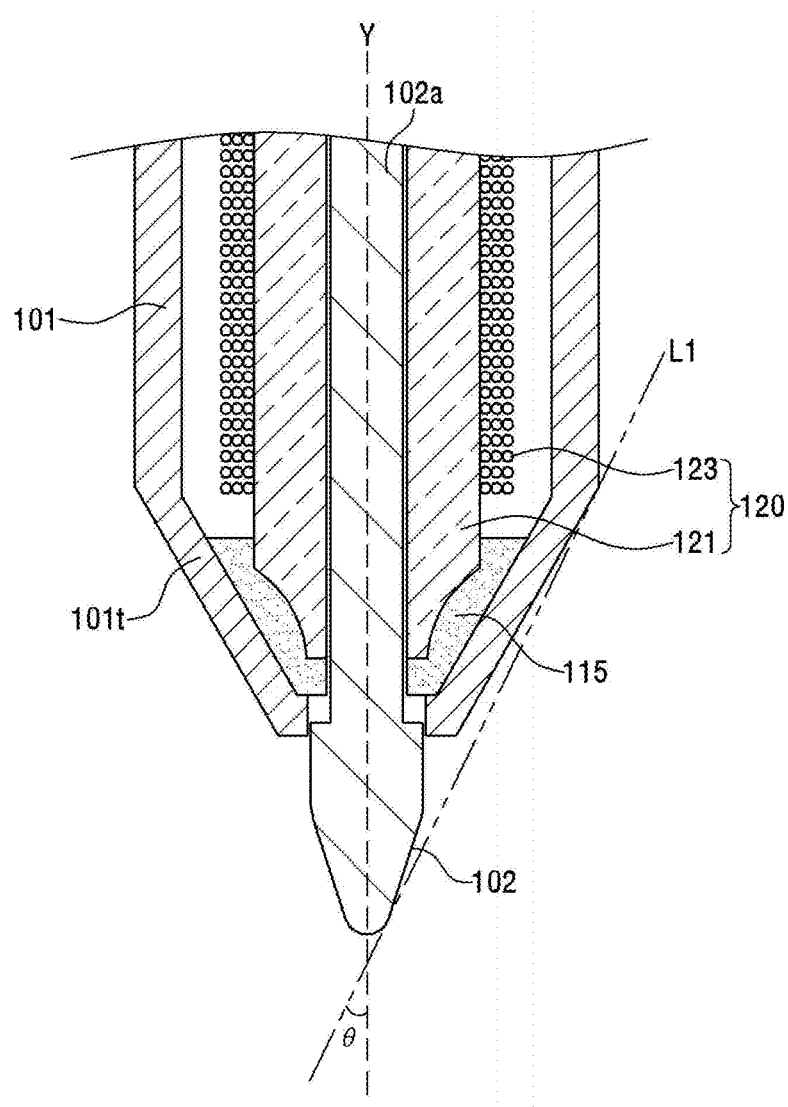
FIG. 4 is a cross-sectional view illustrating portion A of the stylus pen 100 in FIG. 3.
Figure 5:
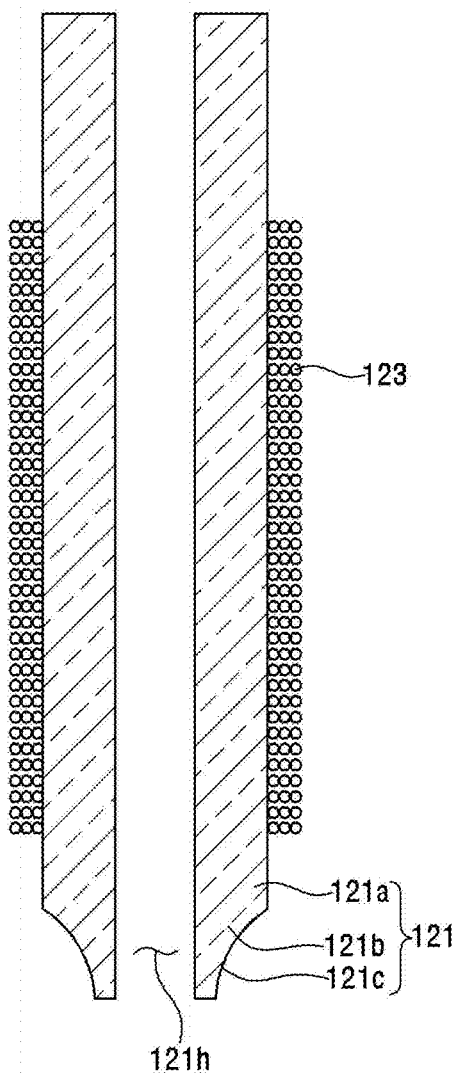
FIG. 5 is a detailed cross-sectional view illustrating an inductor unit 120 in FIG. 4.

FIG. 4 is a cross-sectional view illustrating portion A of the stylus pen 100 in FIG. 3, and FIG. 5 is a detailed cross-sectional view illustrating an inductor unit 120 in FIG. 4.

Referring to FIGS. 4 and 5, the stylus pen 100 according to an embodiment of the present invention includes a buffer member 115, an inductor unit 120, and a capacitor unit (not shown), which are disposed in the housing 101.

The buffer member 115 is disposed in the housing 101 and disposed between one end of a ferrite core 121 and an inner surface of the housing 101.

The buffer member 115 may be disposed in a tapered portion 101t of the housing 101. The tapered portion 101t of the housing 101, which is adjacent to the one end of the core body 102 among both ends of the housing 101, has a shape having a width or diameter that gradually decreases in a direction toward an end of the one end of the housing 101.

The buffer member 115 has a conical or polygonal pyramid shape and includes a through-hole through which one end of the ferrite core 121 and a body 102a of the core body 102 pass. An inner surface of the through-hole may have a shape corresponding to an outer surface of the one end of the ferrite core 121 and an outer surface of the body 102a of the core body 102 102. Here, the body 102a of the core body 102 refers to a portion, which is disposed in the through-hole of the ferrite core 12, in the core body 102 having an elongated shape in one direction.

The buffer member 115 may be made of an elastic material such as rubber to serve as a buffer between the ferrite core 121 and the housing 101. The buffer member 115 may protect the housing 101 and the ferrite core 121 and block an electrical or magnetic effect from the outside.

The buffer member 115 has a shape that surrounds one end or a lower end 121b of the ferrite core 121.

A virtual tangent line L1 that contacts, in common, the tapered portion 101t of the housing 101 and the portion (or pen tip) disposed outside the housing in the core body 102 forms a predetermined angle θ with a central axis Y of the core body 102. Here, the predetermined angle θ may be less than 30°. When the predetermined angle θ is less than 30°, a drawing may be performed even in a state in which the stylus pen according to an embodiment of the present invention is inclined at 60° based on a contact surface.

The inductor unit 120 may constitute an LC resonance unit with a capacitor unit (not shown). A resonance frequency may be set by a value of inductance L of the inductor unit 120 and a value of capacitance C of the capacitor unit (not shown). This resonance frequency may be varied according to variation in the value of the inductance L of the inductor unit 120 or the value of the capacitance C of the capacitor unit (not shown).

The inductor unit 120 includes a ferrite core 121 and a coil 123 wound around an outer surface of the ferrite core 121.

The coil 123 may be wound around the ferrite core 121 with at least one layer.

The ferrite core 121 may have an overall cylindrical or polygonal container shape, and a through-hole 121h that passes through the inside of the ferrite core 121 may be formed along a longitudinal direction of the ferrite core 121.

The ferrite core 121 has the through-hole 121h through which the body 102a of the core body 102 passes. The body 102a of the core body 102 may perform a linear reciprocating movement along a longitudinal direction through the through-hole 121h.

One end of the ferrite core 121 may have a tapered shape having a diameter or width that gradually decreases in a direction toward an end thereof. Here, an outer surface of the one end having the tapered shape may include at least one curved portion 121c that is curved inward.

The ferrite core 121 may include an upper end 121a and a lower end 121b disposed below the upper end 121a. Here, the upper end 121a and the lower end 121b may be integrated with each other.

The upper end 121a has a cylindrical, elliptical, or polygonal container shape. Here, the cylindrical or polygonal container shape may have a constant diameter or width as illustrated in the drawing. Alternatively, the cylindrical, elliptical, or polygonal container shape may not have a constant diameter or width, and one portion may have a diameter or width different from that of another portion.

A portion of the through-hole 121h through which the body 102a of the core body 102 passes is formed in the upper end 121a. The coil 123 is disposed on an outer surface of the upper end 121a.

The rest portion of the through-hole 121h through which the body 102a of the core body 102 passes is formed in the lower end 121b.

The lower end 121b has a tapered shape having a width that gradually decreases in a direction from top to bottom. Here, at least a portion of an outer surface of the lower end 121b has a curved portion 121c that is curved into the lower end 121b. At least one curved portion 121c may be provided. A technical effect of the stylus pen including the ferrite core 121 having the above-described curved portion 121c according to an embodiment of the present invention will be described below with reference to the drawings.

Figure 2:
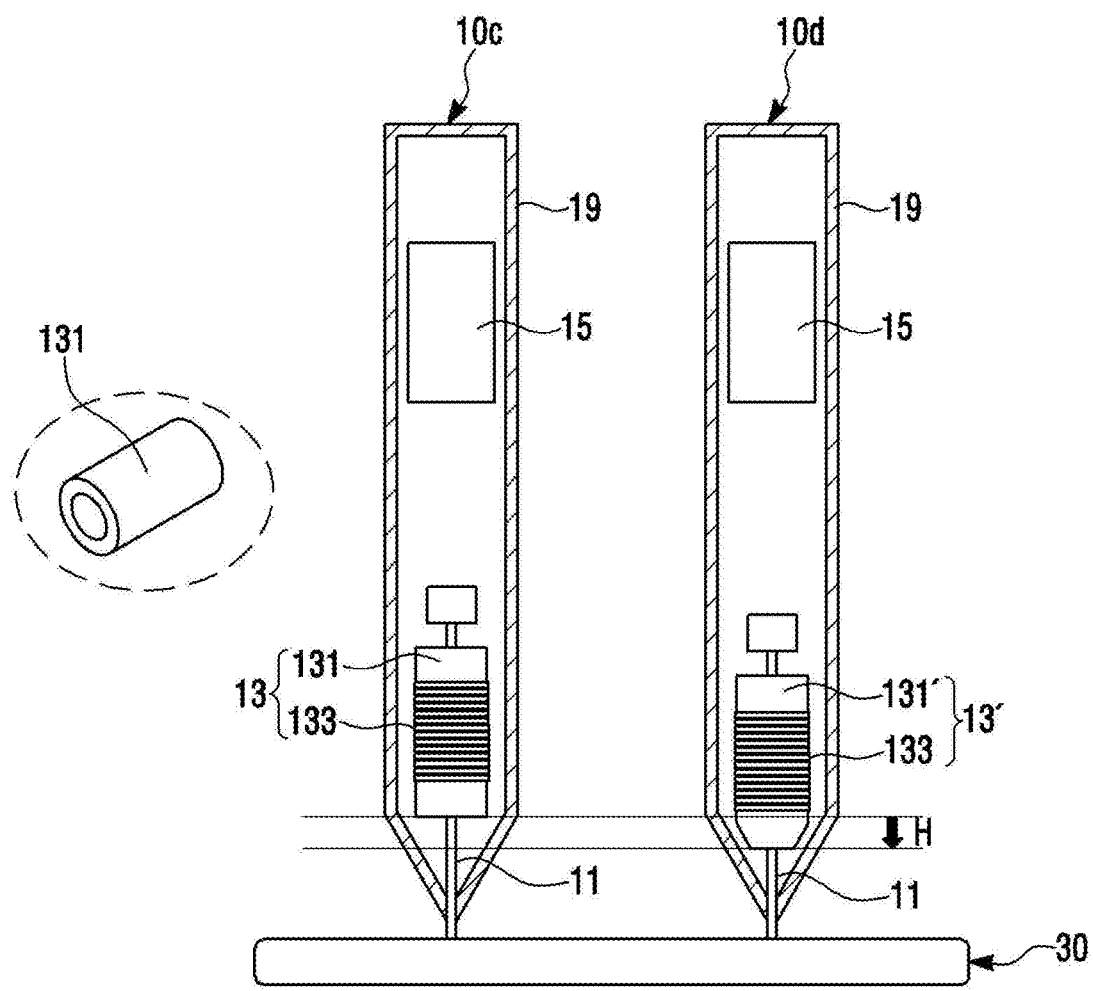
FIG. 2 is a schematic view illustrating an inner structure of the typical stylus pen.
Figure 6A:
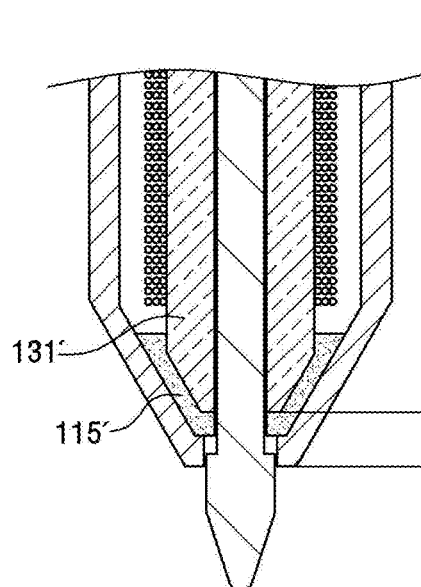
FIGS. 6A and 6B are views for explaining an inner configuration and an effect thereof of the stylus pen in FIGS. 4 and 5 according to an embodiment of the present invention.
Figure 6B:
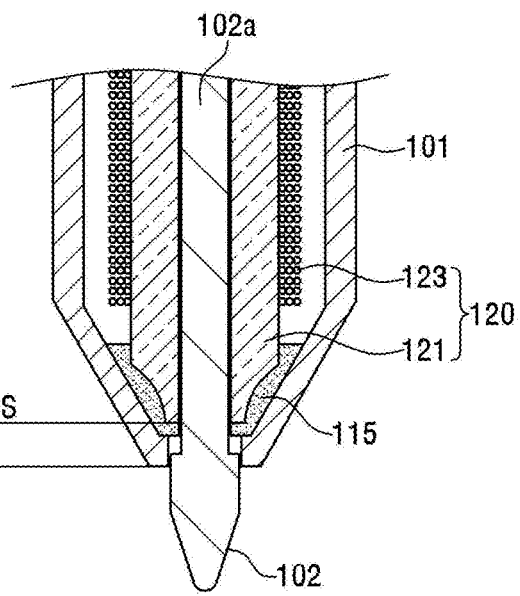

FIGS. 6A and 6B are views for explaining an inner configuration and an effect thereof of the stylus pen according to an embodiment of the present invention in FIGS. 4 and 5. Specifically, FIG. 6B is a cross-sectional view illustrating the stylus pen according to an embodiment of the present invention in FIGS. 4 and 5, and FIG. 6A is a cross-sectional view illustrating a case in which the ferrite core 121 in FIG. 6B is replaced with the ferrite core 131' illustrated at a right side of FIG. 2.

Referring to FIGS. 6A and 6B, the stylus pen according to an embodiment of the present invention in FIG. 6B may include the ferrite core 121 that is disposed lower by a predetermined length S than the ferrite core 131' in FIG. 6A.

According to this configuration, when the stylus pen according to an embodiment of the present invention is used, the inductor unit 120 including the ferrite core 121 may be disposed closer to a receiver (not shown) disposed below the core body 102 of the stylus pen. Thus, there is an advantage in that a magnitude of a pen signal detected by the receiver increases. This is because a thickness (between inner and outer surfaces) of the buffer member 115 may be reduced by a shape of the ferrite core 121 of the stylus pen according to an embodiment of the present invention. Hereinafter, this will be described below with reference to FIGS. 7A to 7C.

Figures 7A, 7B, 7C:
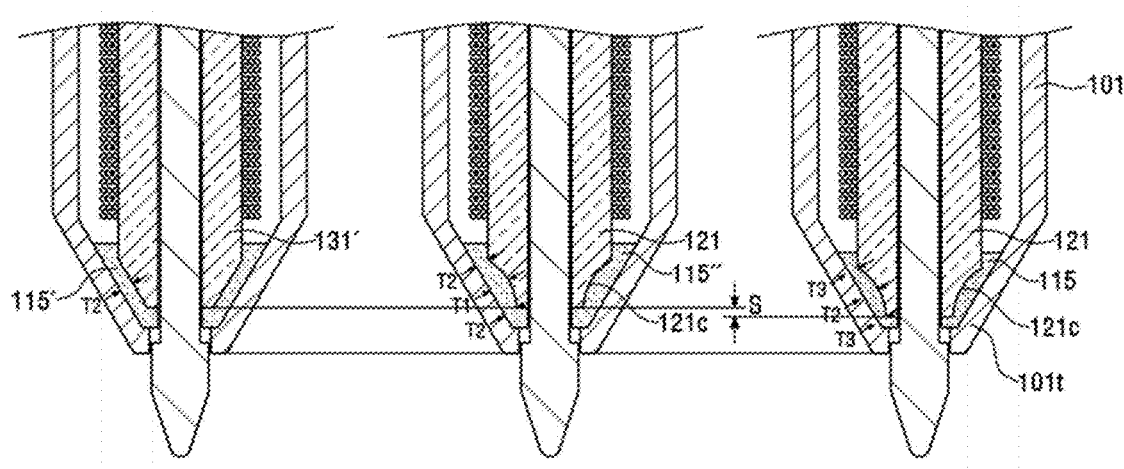
FIGS. 7A to 7C are views for explaining in more detail an inner configuration and an effect thereof of the stylus pen in FIGS. 4 and 5 according to an embodiment of the present invention.

FIGS. 7A to 7C are views for explaining in more detail an inner configuration and an effect thereof of the stylus pen according to an embodiment of the present invention in FIGS. 4 and 5. Specifically, FIG. 7A is the same as FIG. 6A, FIG. 7B is the same as FIG. 6B, and FIG. 7C is a view illustrating a case in which the ferrite core 121 is disposed at the same position as the ferrite core 131' in FIG. 7A.

Referring to FIG. 7A, the buffer member 115' has a constant thickness T2 between inner and outer surfaces thereof. As the thickness T2 is gradually minimized, the ferrite core 131' may move as low as possible in the tapered portion 101t of the housing 101. However, the thickness T2 has a limitation due to a structure of the buffer member 115' or other manufacturing processes.

Here, when it is assumed that the thickness T2 is a minimum thickness of the buffer member 115' due to the structure of the buffer member 115' or other manufacturing processes, FIG. 7A shows a case in which the typical ferrite core 131' is disposed at the lowest position in the housing 101.

Referring to FIG. 7C, the ferrite core 121 is disposed at the same position as the ferrite core 131' in FIG. 7A. Here, since the ferrite core 121 has the curved portion 121c, the buffer member 115" is different in configuration from the buffer member 115' in FIG. 7A. Specifically, an inner surface of the buffer member 115" has a protruding curved surface in correspondence to the curved portion 121c of the ferrite core 121.

A thickness between an outer surface and the curved inner surface of the buffer member 115" is varied according to positions. Specifically, each of upper and lower ends of the inner surface of the buffer member 115" has the minimum thickness T2 from the outer surface, an intermediate portion of the inner surface of the buffer member 115" has a thickness between T2 and T1 (where, T1>T2).

In FIG. 7C, at least one portion (upper and lower ends) of the buffer member 115" satisfies the minimum thickness T2, and the intermediate portion of the buffer member 115" has the thickness T1 greater than the minimum thickness T2. As described above, since the thickness T1 of the intermediate portion of the buffer member 115" is greater than the minimum thickness T2, there is an advantage in that the buffer member 115" is easier to manufacture than the typical buffer member 115' in FIG. 7A.

Referring to FIG. 7B, an inner surface of the buffer member 115 is formed into a curved surface by the curved portion 121c of the ferrite core 121. Each of upper and lower ends of the inner surface of the buffer member 115 has a thickness T3 (T3<T2) from the outer surface of the buffer member 115, and an intermediate portion of the inner surface of the buffer member 115 has a thickness between T3 and T2 from the outer surface of the buffer member 115.

In FIG. 7B, although the upper and lower ends of the buffer member 115 do not satisfy the minimum thickness T2, since the intermediate portion of the buffer member 115 satisfies the minimum thickness T2, the buffer member 115 may be manufactured. Since the buffer member 115 manufactured as described above has the minimum thickness less than that of each of the buffer members 115' and 115" in FIGS. 7A and 7C, a volume of the buffer member 115 may be further reduced. Thus, the buffer member 115 may move further downward in the tapered portion 101t of the housing 101. Accordingly, the ferrite core 121 may be disposed lower by a predetermined height S than those in (a) and FIG. 7C.

Figures 8, 9:
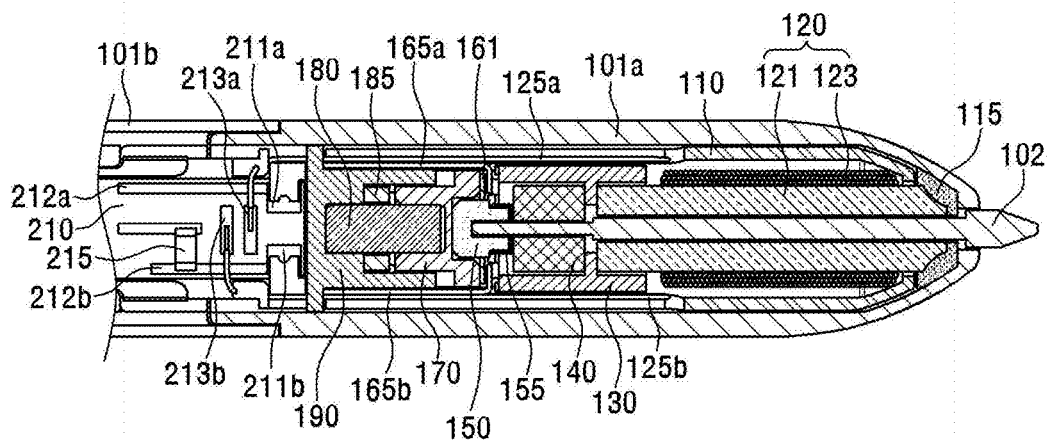
FIG. 8 is a view for explaining an amount of increase in magnitude of a pen signal according to a predetermined height S in FIGS. 7A to 7C.
FIG. 9 is a cross-sectional view illustrating a portion of the stylus pen 100 in FIG. 3.

FIG. 8 is a view for explaining an amount of increase in magnitude of a pen signal according to the predetermined height S in (a) and (c) of FIG. 7.

Referring to a table in FIG. 8, it may be known that the magnitude of the pen signal increases as the predetermined height S increases.

As described above, the stylus pen 100 according to an embodiment of the present invention in FIGS. 4 to 7C may reduce the thickness of the buffer member 115 because the tapered portion of the ferrite core 121 of the inductor unit 120 has a shape different from that of the typical ferrite core 131'. Thus, the ferrite core 121 may be disposed closer to an end of the stylus pen 102 in the housing 101. Thus, the receiver that receives the pen signal emitted from the stylus pen 100 according to an embodiment of the present invention may obtain a greater pen signal to improve sensing sensitivity of the stylus pen at a side of the receiver.

On the other hand, the receiver that is described above several times represents a module or device that receives the pen signal emitted from the stylus pen 100 according to an embodiment of the present invention. The receiver may be a general digitizer or a display panel. The display panel may have at least one loop pattern made of a conductive material. The loop pattern may be coupled to a touch sensor or coupled to the display panel separately from the touch sensor.

Hereinafter, specific internal structures of the stylus pen 100 according to an embodiment of the present invention, to which the ferrite core 121 and the buffer member 115 in FIGS. 4 to 7C are applied, will be described with reference to the drawings.

Figure 10A:
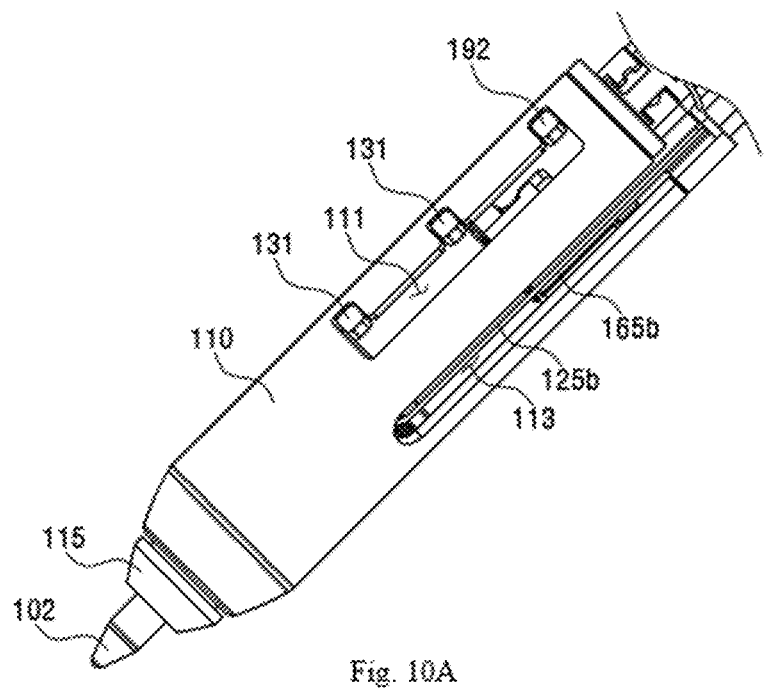
FIG. 10A is a perspective view for explaining structures of an inner case 110 and a buffer member 115 in FIG. 9.
Figure 10B:
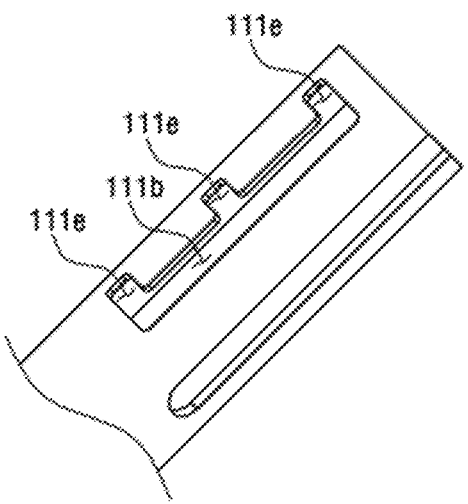
FIG. 10B is a perspective view illustrating only the inner case 110.
Figure 11:
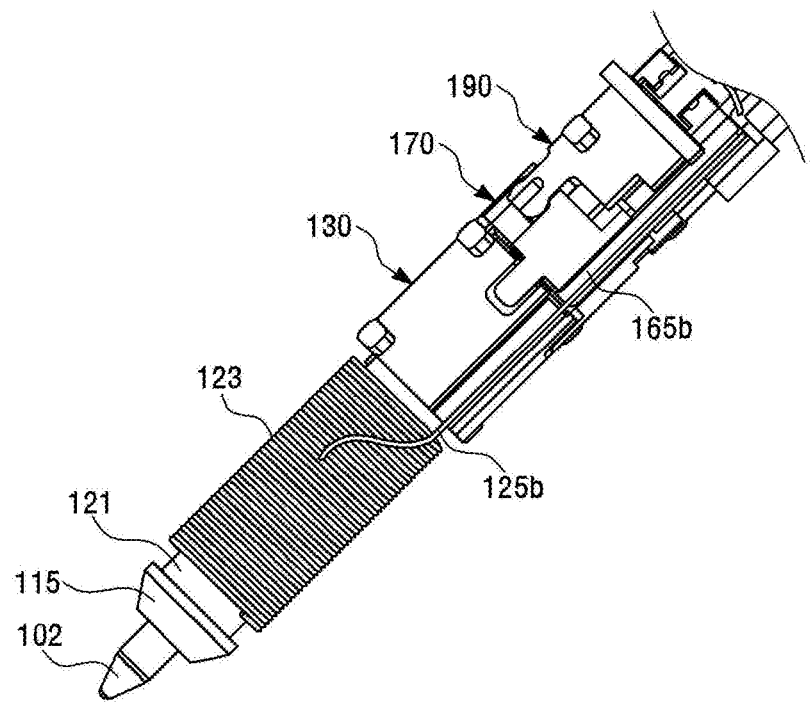
FIG. 11 is a perspective view illustrating a state in which the inner case 110 in (a) of FIG. 10 is removed.
Figure 12A:
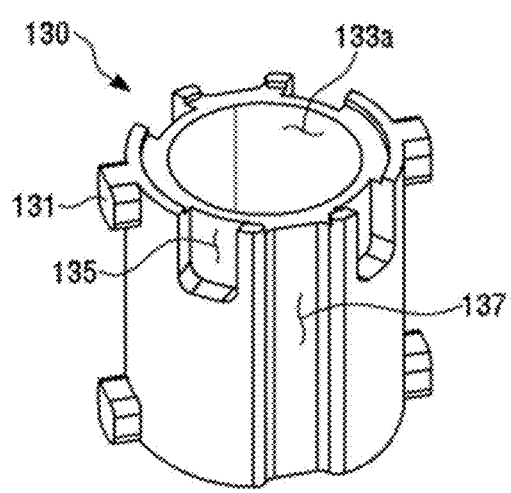
FIGS. 12A and 12B are perspective views illustrating a first fixing member 130 in FIGS. 9 and 11 from various angles.
Figure 12B:
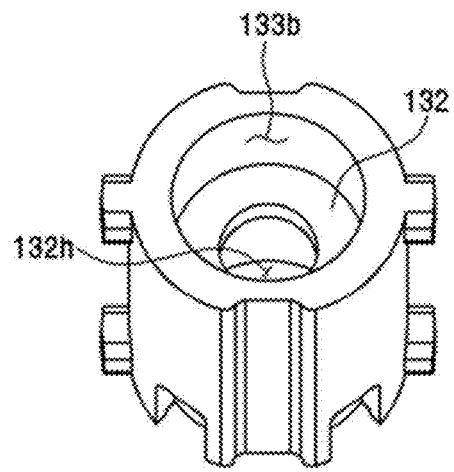
Figure 13A:
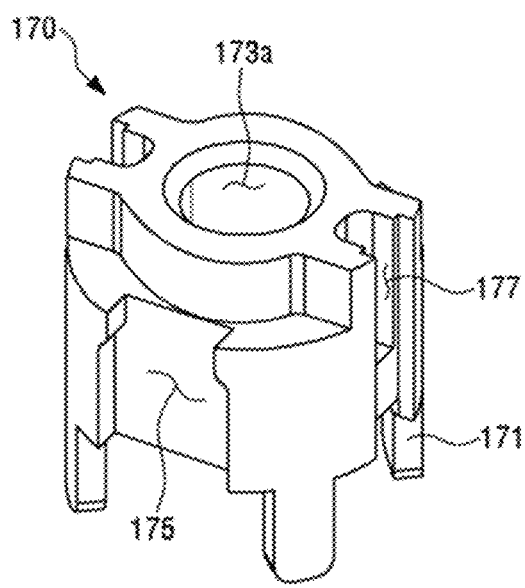
FIGS. 13A and 13B are perspective views illustrating a moving member 170 in FIGS. 9 and 11 from various angles.
Figure 13B:
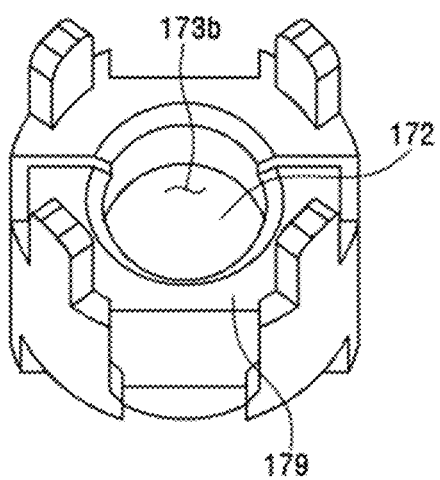
Figure 14A:
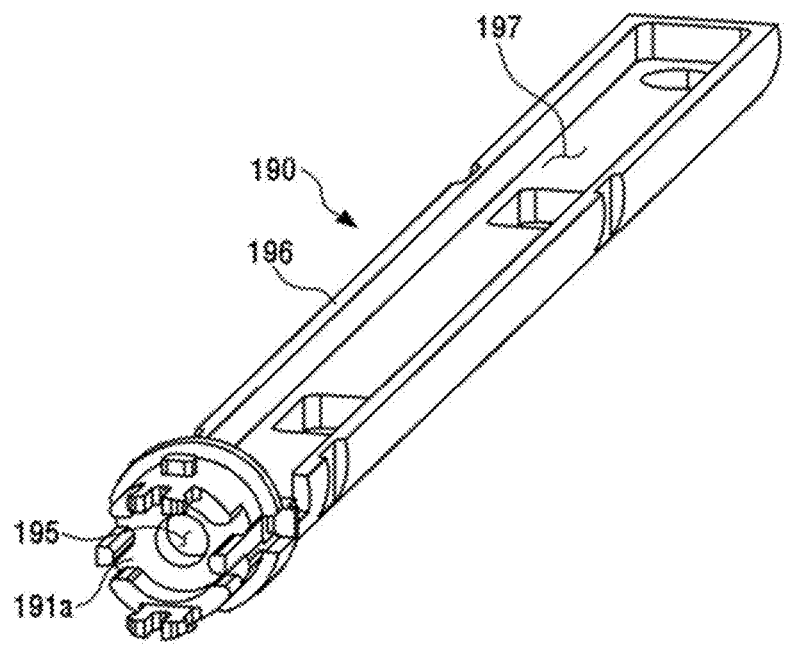
FIGS. 14A and 14B are perspective views illustrating a second fixing member 190 in FIGS. 9 and 11 from various angles.
Figure 14B:
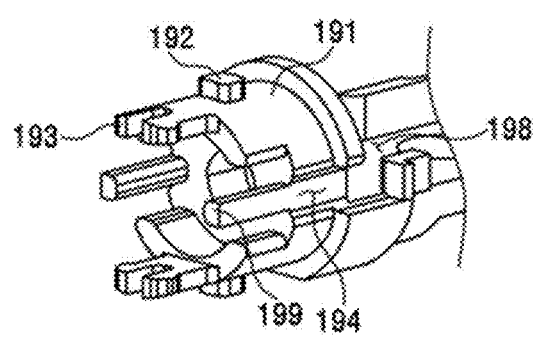
Figure 15:
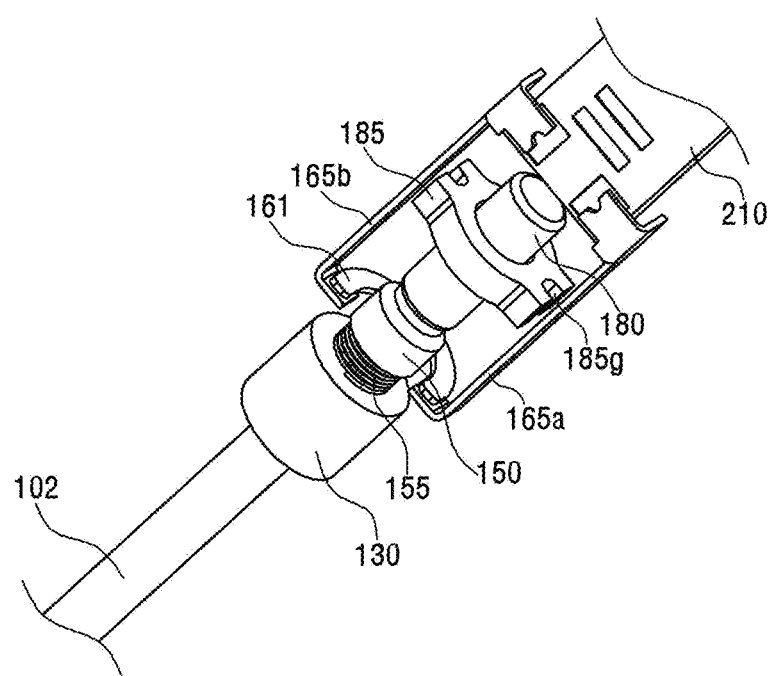
FIG. 15 is a perspective view illustrating some components in FIGS. 9 and 11 from one side.
Figures 16A, 16B:
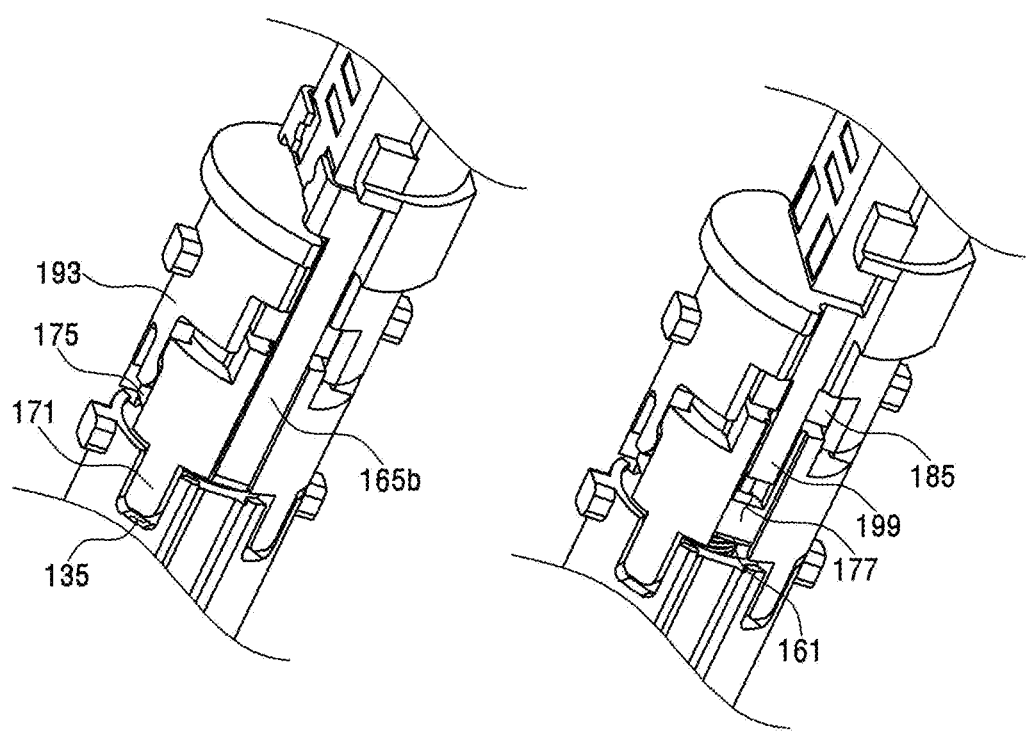
FIGS. 16A and 16B are perspective views illustrating only some components in FIGS. 9 and 11.

FIG. 9 is a cross-sectional view illustrating a portion of the stylus pen 100 according to an embodiment of the present invention in FIG. 3, FIG. 10A is a perspective view for explaining structures of an inner case 110 and the buffer member 115 in FIG. 9, FIG. 10B is a perspective view illustrating only the inner case 110. FIG. 11 is a perspective view illustrating a case in which the inner case 110 in FIG. 10A is removed, FIGS. 12A and 12B are perspective views illustrating a first fixing member 130 in FIGS. 9 and 11 from various angles, FIGS. 13A and 13B are perspective views illustrating a moving member 170 in FIGS. 9 and 11 from various angles, FIGS. 14A and 14B are perspective views illustrating a second fixing member 190 in FIGS. 9 and 11 from various angles, FIG. 15 is a perspective view illustrating some components in FIGS. 9 and 11 from one side, and FIGS. 16A and 16B are perspective views illustrating only some components in FIGS. 9 and 11.

Referring to FIG. 9, the stylus pen 100 includes at least two of an inner case 110, a buffer member 115, an inductor unit 120, a capacitor unit (not shown), a first fixing member 130, a magnetic body 140, a cover member 150, a ring terminal 161, connection terminals 165a and 165b, a moving member 170, a first elastic member 180, a second elastic member 185, an elastic body 155, a second fixing member 190, and a substrate 210.

The inner case 110 is made of a non-conductive material and is disposed in the housing 101. Specifically, the inner case 110 may be disposed in a first housing 101a of the housing 101. The inner case 110 may have a shape surrounding the inductor unit 120, the first fixing member 130, the ferrite chip 140, the cover member 150, the ring terminal 161, the connection terminals 165a and 165b, the moving member 170, the first elastic member 180, the second elastic member 185, the elastic body 155, and the second fixing member 190. The inner case 110 serves to protect various inner components from physical and/or electrical impacts.

Referring to FIG. 9 and FIGS. 10A and 10B, the inner case 110 may have a first opening 111 in which a first protrusion 131 of the first fixing member 130 and a first protrusion 192 of the second fixing member 190 are disposed. The first opening 111 may have a base groove 111b extending in a longitudinal direction of the stylus pen 100 and a plurality of extension grooves 111e connected to the base groove 111b and extending in a direction perpendicular to the longitudinal direction of the base groove 111b. The plurality of extension grooves 111e may be disposed at positions corresponding to a plurality of first protrusions 131 and 192. For example, the first opening 111 may have an "E"-shape.

The plurality of first protrusions 131 and 192 may be moved from the plurality of extension grooves 111e to the base groove 111b or from the base groove 111b to the plurality of extension grooves 111e by rotating the inner case 110 using the core body 102 as a rotation axis in a counterclockwise or clockwise direction. Specifically, positions of the first fixing member 130 and the second fixing member 190 may be fixed in the inner case 110 by moving the plurality of first protrusions 131 and 192 from the base groove 111b to the plurality of extension grooves 111e. On the other hand, the moving member 170 may be moved in conjunction with a linear reciprocating movement of the core body 102 caused by external force between the first fixing member 130 and the second fixing member 190 because the moving member 170 is not directly coupled to the inner case 110.

The inner case (110) may have a second opening 113 in which extension coils 125a and 125b are disposed and from which the connection terminals 165a and 165b are exposed. The second opening 113 may provide a space in which the extension coils 125a and 125b are disposed and protect the extension coils 125a and 125b from external impacts. Also, a mounting position of the connection terminals 165a and 165b may be easily checked through the second opening 113.

The buffer member 115 may be disposed between the inductor unit 120 and the housing 101 and between the core body 102 and the inner case 110. The buffer member 115 has a through-hole through which the core body 102 passes. The buffer member 115 may guide a position of the core body 102, stably fix the inductor unit 120, and block the inductor unit 120 from external electrical or magnetic effects. Although the buffer member 115 may be provided separately from the inner case 110, the embodiment of the present invention is not limited thereto. For example, the buffer member 115 may be integrated with the inner case 110.

Referring to FIGS. 9 and 11, the buffer member 115, the inductor unit 120, the first fixing member 130, the moving member 170, and the second fixing member 190 may be arranged sequentially along a longitudinal direction (hereinafter, referred to as a "longitudinal direction") of the stylus pen 100 from one end of the core body 102. That is, along the longitudinal direction, the inductor unit 120 may be disposed on the buffer member 115, the first fixing member 130 may be disposed on the inductor unit 120, the moving member 170 may be disposed on the first fixing member 130, and the second fixing member 190 may be disposed on the moving member 170.

The inductor unit 120 includes a ferrite core 121 and a coil 123 wound around the ferrite core 121. The ferrite core 121 has a through-hole through which the core body 102 passes. The core body 102 may perform a linear reciprocating movement along the longitudinal direction through the through-hole. The coil 123 may be wound around the ferrite core 121 with at least one layer. The extension coils 125a and 125b may be connected to both ends of the coil 123, respectively. The extension coils 125a and 125b may each extend along the longitudinal direction and be connected to coil electrodes 213a and 213b disposed on the substrate 210, respectively.

The inductor unit 120 is fixedly installed in the housing 101. The inductor unit 120 may be fixed between the first fixing member 130 and the buffer member 115 in the longitudinal direction. The inductor unit 120 may be fixed by the inner case 110 in a direction (hereinafter, referred to as a "vertical direction") perpendicular to the longitudinal direction.

The inductor unit 120 may be fixed at one side of the first fixing member 130. Here, a portion of the inductor unit 120 may be disposed in a second cavity 133b of the first fixing member 130.

The inductor unit 120 may be electrically connected to a capacitor unit (not shown) mounted to the substrate 210 to constitute a resonance circuit unit. A resonance frequency may be set by a value of inductance L of the inductor unit 120 and a value of capacitance C of the capacitor unit (not shown). The resonance frequency may be varied because the value of inductance L of the inductor unit 120 is varied according to a movement of the magnetic body 140.

The capacitor unit (not shown) is disposed on the substrate 210. The capacitor unit (not shown) has a preset value of the capacitance C. The capacitor unit (not shown) may include two or more capacitors. The circuit may be constituted such that at least one of the two or more capacitors is always electrically connected to the inductor unit 120 as a basic capacitor.

The capacitor unit (not shown) includes a jumping capacitor 215. The circuit may be constituted such that the jumping capacitor 215 is mounted on the substrate 210 and electrically connected to the connection terminals 165a and 165b. For example, the jumping capacitor 215 may be electrically connected to connection pads 211a and 211b disposed on the substrate 210 through conductive patterns 212a and 212b. The jumping capacitor 215 may be electrically connected to or disconnected from the basic capacitor according to the movement of the core body 102. Since the ring terminal 161 is in contact with the contact terminals 165a and 165b when external force is not applied to the core body 102, the jumping capacitor 215 is connected to the basic capacitor. On the other hand, when the moving member 170 that operates together with the core is moved toward the first elastic member 180 as external force is applied to the core body 102, the ring terminal 161 is detached from the connection terminals 165a and 165b. Here, the jumping capacitor 215 may be electrically disconnected from the basic capacitor.

Referring to FIGS. 9 and 11 and FIGS. 12A and 12B, the first fixing member 130 is disposed in the inner case 110. The first fixing member 130 has an overall cylindrical shape. The first fixing member 130 has a first cavity 133a and a second cavity 133b. The magnetic body 140 in FIG. 9 is disposed in the first cavity 133a, and one end of the ferrite core 121 of the inductor unit 120 in FIG. 9 is disposed in the second cavity 133b. A partition wall 132 is disposed between the first cavity 133a and the second cavity 133b, and the partition wall 132 has a through-hole 132h through which the core body 102 passes.

The inductor unit 120 is disposed at one side of the first fixing member 130, and the second fixing member 190 is spaced at a predetermined distance from the other side of the first fixing member 130.

The plurality of first protrusions 131 that are described above may be disposed on an outer surface of the first fixing member 130.

A plurality of first grooves 135 in which a plurality of extension parts 171 are disposed, respectively, may be formed in the outer surface of the first fixing member 130. Also, a second groove 137 formed along the longitudinal direction to maintain a constant distance with the extension coils 125a and 125b illustrated in FIG. 11 may be formed in the outer surface of the first fixing member 130.

Referring to FIGS. 9 and 11 and FIGS. 13A and 13B, the moving member 170 is disposed between the first fixing member 130 and the second fixing member 190. The moving member 170 may perform a linear reciprocating movement between the first fixing member 130 and the second fixing member 190 in conjunction with a longitudinal movement of the core body 102.

The moving member 170 is disposed in the inner case 110. The moving member 170 has an overall cylindrical shape. The moving member 170 includes a first cavity 173a and a second cavity 173b. A portion of the first elastic member 180 in FIG. 9 is disposed in the first cavity 173a, and a portion of the cover member 150 in FIG. 9 is disposed in the second cavity 173b. A partition wall 172 is disposed between the first cavity 173a and the second cavity 173b, and the partition wall 172 is disposed between the cover member 150 and the first elastic member 180.

The plurality of extension parts 171 disposed in the plurality of first grooves 135 are disposed on the outer surface of the moving member 170. The plurality of extension parts 171 may each have a shape extending along the longitudinal direction and be moved along the first grooves 135 of the first fixing member 130.

A plurality of second grooves 175 in which the second extension parts 193 of the second fixing member 190 in FIGS. 14A and 14B are disposed, respectively, may be formed on the outer surface of the moving member 170. As the moving member 170 performs the linear reciprocating movement along the longitudinal direction, the second grooves 175 are also moved accordingly. Thus, a position of the second extension parts 193 of the second fixing member 190 disposed in the second grooves 175 may be changed.

The second groove 175 of the moving member 170 may have a shape corresponding to the second extension part 193 of the second fixing member 190. The second groove 175 may have a shape that prevents the second extension part 193 of the second fixing member 190 from completely separated from the second groove 175 when the moving member 170 is moved away from the second fixing member 190. To this end, the second groove 175 may have a shape having a width that gradually decreases in a direction toward the second fixing member 190, and the second extension part 193 of the second fixing member 190 may have a shape that protrudes in a width direction of the second groove 175.

A first groove 177 may be formed in the outer surface of the moving member 170. The first groove 177 may be elongated in the longitudinal direction, and the connection terminals 165a and 165b may be disposed in the first groove 177 as illustrated in FIG. 16B. The first groove 177 may fix and guide a position of the connection terminals 165a and 165b. Also, the first extension part 192 of the second fixing member 190 may be disposed in the first groove 177 together with the connection terminals 165a and 165b.

Since the moving member 175 is disposed between the first fixing member 130 and the second fixing member 190, an extension part 171 of the moving member 170 is disposed in the first groove 135 of the first fixing member 130, and first and second extension parts 193 and 199 of the second fixing member 190 are disposed in the first and second grooves 175 and 177 of the moving member 170, the moving member 175 may not be separated to the outside even during frequent movements.

The moving member 170 may include one surface 179 in which the first cavity 173a is defined, and the ring terminal 161 in FIGS. 9 and 15 may be disposed on the one surface 179. The one surface 179 may have a shape corresponding to that of the ring terminal 161. The ring terminal 161 disposed on the one surface 179 may be guided by an inner surfaces of at least one extension part 171 disposed therearound.

Referring to FIGS. 9, 11, 14A and 14B, the second fixing member 190 is fixed in the housing 101. At least a portion of the second fixing member 190 is fixed in the inner case 110.

The second fixing member 190 includes a cylindrical base portion 191. One surface 191a of the base portion 191 has a cavity 195 in which a portion of the first elastic member 180 in FIG. 9 is disposed. The second elastic member 185 in FIG. 9 is disposed on the one surface 191a of the base portion 191.

The second fixing member 190 includes a first extension part 199 and a second extension part 193, each of which extends from the one surface of the base portion 191 towards the moving member 170. A plurality of first extension parts 199 and a plurality of second extension parts 193 may be disposed on the one surface 191a of the base portion 191. Specifically, two first extension parts 199 may be disposed to face each other, and two second extension parts 193 may be disposed to face each other. The plurality of first and second extension parts 191 and 199 guide an outer surface of the second elastic member 185 in FIG. 9 from all directions. Thus, a position of the second elastic member 185 may be fixed by the plurality of first and second extension parts 191 and 199.

The first extension part 199 may have an inner surface that guides an outer surface of the second elastic member 185 and an outer surface that supports a portion of the connection terminals 165a and 165b in FIGS. 9 and 11.

The second extension part 193 has a predetermined shape so as not to be separated from the second groove 175 after being coupled to the second groove 175 of the moving member 170. For example, the second extension part 193 may have a shape in which at least a portion protrudes to prevent separation from the second groove 175.

The second fixing member 190 may have a groove 194 defined in an outer surface of the base portion 191. A bottom surface of the groove 194 may be connected to the outer surface of the first extension part 199 without a stepped portion. A portion of the connection terminals 165a and 165b in FIGS. 9 and 11 may be disposed in the groove 194.

The second fixing member 190 may include a seat portion 196 that extends along the longitudinal direction from the other surface (not shown) of the base portion 191. The seat portion 196 may have a cavity 197 in which the substrate 210 in FIGS. 9 and 11 is disposed.

The second fixing member 190 may have an opening 198 for connecting the connection terminals 165a and 165b in FIGS. 9 and 11 to the substrate 210 disposed in the cavity 197. The other ends of the connection terminals 165a and 165b may be disposed in the opening 198 and connected to the connection pads 211a and 211b of the substrate 210.

Referring to FIGS. 9, 11, and 15 and FIGS. 16A and 16B, the core body 102 may extend a predetermined length in the longitudinal direction, and one end thereof may have a sharp shape. Here, the one end is exposed to the outside of the housing 101.

The core body 102 includes a stepped portion 102T disposed on one portion of the intermediate portion between one end and the other end. One end and the other end of the intermediate portion may have different thicknesses based on the stepped portion 102T. Based on the stepped portion 102T, the one end of the intermediate portion may have a first thickness D1 greater than a second thickness D2 of the other end of the intermediate portion. The above-described stepped portion 102T allows the magnetic body 140 to be move together when the core 140 is moved along the longitudinal direction by external force. That is, when the core body 102 is moved, the stepped portion 102T may push one surface of the magnetic body 140 to move the magnetic body 140 in the longitudinal direction. As the magnetic body 140 is moved along the longitudinal direction, a spaced distance between the inductor unit 120 and the magnetic body 140 is changed. The change in distance changes a value of the inductance L of the inductor unit 120, and the change in value of the inductance changes the resonance frequency of the stylus pen 100. The stylus pen sensing device that interacts with the stylus pen 100 may sense a variation in the resonance frequency to detect a pen pressure (pressure) applied to the core body 102.

The magnetic body (140) is disposed in the first cavity 133a of the first fixing member 130 in FIGS. 12A and 12B and has a cylindrical shape. Also, the magnetic body 140 has a through-hole through which a portion of the core body 102 passes. The through-hole may have a diameter equal to or greater than the second thickness D2 and less than the first thickness D1.

The magnetic body 140 may be a ferrite chip.

The magnetic body 140 may perform a linear reciprocating movement along the longitudinal direction in conjunction with the core body 102. As the magnetic body 140 is moved in conjunction with the core body 102, the value of the inductance L of the inductor unit 120 may be varied.

A cover part 161 is disposed at the other end of the core body 102. The cover part 161 may have a shape covering the other end of the core body 102. For example, the cover part 161 may have a cylindrical shape having different thicknesses at upper and lower portions.

The elastic member 155 may be disposed between the cover part 161 and the magnetic body 140. The elastic member 155 may be a spring. The elastic member 155 may have one end that is inserted into a portion of the cover part 161 and the other end and the other end that is in contact with the magnetic body 140.

The elastic member 155 may compensate a deviation of the magnetic body 140. For example, when a length (or height) of the magnetic body 140 is less by 0.1 mm than a specification, the elastic member 155 allows the magnetic body 140 to be in close contact with the partition wall 132 of the first fixing member 130.

The ring terminal 161 is a hollow circle and electrically connects two connection terminals 165a and 165b. Here, the embodiment of the present invention is not limited to the shape of the ring terminal 161. For example, the ring terminal 161 may have a polygonal shape.

The ring terminal 161 is disposed on one surface of the moving member 170 and operates in conjunction with the moving member 170. That is, the ring terminal 161 is moved together with the linear reciprocating movement of the moving member 170 in the longitudinal direction.

Each of the connection terminals 165a and 165b includes one end that contacts or separates from the ring terminal 161 and the other end connected to the substrate 210. The one end may contact or separate from the ring terminal 161 by a movement of the ring terminal 161 that operates in conjunction with the moving member 170. The other end is directly connected to the connection pads 211a and 211b of the substrate 210 in FIG. 9 through soldering and the like.

The connection terminals 165a and 165b include a base portion disposed between the one end and the other end. This base portion may have a shape extending in the longitudinal direction. The base portion may be disposed in the first groove 177 of the moving member 170 in FIGS. 13A and 13B and in the groove 194 of the second fixing member 190 in FIGS. 14A and 14B. The base portion may be guided by the first extension part 199 of the second fixing member 190.

The first elastic member 180 is disposed in the second fixing member 190. The first elastic member 180 may have a cylindrical shape that is elongated in the longitudinal direction. The first elastic member 180 may be made of a rubber material.

The first elastic member 180 may have one end disposed in the cavity 195 of the second fixing member 190 in FIGS. 14A and 14B and the other end disposed in the first cavity 173a of the moving member 170 in FIGS. 13A and 13B.

The second elastic member 185 is disposed in the second fixing member 190. The second elastic member 185 may have a flat cylindrical shape. The second elastic member 185 may be made of a rubber material. The second elastic member 185 may be made of a rubber material that is harder relative to that of the first elastic member 180. Thus, the second elastic member 185 may be made of a hard rubber material, and the first elastic member 180 may be made of a soft rubber material.

On the other hand, the second elastic member 185 may be a spring. The second elastic member 185 may be a spring configured to respond to relatively heavier force than the first elastic member 180.

The second elastic member 185 has a thickness in the longitudinal direction, which is less than that of the first elastic member 180, and a diameter in the vertical direction, which is greater than that of the first elastic member 180.

The second elastic member 185 is disposed to surround an intermediate portion of the first elastic member 180. Thus, the second elastic member 185 has a through-hole through which the first elastic member 180 passes.

As illustrated in FIG. 16B, the second elastic member 185 may have a groove 185g that is inserted into a portion of the first extension part 199 of the second fixing member 190. Through this, the second elastic member 185 may be stably fixed to the second fixing member 190.

Hereinafter, an operation of the stylus pen 100 according to an embodiment in FIGS. 9 to 16B will be described with reference to FIGS. 17A to 17C.

FIGS. 17A to 17C are views for explaining the operation of the stylus pen 100 in FIGS. 9 to 16B. Specifically, FIG. 17A is a view illustrating a hover state H of the stylus pen 100, FIG. 17B is a view illustrating a contact state C of the stylus pen 100, and FIG. 17C is a view illustrating a pen pressure state P of the stylus pen 100.

Referring to FIG. 17A, since external force is not applied to the core body 102 in the hover state H, the inner components are not changed. In particular, the ring terminal 161 and the connection terminals 165a and 165b maintain a contact state therebetween.

Referring to FIG. 17B, in the contact state C, a predetermined pressure is applied to one end of the core body 102.

The applied pressure causes the core body 102 to be moved in an inward direction of the housing 101. As the core body 102 is moved, the cover part 150 pushes the moving member 170 towards the first elastic member 180, and the ring terminal 161 is separate from the connection terminals 165a and 165b. Accordingly, the jumping capacitor 215 in FIG. 9 is electrically disconnected from the basic capacitor, and overall capacitance of the capacitor unit (not shown) decreases. Here, since the magnetic body 140 is not moved, the value of the inductance of the inductor unit 120 remains unchanged. Since the overall capacitance value of the capacitor unit (not shown) decreases, the resonance frequency is varied.

Referring to FIG. 17C, in the pen pressure state P, greater pressure is applied to one end of the core body 102 than that in the contact state C. The greater pressure causes the core body 102 to be moved further in an inward direction of the housing 101. Accordingly, the magnetic body 140 is pushed by the stepped portion 102T of the core body 102. As the magnetic body 140 is pushed, the elastic body 155 disposed between the cover part 150 and the magnetic body 140 is pressed, and as the moving member 170 is moved, the first elastic member 180 and the second elastic member 185 are pressed. Here, since the magnetic body 140 is moved away from the inductor unit 120, the value of the inductance L of the inductor unit 120 gradually decreases. Here, the capacitance of the capacitor unit (not shown) remains the same as that in the contact state C. Since the value of the inductance of the inductor unit 120 decreases, the resonance frequency is varied.

Figure 18A:
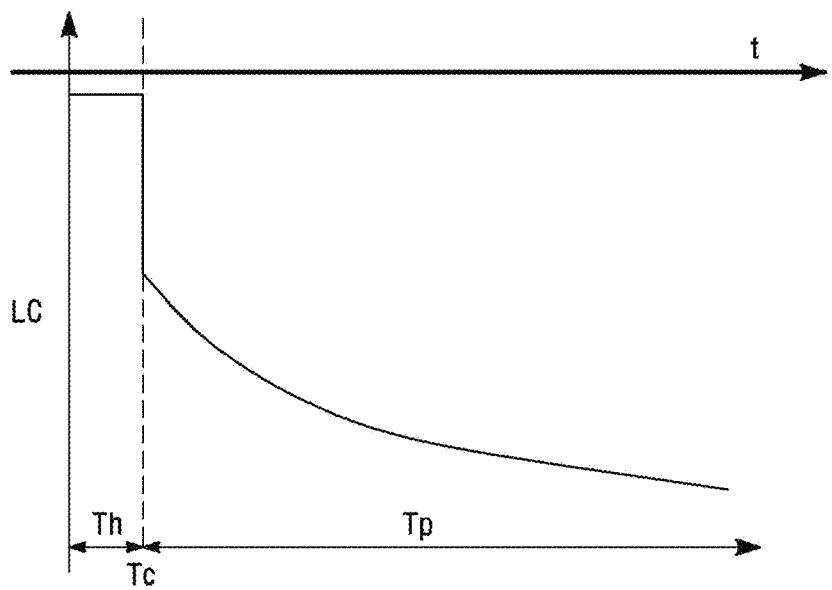
FIG. 18A is a view illustrating a variation in LC value of a resonance circuit unit according to operations in FIGS. 17A to 17C.
Figure 18B:
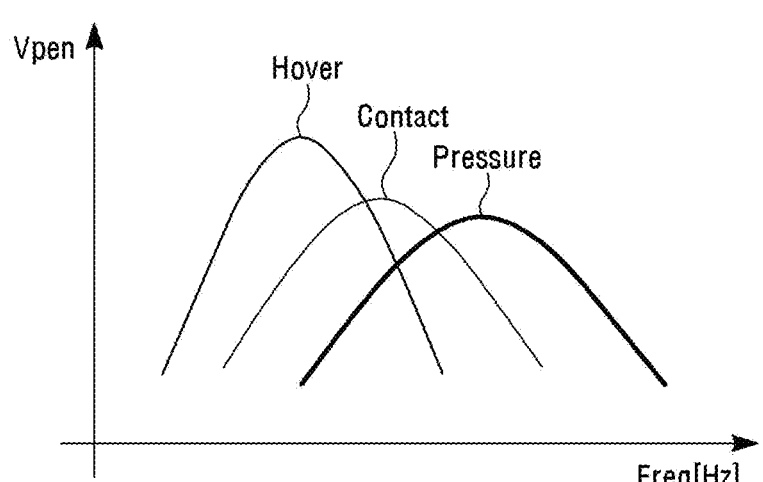
FIG. 18B is a graph showing frequency characteristics in each of operating states of FIGS. 17A to 17C.

FIG. 18A is a view illustrating a variation in LC value of the resonance circuit unit according to the operations in FIGS. 17A to 17C. Here, a Th period represents the hover state of FIG. 17A, a Tc point represents the contact state of FIG. 17B, and a Tp period represents the pressure state of FIG. 17C. FIG. 18B is a graph showing frequency characteristics in each of the operating states of FIGS. 17A to 17C.

Referring to FIG. 18A, a LC value of the resonance circuit unit including the capacitor unit (not shown) and the inductor unit 120 maintains a constant value before Th the core body 102 of the stylus pen 100 contacts a touch surface Th and significantly decreases directly after Tc the core body 102 contacts the touch surface Tc. Also, in the period Tp in which pen pressure is applied to the stylus pen 100 after the stylus pen 100 contacts the touch surface, the LC value of the resonance circuit unit decreases further according to the pen pressure. That is, in this period Tp, as the pen pressure applied to the stylus pen 100 increases, the LC value of the resonance circuit unit may gradually decrease. Referring to FIG. 18A, the LC value of the resonance circuit unit shows hover state>contact state>pen pressure state. Also, immediately after the core body 102 contacts the touch surface, an amount of variation in LC value is more significant in a state in which the pen pressure gradually increases.

When the value of the inductance of the inductor unit 120 and the value of the capacitance of the capacitor unit (not shown) are varied, the resonance frequency and the Q value of the resonance circuit unit may be also varied. The resonance frequency of the resonance circuit unit increases as the inductance of the resonance circuit unit decreases, and the Q value decreases as the inductance decreases. Thus, as illustrated in FIG. 18B, frequency characteristics of a resonance signal Vpen output from the resonance circuit unit may show that, as a movement distance of the core body 102 increases, i.e., the pen pressure increases, the resonance frequency increases (hover state<contact state<pen pressure state), and the Q value decreases (hover state>contact state>pen pressure state).

When the resonance frequency of the resonance circuit unit is varied, a phase of the electromagnetic signal output from the stylus pen 100 is changed. The stylus pen sensing device that interacts with the stylus pen 100 may calculate the variation in the LC value of the resonance circuit unit, and based on this, whether the stylus pen 100 is in contact with the stylus pen sensing device and the pen pressure thereof may be detected.

As described above, the stylus pen 100 according to an embodiment in FIGS. 9 to 16B may change at least one or both of the inductance value and the capacitance value of the resonance circuit unit to detect the pen pressure in the stylus pen sensing device. Also, the stylus pen 100 may have an advantage of sensing precise pressure.

On the other hand, the stylus pen according to an embodiment in FIGS. 9 to 16B may have an assembly deviation during an assembly process. Since the assembly deviation may cause a predetermined limitation, the assembly deviation will be described in detail below with reference to FIGS. 19A to 21C.

Figure 19A:
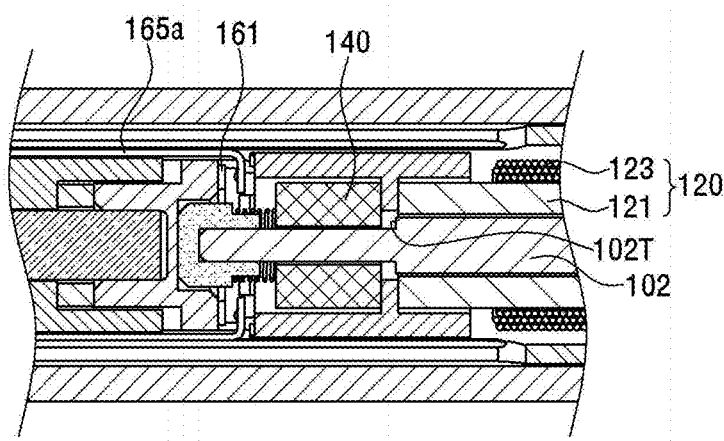
FIGS. 19A to 19C are views for explaining a limitation caused by an assembly deviation of a core body 102 when the stylus pen 100 in FIGS. 9 to 17C is assembled.
Figure 19B:
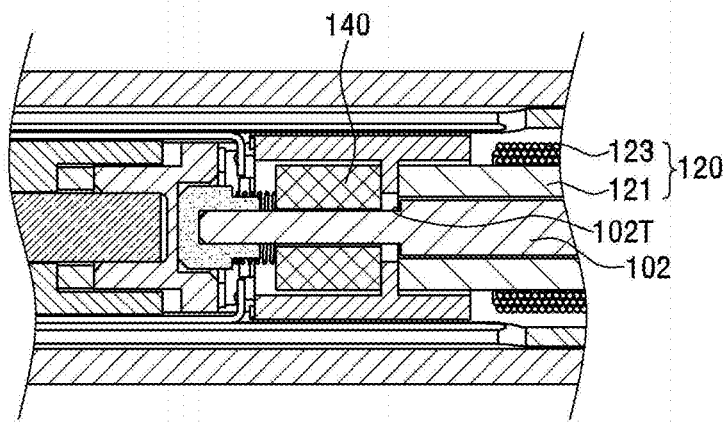
Figure 19C:
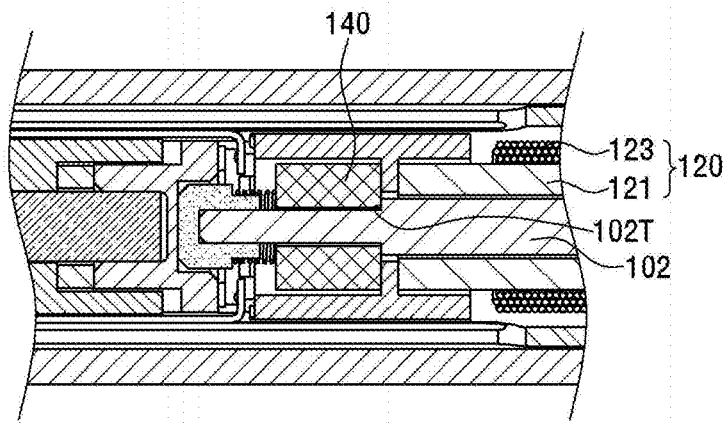

FIGS. 19A to 19C are views for explaining a limitation caused by an assembly deviation of a core body 102 when the stylus pen 100 in FIGS. 9 to 17C is assembled.

Specifically, FIG. 19A shows a case in which the core body 102 is mounted as designed in advance without the assembly deviation, and FIGS. 19B and 19C show a case in which the core body 102 is not mounted in a designed position by an assembly deviation occurring during the assembly process.

In FIG. 19A, the stepped portion 102T of the core body 102 is disposed in the through-hole 132h formed in the partition wall 132 of the first fixing member 130. A position of the stepped portion 102T is assembled correctly without any deviation. On the other hand, in FIGS. 19B and 19C, the stepped portion 102T is disposed at a different position instead of the through-hole 132h of the partition wall 132. Specifically, the stepped portion 102T is disposed in the second cavity 133b (refer to FIG. 12B) of the first fixing member 130, in which the inductor unit 120 is disposed, in FIG. 19B, and the stepped portion 102T is disposed in the first cavity 133a (refer to FIG. 12A) of the first fixing member 130, in which the magnetic body 140 is disposed, in FIG. 19C.

When the assembly deviation occurs as in FIG. 19C, pressure is continuously applied to the core body 102 immediately after the contact state in FIG. 17B, the inductance value of the inductor unit 120 is not changed immediately because a distance between the inductor unit 120 and the magnetic body 140 is constant. On the other hand, in case of FIG. 19C, as the magnetic body 140 is moved by the core body 102 between the hover state of FIG. 17A and the contact state of FIG. 17B, the inductance value of the inductor unit 120 may be varied.

The variation in resonance frequency according to the pressure applied to the core body 102 in each of FIGS. 19A to 19C will be described with reference to FIG. 20.

Figure 20:
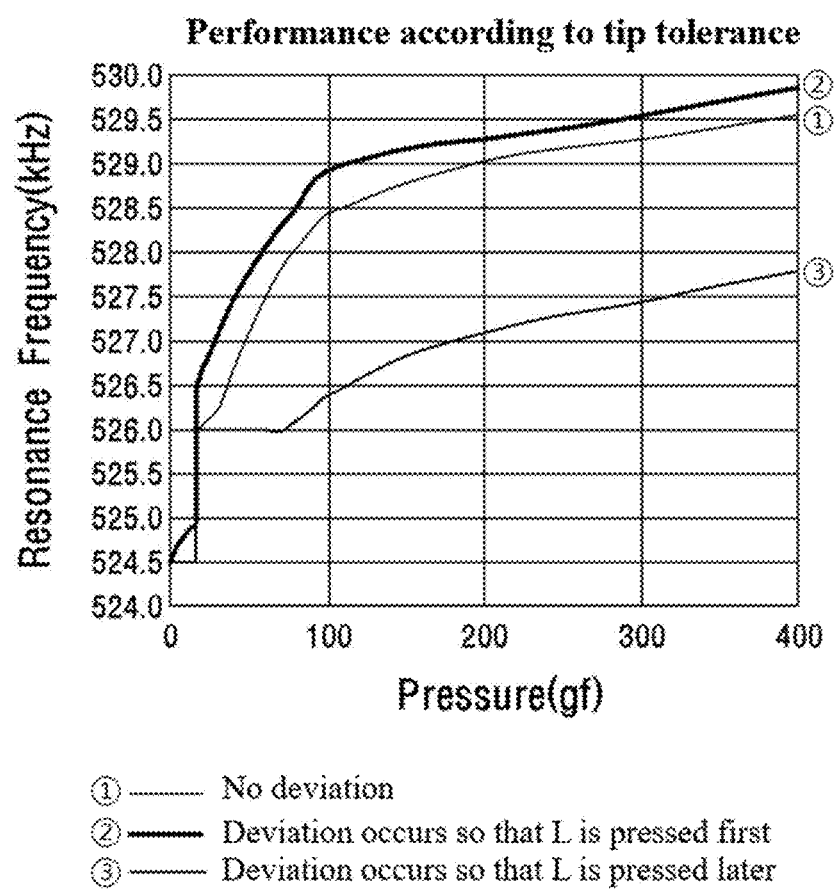
FIG. 20 is a graph showing a variation in resonant frequency according to pressure applied to the core body 102 in each of FIGS. 19A to 19C.

In a graph of FIG. 20, line ① corresponds to FIG. 19A without an assembly deviation, line ② corresponds to FIG. 19C with the assembly deviation, and line ③ corresponds to FIG. 19B with the assembly deviation.

Referring to FIG. 20, in case of line 3, the resonance frequency is not varied although the pressure applied to the core body 102 increases immediately after the contact state. Thus, the stylus pen sensing device that interacts with the stylus pen 100 may not detect the pen pressure applied to the core body 102. In case of line ②, since the resonance frequency is varied even in the hover state, the stylus pen sensing device may recognize the core body 102 as being in the contact state instead of the hover state. As described above, due to the assembly deviation in FIGS. 19B and 19C, the stylus pen sensing device may not accurately detect the stylus pen 100.

Figures 21A, 21B, 21C:
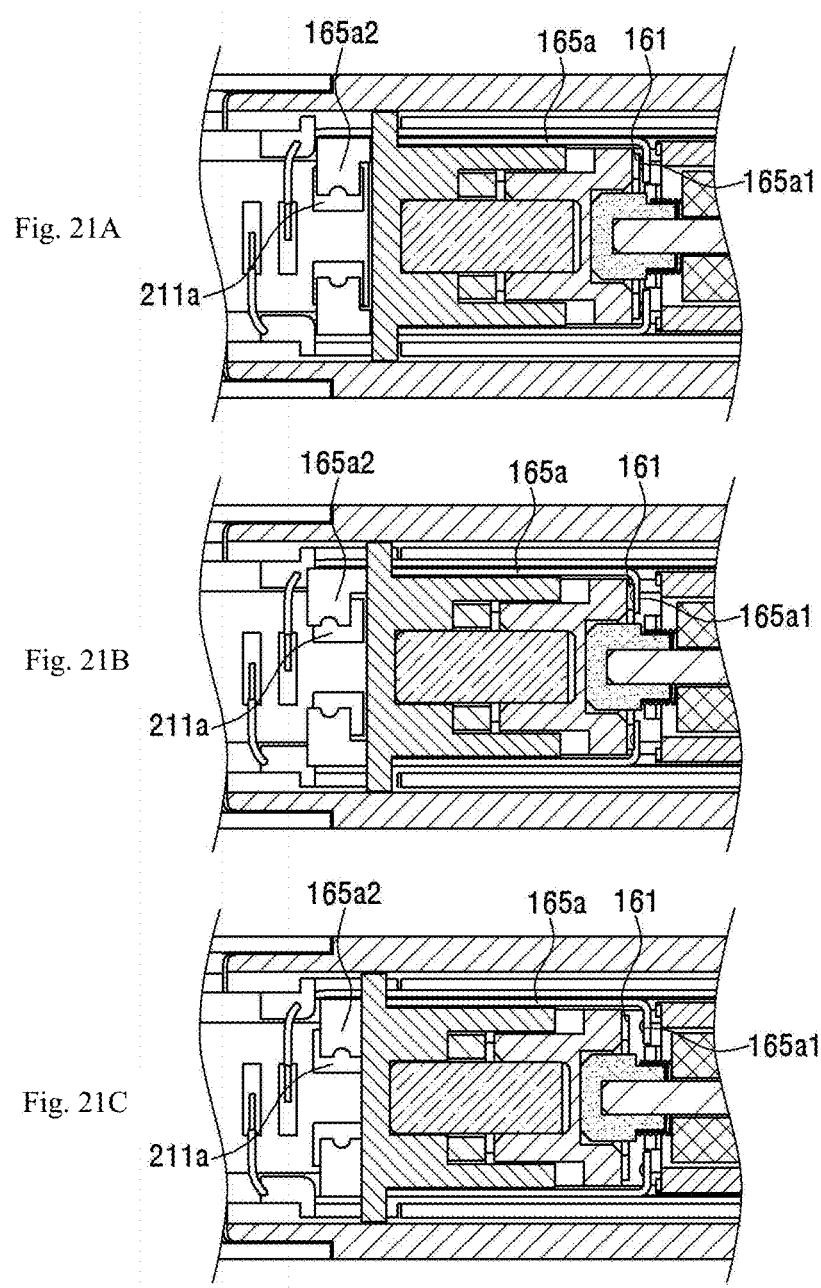
FIGS. 21A to 21C are views for explaining a limitation caused by an assembly deviation of connection terminals 165a and 165b occurring when the stylus pen 100 in FIGS. 9 to 17C is assembled.

FIGS. 21A to 21C are views for explaining a limitation caused by an assembly deviation of the connection terminals 165a and 165b occurring when the stylus pen 100 in FIGS. 9 to 17C is assembled.

Specifically, FIG. 21A shows a case in which the connection terminals 165a and 165b are mounted as designed without any assembly deviation, and FIGS. 21B and 21C show cases in which the connection terminals 165a and 165b are not mounted at designed positions due to the assembly deviation.

In FIG. 21A, one end 165a1 of the connection terminal 165a is in contact with the ring terminal 161, and the other end 165a2 is in contact with the connection pad 211a of the substrate 210. A position of the connection terminal 165a is assembled correctly without any deviation. On the other hand, in FIGS. 21B and 21C, the connection terminal 165a is disposed at a different position instead of a designed position due to the assembly deviation. Specifically, in FIG. 21B, as the connection terminal 165a is offset by a predetermined distance towards the substrate 210, the one end 165a1 presses the ring terminal 161 with considerable force. In FIG. 21C, as the connection terminal 165a is offset by a predetermined distance towards the first fixing member 130, the one end 165a1 is spaced a predetermined distance from the ring terminal 161.

When the assembly deviation occurs as in FIG. 21B, since the connection terminal 165a and the ring terminal 161 are assembled in a state of being pressed by each other, there is a limitation in that pressure increases to recognize the contact state in FIG. 17B. On the other hand, in case of FIG. 21C, the ring terminal 161 and the connection terminal 165a are separated from the hover state of FIG. 17A, the stylus pen sensing device may not sense the contact state of FIG. 17B although pressure is applied to the core body 102.

Hereinafter, a stylus pen according to another embodiment, which is not significantly affected in performance although the assembly deviation described with reference to FIGS. 19A to 21C occurs and reduced in manufacturing cost by reducing the number of inner components, will be described with reference to FIGS. 22 to 26.

Figure 22:
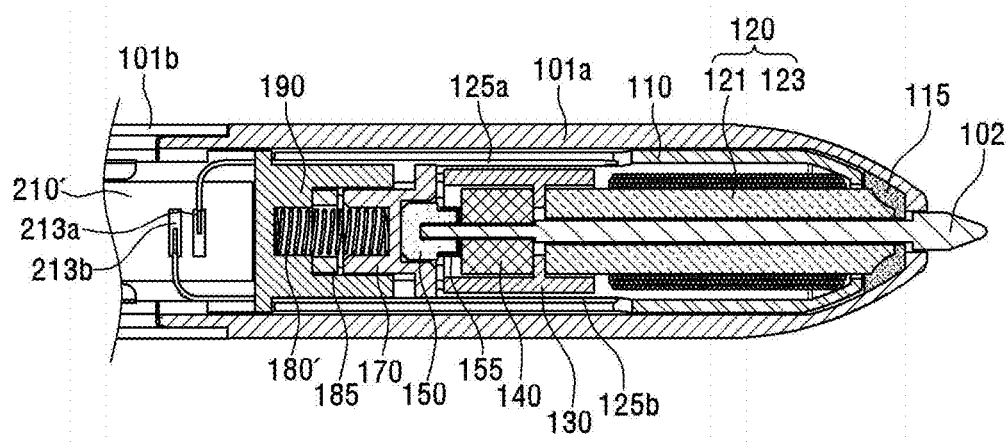
FIG. 22 is a cross-sectional view illustrating a portion of a stylus pen according to a modified embodiment of the stylus pen 100 in FIG. 3.

When compared with the stylus pen 100 in FIGS. 9 to 17, the stylus pen in FIG. 22 is different in that: 1) a first elastic member 180' is made of a spring instead of a rubber material, and 2) the ring terminal 161, the connection terminals 165a and 165b, the jumping capacitor 215, and components for electrical connection therebetween of the stylus pen 100 in FIGS. 9 to 17 are omitted. Since the rest components except for the above-described components are the same as those of the stylus pen 100 in FIGS. 9 to 17, a detailed description thereof will be replaced with the above description, and only different components will be described in detail below.

Referring to FIG. 22, the first elastic member 180' includes a spring. The first elastic member 180' may be pressed even under low pressure (e.g., about 10 gf) and disposed to be pressed quickly even when pressure slightly increases due to a low compression strength thereof.

Figure 23A:
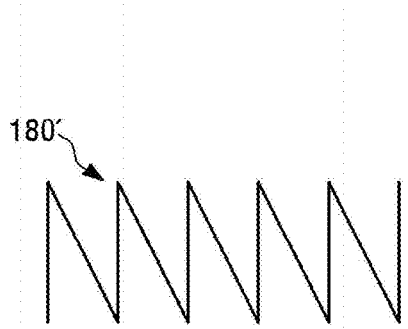
FIGS. 23A and 23B are views for explaining a first elastic member 180' in FIG. 22.
Figure 23B:
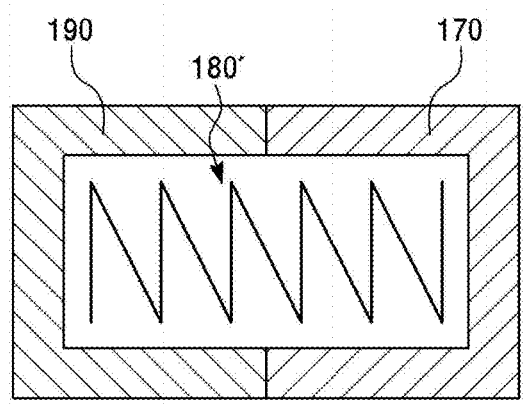

FIGS. 23A and 23B are views for explaining the first elastic member 180' in FIG. 22. FIG. 23A is a view illustrating a state in which no force is applied to the first elastic member 180', and FIG. 23B is a view illustrating a state in which the first elastic member 180' is disposed between the moving member 170 and the second fixing member 190 in FIG. 22.

As illustrated in FIG. 23B, the first elastic member 180' is inserted between the moving member 170 and the second fixing member 190 in a partially pressed (or incompletely pressed) state. The first elastic member 180' is not pressed unless force (or repulsive force) greater than the pressed force applied by the moving member 170 and the second fixing member 190. Here, the force (or repulsive force) may be, e.g., about 10 gf. On the other hand, the second elastic member 190 is pressed when force greater than the applied pressed force is applied through the moving member 170.

Below is <Mathematical equation 1> that represents force F (or repulsive force) of the partially pressed first elastic member 180'.

[Mathematical equation 1]

$$F = -kx = -\frac{Gd^4}{8NaD^3}x$$

where, G is a transverse elastic modulus of the spring, Na is an effective number of winding of the spring, D is a diameter of the spring, d is a diameter of a wire, and x is a pressed (−direction) length of the spring.

On the other hand, the first elastic member 180' in a non-pressed state may be disposed between the moving member 170 and the second fixing member 190. Thus, the stylus pen according to another embodiment of the present invention is not limited to the state in which a portion of the first elastic member 180' in a pressed state is disposed between the moving member 170 and the second fixed member 190.

The first elastic member 180' may be configured to respond to a relatively greater weight than the elastic body 155.

Hereinafter, an operation of the stylus pen according to another embodiment in FIGS. 22 to 23B will be described with reference to FIGS. 24A to 24C.

FIGS. 24A to 24C are view for explaining the operation of the stylus pen in FIGS. 22 and 23. Specifically, FIG. 24A is a view illustrating the hover state H of the stylus pen, FIG. 24B is a view illustrating the contact state C of the stylus pen, and FIG. 24C is a view illustrating the pen pressure state P of the stylus pen.

Referring to FIG. 24A, since external force is not applied to the core body 102 in the hover state H, the inner components are not changed.

Referring to FIG. 24B, in the contact state C, a predetermined pressure is applied to one end of the core body 102. The applied pressure causes the core body 102 to be moved in an inward direction of the housing 101. As the core body 102 is moved, the cover part 150 pushes the moving member 170 toward the first elastic member 180' up to the second elastic member 185. In this situation, the first elastic member 180' is pressed as much as the moving member 170 is pushed. Also, as the core body 102 is moved, the stepped portion 102T of the core body 102 pushes the magnetic body 140 towards the first elastic member 180'. As the magnetic body 140 is pushed, a distance between the inductor unit 120 and the magnetic body 140 is changed, and this changed distance changes the inductance value of the inductor unit 120 and resultantly changes the resonance frequency.

Referring to FIG. 24C, in the pen pressure state P, greater pressure is applied to one end of the core body 102 than that in the contact state C. The greater pressure causes the core body 102 to be moved further in the inward direction of the housing 101, and resultantly the magnetic body 140 is moved further away from the inductor unit 120. As the magnetic body 140 is moved, the elastic body 155 disposed between the cover part 150 and the magnetic body 140 is pressed, and the movement of the moving member 170 causes the first elastic member 180' to be further pressed and the second elastic member 185 to be also pressed. Here, since the magnetic body 140 is moved further away from the inductor unit 120, the inductance L value of the inductor unit 120 gradually decreases. Since the inductance value of the inductor unit 120 decreases, the resonance frequency is varied.

Figure 25A:
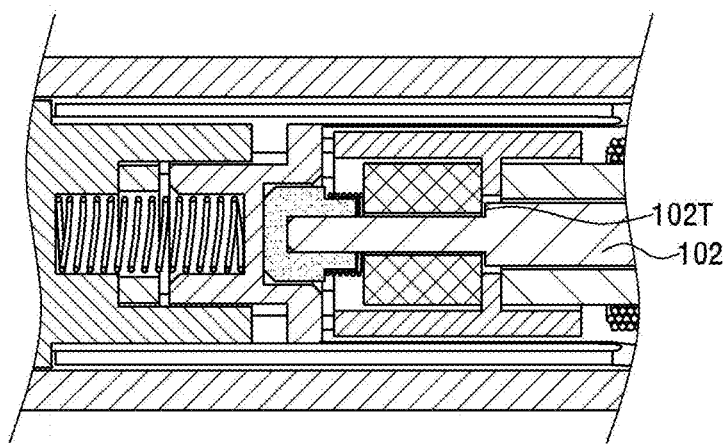
FIGS. 25A and 25B are views illustrating an example of an assembly deviation occurring in the core body 102.
Figure 25B:
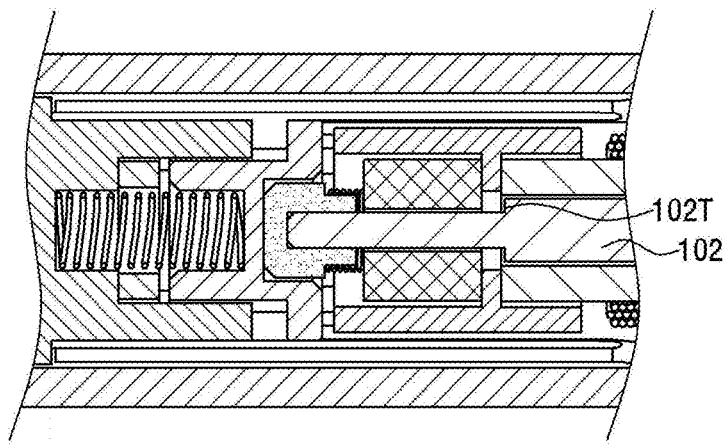
Figure 26:
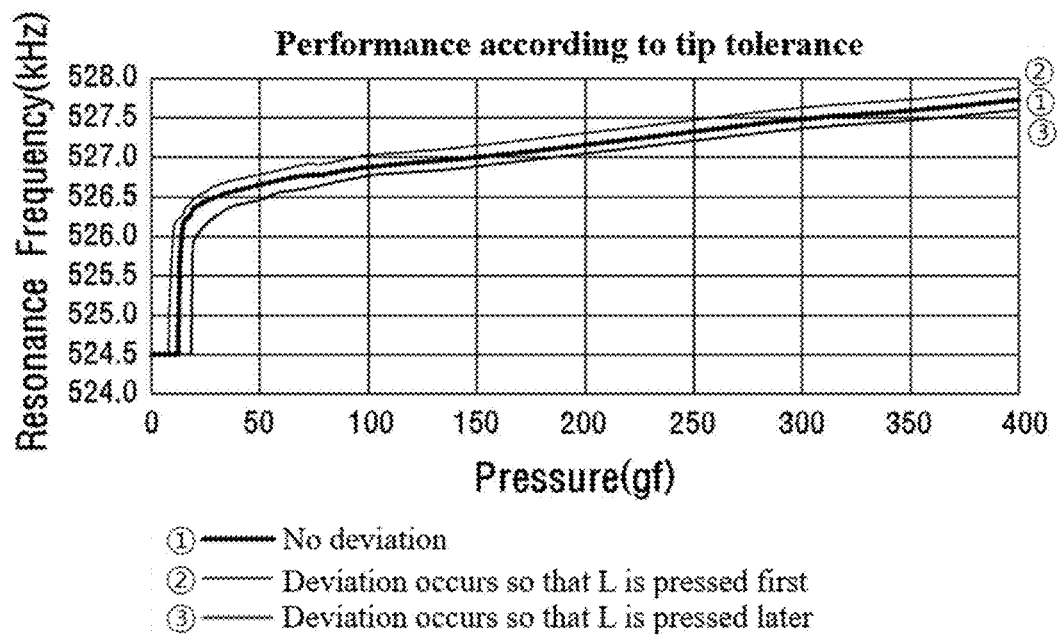
FIG. 26 is a graph showing a variation in resonant frequency according to pressure applied to the core body 102 in each of FIGS. 25A to 25C.

FIGS. 25A and 25B are views illustrating an example of the assembly deviation occurring in the core body 102, and FIG. 26 is a graph showing a variation of the resonance frequency according to the pressure applied to the core body 102 in each of FIGS. 25A and 25B.

FIG. 25A is a view illustrating a state in which the stepped portion 102T of the core body 102 is offset toward the magnetic body 140 due to the assembly deviation occurring during the assembly process, and FIG. 25B is a view illustrating a state in which the stepped portion 102T of the core body 102 is offset towards the inductor unit 120 due to the assembly deviation.

In a graph of FIG. 26, line ① corresponds to FIG. 22 that is a case without the assembly deviation, line ② corresponds to FIG. 25A; and line ③ corresponds to FIG. 25B.

Referring to FIG. 26, the stylus pen including the first elastic member 180' according to another embodiment of the present invention exhibits a minimal performance change in comparison with the case without the assembly deviation although the assembly deviation slightly occurs in the core body 102. Thus, the stylus pen has an advantageous aspect in mass production in comparison with the stylus pen 100 in FIG. 9.

Also, since the stylus pen in FIGS. 22 to 24C does not use components such as the jumping capacitor 215, the ring terminal 161, and the connection terminals 165a and 165b in the stylus pen 100 illustrated in FIGS. 9 to 16B, the stylus pen may have a simplified structure and a reduced manufacturing cost. Furthermore, components for arranging the connection terminals 165a and 165b, such as the groove 194 of the second fixing member 190 in FIGS. 14A and 14B and a portion of the first groove 177 of the moving member 170 in FIGS. 13A and 13B, are not required.

Although not shown in the drawing, the stylus pen according to another embodiment of the present invention may be configured such that the first elastic member 180 in the stylus pen 100 in FIG. 9 is replaced with the first elastic member 180' in FIGS. 22, 23A and 23B.

On the other hand, although not illustrated separately, the ferrite core 121 and the buffer member 115 in FIG. 4 may be directly applied to not only the stylus pen in FIGS. 9 to 26 but also typical stylus pens.

Figure 27:
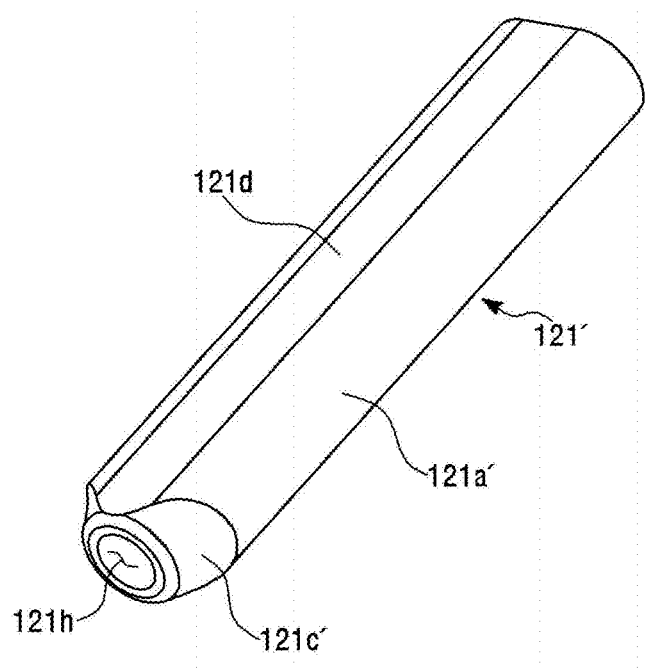
FIG. 27 is a perspective view of a modified example of a ferrite core 121 in FIGS. 4 to 5.
Figure 28:
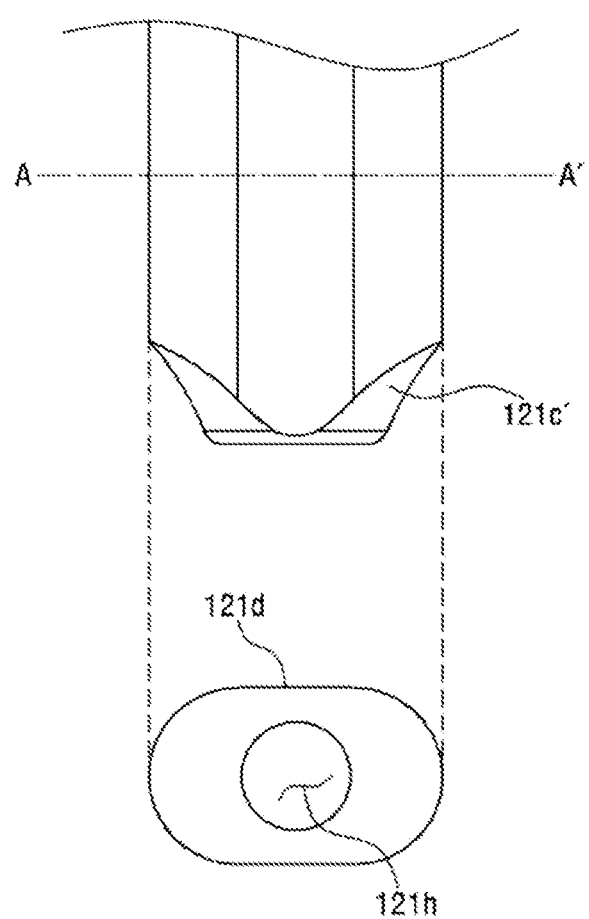
FIG. 28 is an enlarged front view illustrating a portion of a ferrite core 121' in FIG. 27, and a cross-sectional view taken along line A-A'.

FIG. 27 is a perspective view according to a modified example of the ferrite core 121 in FIGS. 4 and 5, FIG. 28 is an enlarged front view illustrating a portion of a ferrite core 121' in FIG. 27, and a cross-sectional view taken along line A-A'.

Referring to FIGS. 27 and 28, the ferrite core 121' has a cylindrical shape. A flat portion 121d may be disposed on at least a portion of an outer surface of the ferrite core 121'. Another flat portion corresponding to the flat portion 121d may be also disposed on another portion of the outer surface of the ferrite core 121'. The ferrite core 121' may be stably disposed in the housing by the flat portion 121d.

The ferrite core 121' has a cylindrical upper end 121a' and a cylindrical lower end 121b', and the lower end 121b' has at least two curved portions 121c'. The curved portions 121c' may each extend from the outer surface of the lower end 121b' to a portion adjacent to the through-hole 121h of the ferrite core 121'. The curved portions 121c' may be disposed at both sides, which face each other, of the lower end 121b' based on the through-hole 121h, respectively.

While the curved portion 121c of the ferrite core 121 in FIGS. 4 to 5 may be disposed over the entire outer surface of the lower end 121b', the curved portion 121c' of the ferrite core 121' in FIGS. 27 to 28 may be disposed on a portion of the outer surface of the lower end 121b'.

The flat portions 121d may be disposed on the upper end 121a' and the lower end 121b', respectively, and connected and continuously arranged. Here, the flat portion 121d disposed on the lower end 121b' may be disposed between two curved portions 121c' that are disposed to face each other on the outer surface of the lower end 121b'.

The ferrite core 121' in FIGS. 27 to 28 may be applied as a replacement to the stylus pen in FIGS. 9 to 26. In this case, a buffer member (not shown) may have a shape covering a portion of the lower end 121b' of the ferrite core 121'.

Figure 29:
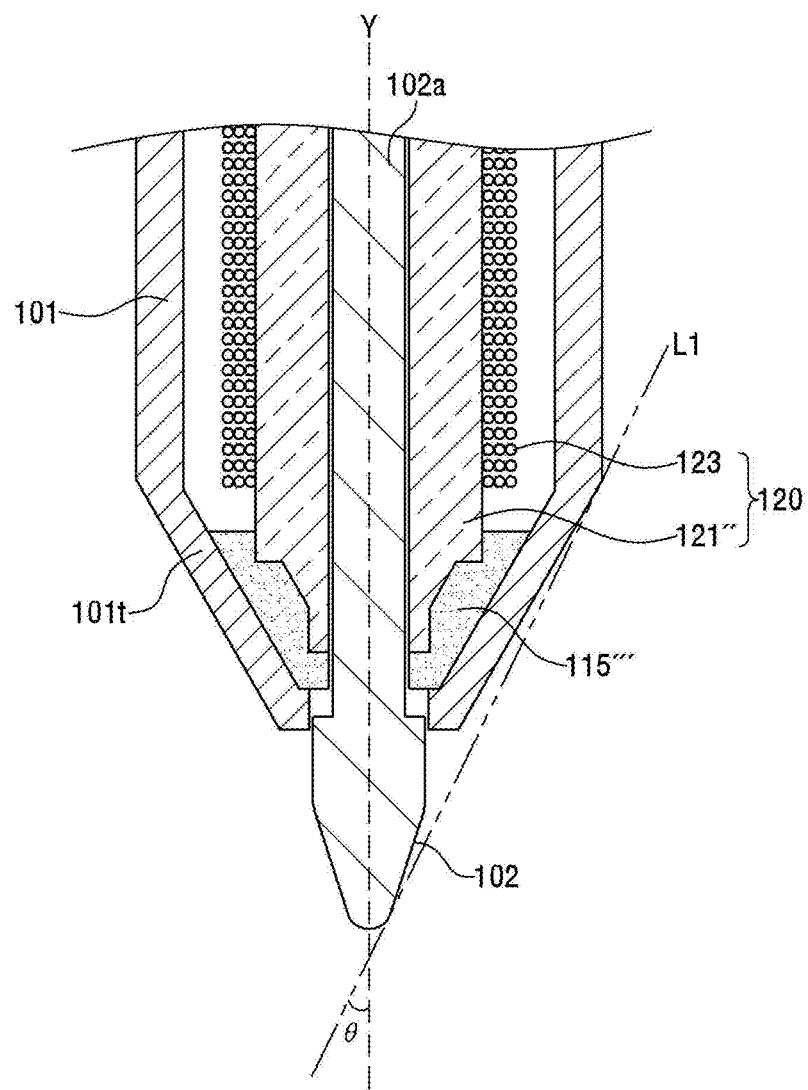
FIG. 29 is a cross-sectional view illustrating a stylus pen to which another modified example of the ferrite core 121 in FIG. 4 is applied.
Figure 30:
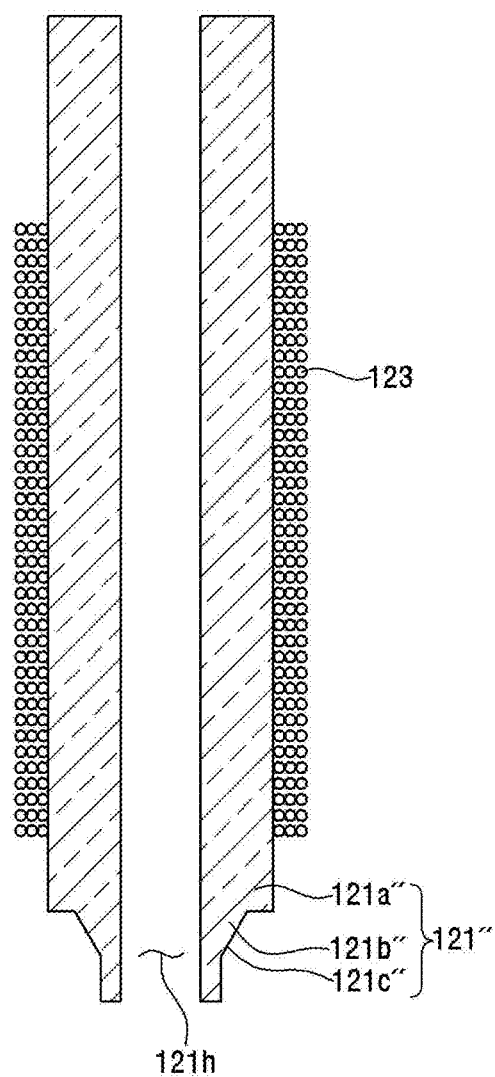
FIG. 30 is a cross-sectional view illustrating only a ferrite core 121" and a coil 123 in FIG. 29.
Figure 31:
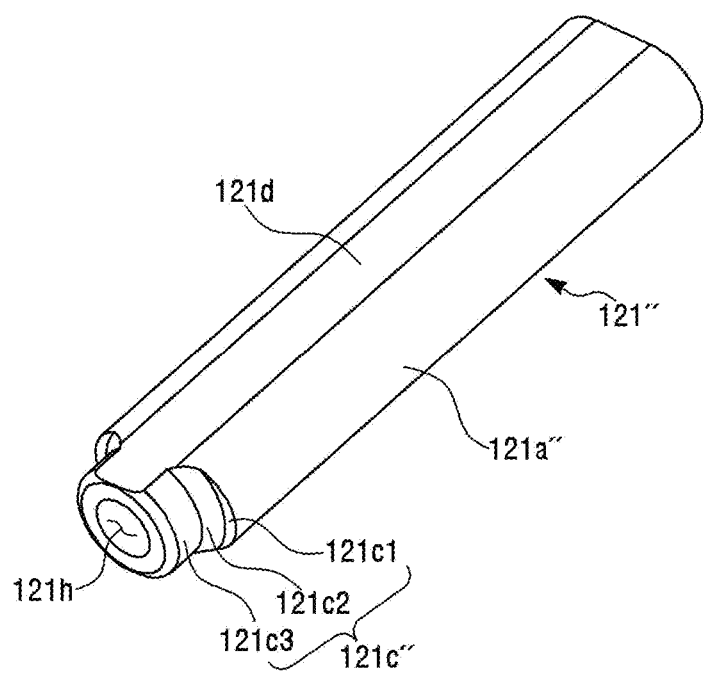
FIG. 31 is a perspective view illustrating the ferrite core 121" in FIGS. 29 to 30.
Figure 32:
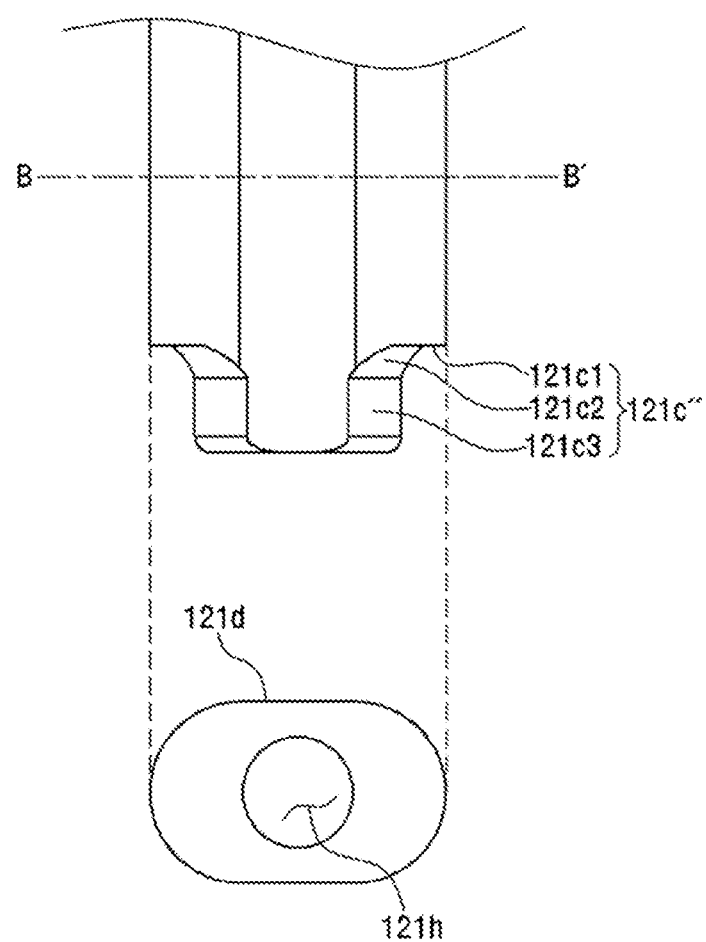
FIG. 32 is an enlarged front view illustrating a portion of the ferrite core 121" in FIG. 31, and a cross-sectional view taken along line B-B'.

FIG. 29 is a cross-sectional view illustrating a stylus pen to which another modified example of the ferrite core 121 in FIG. 4 is applied, FIG. 30 is a cross-sectional view illustrating only a ferrite core 121" and a coil 123 in FIG. 29, FIG. 31 is a perspective view illustrating the ferrite core 121" in FIGS. 29 to 30, FIG. 32 is an enlarged front view illustrating a portion of the ferrite core 121" in FIG. 31, and a cross-sectional view taken along the line B-B'.

Referring to FIGS. 29 to 31, the ferrite core 121" in another modified example includes an upper end 121a" and a lower end 121b".

The lower end 121b" has a tapered shape, and an outer surface of the lower end 121b" includes at least one stepped portion 121c".

The stepped portion 121c" may be disposed over the entire outer surface of the lower end 121b" or disposed on a portion (portions) of the outer surface as in FIGS. 31 to 32.

The stepped portion 121c" may include a first surface 121c1, a second surface 121c2 connected to the first surface 121c1, and a third surface 121c3 connected to the second surface 121c2. The first surface 121cl may be perpendicular to a direction in which a through-hole 121h passes, and the third surface 121c3 may be parallel to the direction in which the through-hole 121h passes. The second surface 121c2 may connect the first surface 121cl and the third surface 121c3. Here, although not shown in the drawing, the second surface 121c2 may be a curved surface that is curved inward or outward.

The ferrite core 121" has a cylindrical shape. A flat portion 121d may be disposed on at least a portion of the outer surface of the ferrite core 121". A flat portion corresponding to the flat portion 121d may be disposed on another portion of the outer surface of the ferrite core 121". The flat portion 121d may allow the ferrite core 121" to be stably disposed in the housing.

The flat portions 121d may be disposed on the upper end 121a" and the lower end 121b", respectively, and connected and continuously arranged. Here, the flat portion 121d disposed on the lower end 121b" may be disposed between two stepped portions 121c" that are disposed to face each other on the outer surface of the lower end 121b".

Since the ferrite core 121″ in FIGS. 29 to 32 includes the stepped portions 121c″, the ferrite core 121″ may have the same or similar effect as the ferrite core 121 in FIGS. 4 to 5.

The ferrite core 121″ in FIGS. 29 to 32 may be applied as a replacement to the stylus pen in FIGS. 9 to 26. In this case, the buffer member (not shown) may have a shape covering a portion of the lower end 121b″ of the ferrite core 121″.

Figure 33:
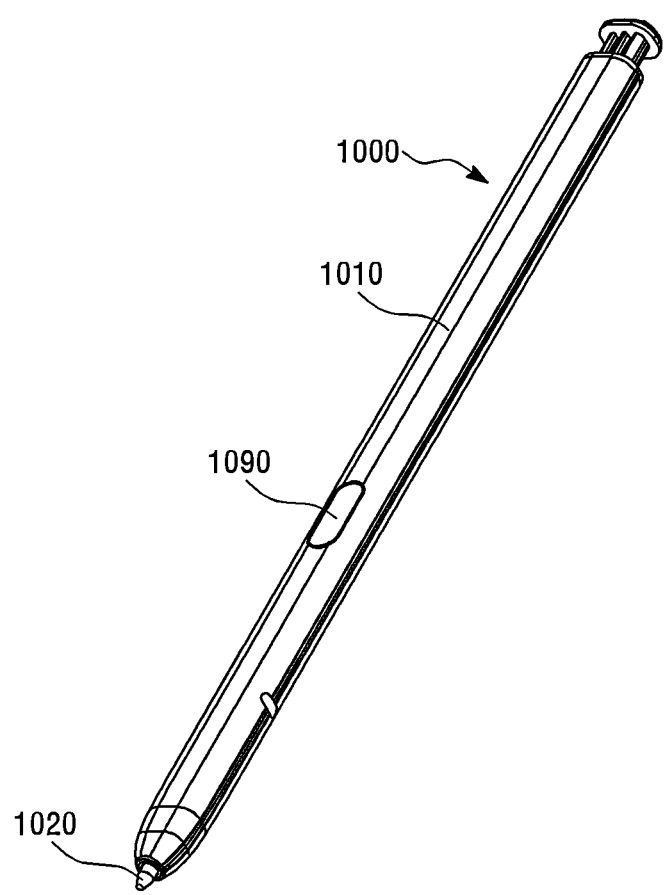
FIG. 33 is a perspective view illustrating a stylus pen 1000 according to another embodiment of the present invention.
Figure 34:
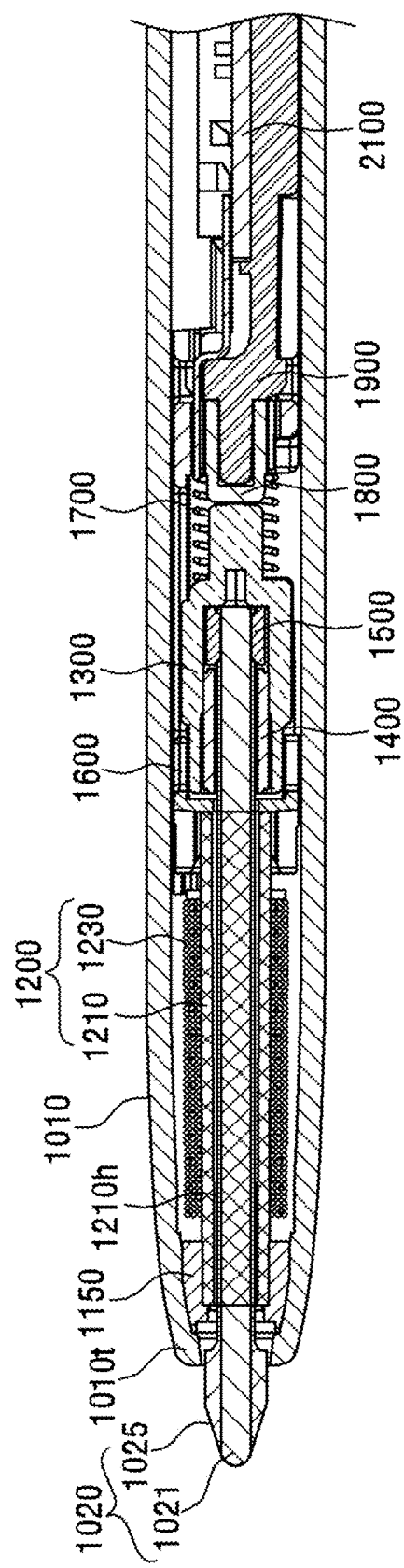
FIG. 34 is a cross-sectional view illustrating a portion of the stylus pen 1000 in FIG. 33.
Figure 35:
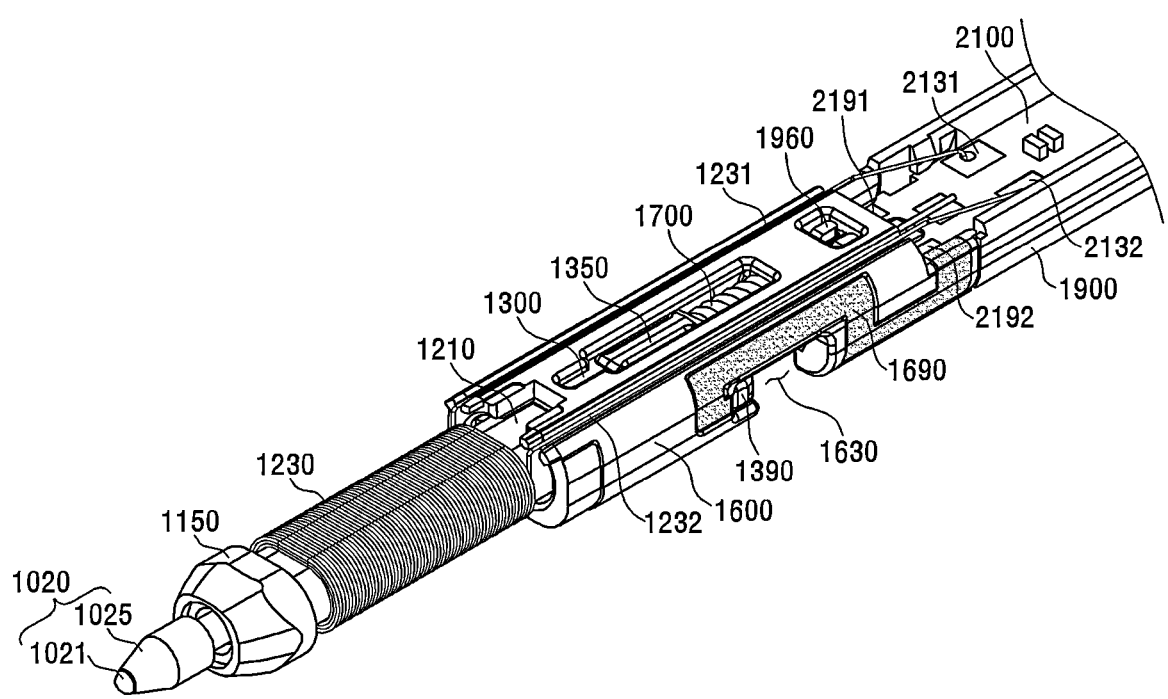
FIG. 35 is a perspective view illustrating a state in which a housing 1010 of the stylus pen 1000 in FIG. 33 is removed.

FIG. 33 is a perspective view illustrating a stylus pen 1000 according to another embodiment of the present invention, FIG. 34 is a cross-sectional view illustrating a portion of the stylus pen 1000 in FIG. 33, and FIG. 35 is a perspective view illustrating the stylus pen 1000 in FIG. 33, from which a housing 1010 is removed.

Referring to FIGS. 33 to 35, the housing 1010 forms an appearance of the stylus pen 1000. The housing 1010 includes an inner predetermined space and has an elongated shape in one direction. The housing 1010 may be formed such that two or more parts are coupled to each other or integrated into one piece.

The housing 1010 may be made of a non-conductive synthetic resin material.

A button unit 1090 may be disposed on the housing 1010. The button unit 1090 is designed to perform a specific operation of the stylus pen 1000. For example, the button unit 1090 may be a button for performing a cancel operation or a special function.

A core body 1020 includes one end that is disposed outside the housing 1010, and the rest portion except the one end is disposed in the housing 1010. Here, the one end of the core body 1020 may be referred to as a pen tip.

The core body 1020 may be made of a non-conductive resin material.

The core body 1020 may include a base portion 1021 and an outer portion 1025. The base portion 1021 has an elongated shape extending along a longitudinal direction of the stylus pen 1000. The outer portion 1025 surrounds a side surface of the base portion 1021. One end of the base portion 1021 is exposed to the outside instead of being covered by the outer portion 1025. The outer portion 1025 is made of a relatively harder material than that of the base portion 1021 to reinforce and protect the base portion 1021.

One portion of the one end of the core body 1020 may be moved into the housing 1010 by external force applied from the outside. As the external force increases, a volume of the one portion of the one end of the core body 1020, which is moved into the housing 1010, may increase. When the applied external force decreases, the one portion of the one end of the core body 1020 is moved out of the housing 101 again. When the external force is not applied, the one portion of the one end of the core body 1020 is returned to an original state.

A buffer member 1150 is disposed in the housing 1010 and disposed between one end of a ferrite core 1210 and an inner surface of the housing 1010. The buffer member 1150 may be disposed in a tapered portion 1010t of the housing 1010. Here, the tapered portion 101t of the housing 1010, which is adjacent to the one end of the core body 1020 among both ends of the housing 1010, has a shape having a width or diameter that gradually decreases in a direction toward an end of the one end of the housing 1010.

The buffer member 1150 has a conical or polygonal pyramid shape and includes a through-hole through which one end of the ferrite core 1210 and a body between one end and the other end of the core body 1020 pass. An inner surface of the through-hole may have a shape corresponding to an outer surface of the one end of the ferrite core 1210 and an outer surface of the body of the core body 1020. Here, the body of the core body 1020 refers to a portion, which is disposed in the through-hole of the ferrite core 1210, in the core body 1020 having an elongated shape in one direction.

The buffer member 1150 may be made of an elastic material such as rubber to serve as a buffer between the ferrite core 1210 and the housing 1010. This buffer member 1150 may block an electrical or magnetic effect from the outside.

The buffer member 1150 has a shape that surrounds one end of the ferrite core 1210.

A virtual tangent line L1 that contacts, in common, the tapered portion 1010t of the housing 1010 and the portion (or pen tip) disposed outside the housing in the core body 102 forms a predetermined angle as illustrated in FIG. 4. Here, the predetermined angle may be less than 30°. When the predetermined angle is less than 30°, a drawing may be performed in a state in which the stylus pen according to another embodiment of the present invention is inclined at 60° based on a contact surface.

The inductor unit 1200 may constitute an LC resonance unit with a capacitor unit (not shown). A resonance frequency may be set by a value of inductance L of the inductor unit 1200 and a value of capacitance C of the capacitor unit (not shown). The resonance frequency may be varied according to variation in the value of the inductance L of the inductor unit 1200 and/or the value of the capacitance C of the capacitor unit (not shown).

The inductor unit 1200 includes a ferrite core 1210 and a coil 1230 wound around an outer surface of the ferrite core 1210.

The ferrite core 1210 may have an overall cylindrical, elliptical, or polygonal container shape, and a through-hole 1210h that passes through the inside of the ferrite core 1210 may be formed along a longitudinal direction of the ferrite core 121.

The ferrite core 1210 has the through-hole 1210h through which the body of the core body 1020 passes. The body of the core body 1020 may perform a linear reciprocating movement along the longitudinal direction through the through-hole 1210h.

One end of the ferrite core 1210 may have a tapered shape having a diameter or width that gradually decreases in a direction toward an end thereof. Here, as illustrated in FIG. 5, an outer surface of the one end having the tapered shape may include at least one curved portion 121c that is curved inward.

As illustrated in FIG. 5, the ferrite core 1210 may include an upper end 121a and a lower end 121b disposed below the upper end 121a. Here, the upper end 121a and the lower end 121b may be integrated with each other.

The coil 1230 may be wound around the ferrite core 1210 with at least one layer.

The coil 1230 is electrically connected to a substrate 2100. The coil 1230 may include a first connection part 1231 and a second connection part 1232, which are for being connected to the substrate 2100. The first connection part 1231 is disposed on a fixing bracket 1600 and has one end that is electrically connected to a first terminal 2131 of the substrate 2100. The second connection part 1232 is disposed on the fixing bracket 1600 and has one end that is electrically connected to a second terminal 2132 of the substrate 2100. Here, the fixing bracket 1600 may have a groove in which each of the first connection part 1231 and the second connection part 1232 is disposed. The groove may be formed along the longitudinal direction of the stylus pen 1000 on an outer surface of the fixing bracket 1600. The groove may guide the first connection part 1231 and the second connection part 1232 of the coil 1230 and protect the first connection part 1231 and the second connection part 1232 from external impacts.

Figure 36:
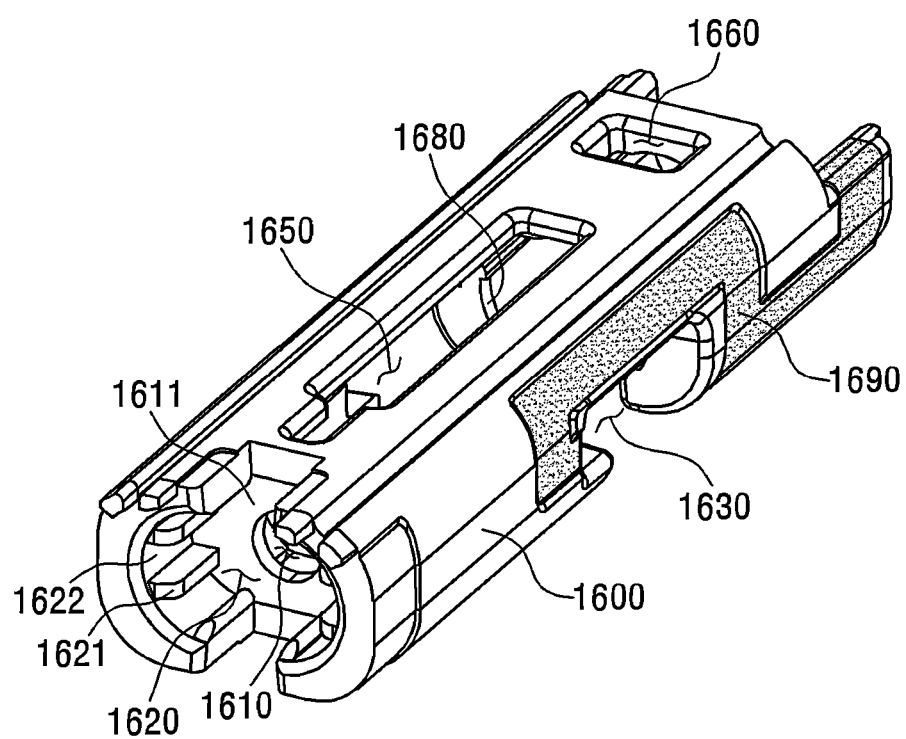
FIG. 36 is a perspective view illustrating only a fixing bracket 1600 in FIG. 25.
Figure 37:
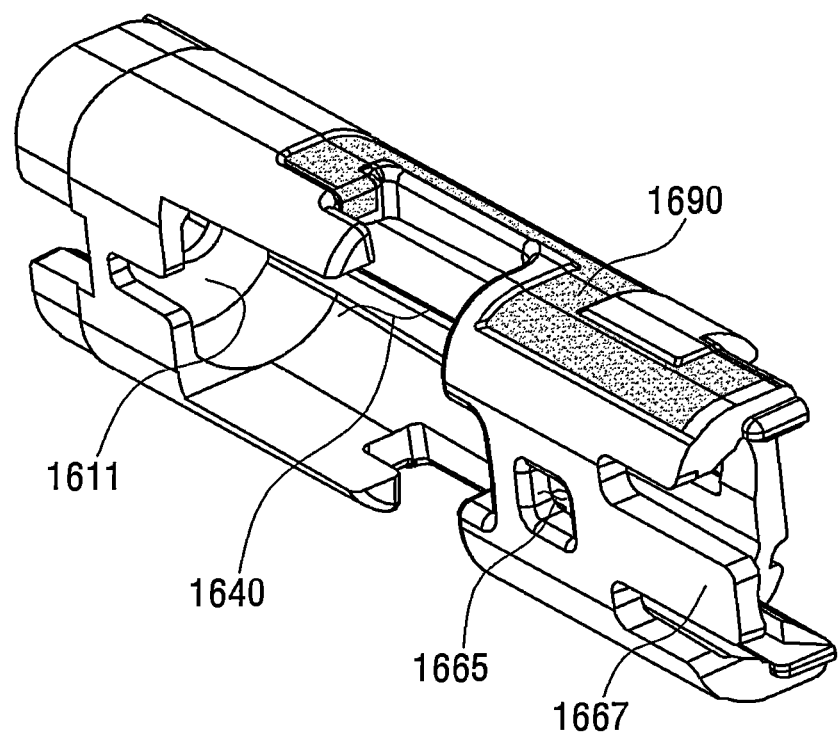
FIG. 37 is a perspective view illustrating the fixing bracket 1600 in FIG. 36 viewed from a different direction.
Figure 38:
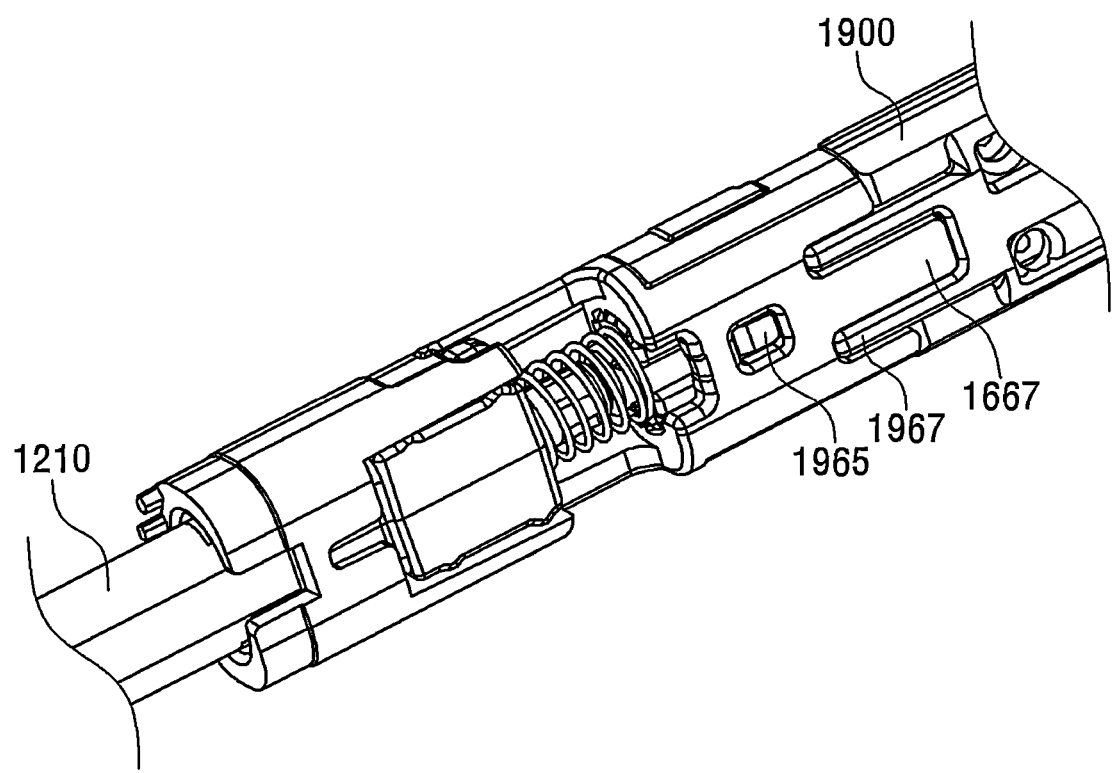
FIG. 38 is a perspective view illustrating a portion of FIG. 35 viewed from a different direction.

FIG. 36 is a perspective view illustrating only the fixing bracket 1600 in FIG. 25, FIG. 37 is a perspective view illustrating the fixing bracket 1600 in FIG. 36 viewed from another direction, and FIG. 38 is a perspective view illustrating a portion of FIG. 35 viewed from another direction.

Referring to FIGS. 35 to 38, the fixing bracket 1600 is fixed in the housing 1010. The fixing bracket 1600 may be disposed between the inductor unit 1200 and a substrate bracket 1900 in the housing 1010. The fixing bracket 1600 may have one end coupled to the inductor unit 1200 and the other end coupled to the substrate bracket 1900.

The one end of the fixing bracket 1600 may include an insertion groove 1620 into which the other end of the ferrite core 1210 of the inductor unit 1200 is inserted. The insertion groove 1620 may be defined by a first partition wall 1611 and an inner wall 1622 of the fixing bracket 1600.

The first partition wall 1611 may contact the other end of the ferrite core 1210, and the first partition wall 1611 has a through-hole 1610 through which the core body 1020 passes.

The inner wall 1622 may include a plurality of protrusions 1621 that protrude into the insertion groove 1620. The plurality of protrusions 1621 may contact an outer surface of the other end of the ferrite core 1210 to hold a position thereof.

The other end of the fixing bracket 1600 may include latch holes 1660 and 1665 into which latch parts 1960 and 1965 of the substrate bracket 1900 are inserted. At least one latch hole 1660 and 1665 may be provided. Alternatively, as illustrated in the drawing, one latch hole may be disposed above the fixing bracket 1600, and one latch hole may be disposed below the fixing bracket 1600. As the latch part 1960 of the substrate bracket 1900 is coupled to the latch hole 1660, the fixing bracket 1600 may be coupled to the substrate bracket 1900.

The other end of the fixing bracket 1600 may include a guide protrusion 1667. The guide protrusion 1667 may extend along a longitudinal direction of the fixing bracket 1600. The guide protrusion 1667 may be coupled with a guide part 1967 of the substrate bracket 1900. As the guide protrusion 1667 is coupled to the guide part 1967 of the substrate bracket 1900, the fixing bracket 1600 may be disposed along the longitudinal direction of the stylus pen 1000.

The other end of the fixing bracket 1600 may include a second partition wall 1680. The second partition wall 1680 fixes a position of an elastic member 1800 together with the substrate bracket 1900. That is, the elastic member 1800 may be fixedly mounted between the second partition wall 1680 and the substrate bracket 1900.

The fixing bracket 1600 is disposed to surround a moving bracket 1300, an elastic body 1700, and the elastic member 1800. The fixing bracket 1600 may have an inner accommodation space 1640 in which the moving bracket 1300, the elastic body 1700, and the elastic member 1800 are accommodated. The moving bracket 1300 may perform a linear reciprocating movement in the accommodation space 1640 of the fixing bracket 1600, The fixing bracket 1600 may include two or more electrode patterns 1690. At least two electrode patterns 1690 may be disposed on an outer surface of the fixing bracket 1600. For example, the electrode patterns 1690 may be disposed on both outer surfaces of the fixing bracket 1600, respectively. The electrode patterns 1690 may be plated on the outer surface of the fixing bracket 1600 made of a non-conductive material. For example, the electrode patterns 1690 may be formed on the outer surface of the non-conductive fixing bracket by using a laser direct structuring (LDS) and a laser manufacturing antenna (LMA).

Grooves (or cavities) corresponding to shapes of the electrode patterns 1690 may be formed on the outer surface of the fixing bracket 1600. The electrode patterns 1690 may be plated in the grooves (or cavities). Although not shown in the drawing, according to another embodiment, protrusions corresponding to the shapes of the electrode patterns 1690 may be formed on the outer surface of the fixing bracket 1600, and the electrode patterns 1690 may be plated on the protrusions.

The electrode patterns 1690 may be arranged around a guide groove 1630 of the fixing bracket 1600 and have an uneven shape or a 'ㄹ'-shape. Each of the electrode patterns 1690 may have one end that is in contact with or spaced a predetermined distance from an electrode pattern 1390 of the moving bracket 1300 and the other end that is electrically connected to terminals 2191 and 2192 of the substrate 2100.

According to a movement of the moving bracket 1300 synchronized with a movement of the core body 1020, the electrode pattern 1690 may be in contact with or spaced at a predetermined distance from the electrode pattern 1390 of the moving bracket 1300. This will be explained later with reference to another drawing.

Figure 39:
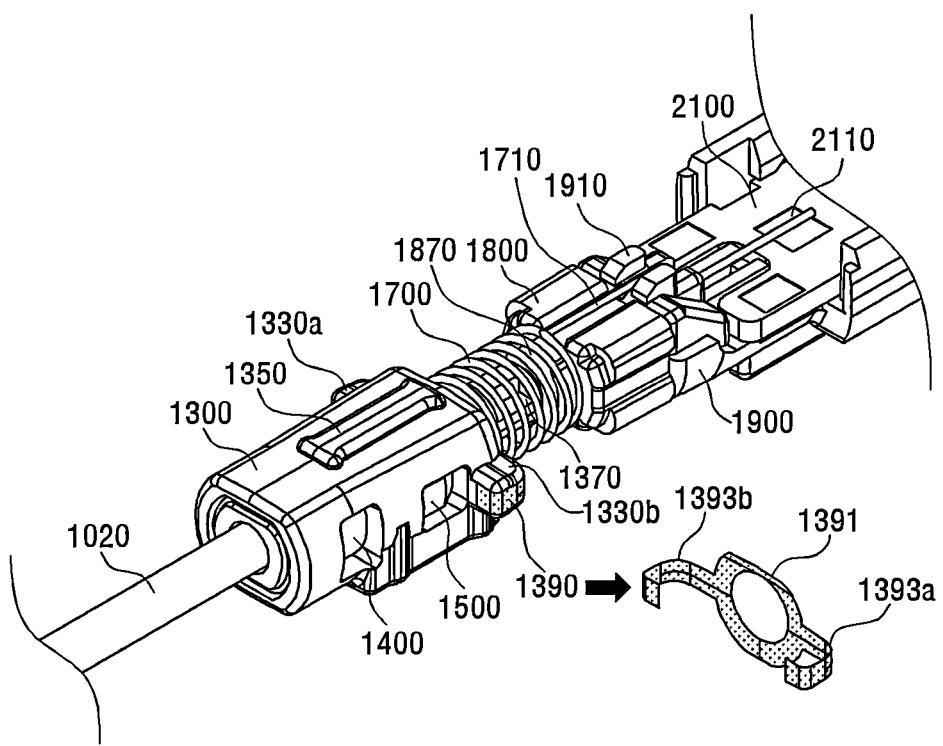
FIG. 39 is a perspective view illustrating a state in which an inductor unit 1200 and a fixing bracket 1600 in FIG. 35 are removed.
Figure 40:
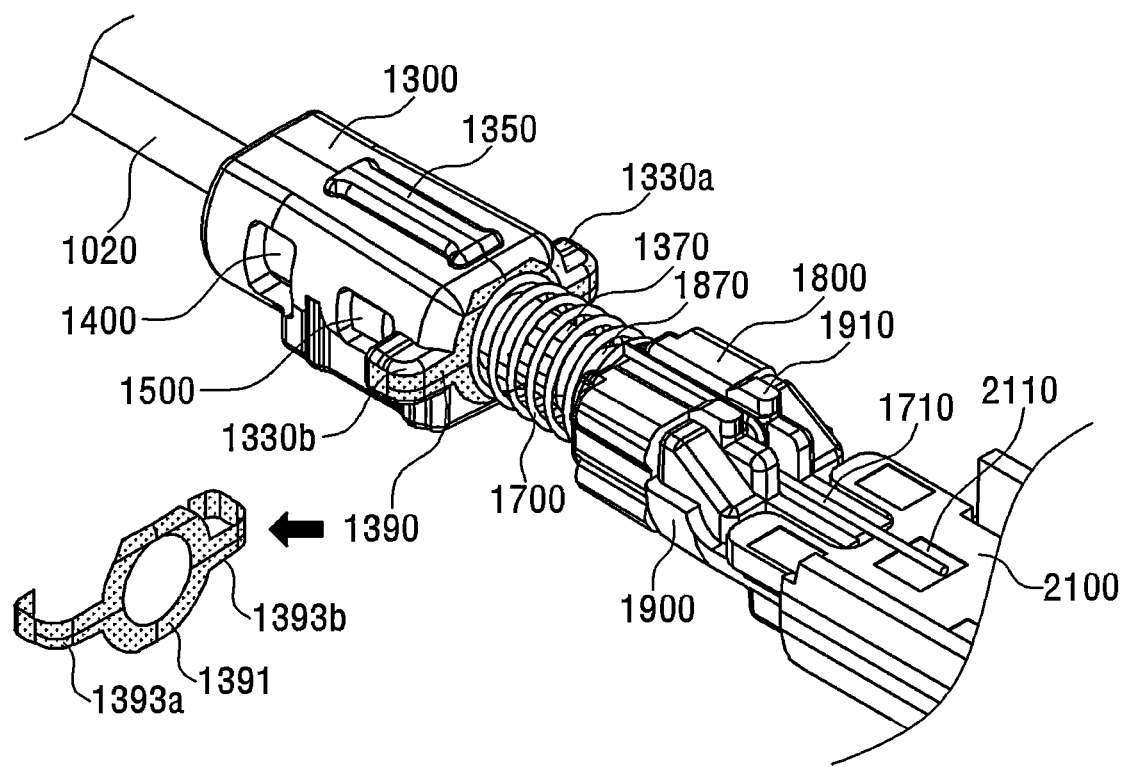
FIG. 40 is a perspective view illustrating FIG. 39 viewed from a different direction.
Figure 41:
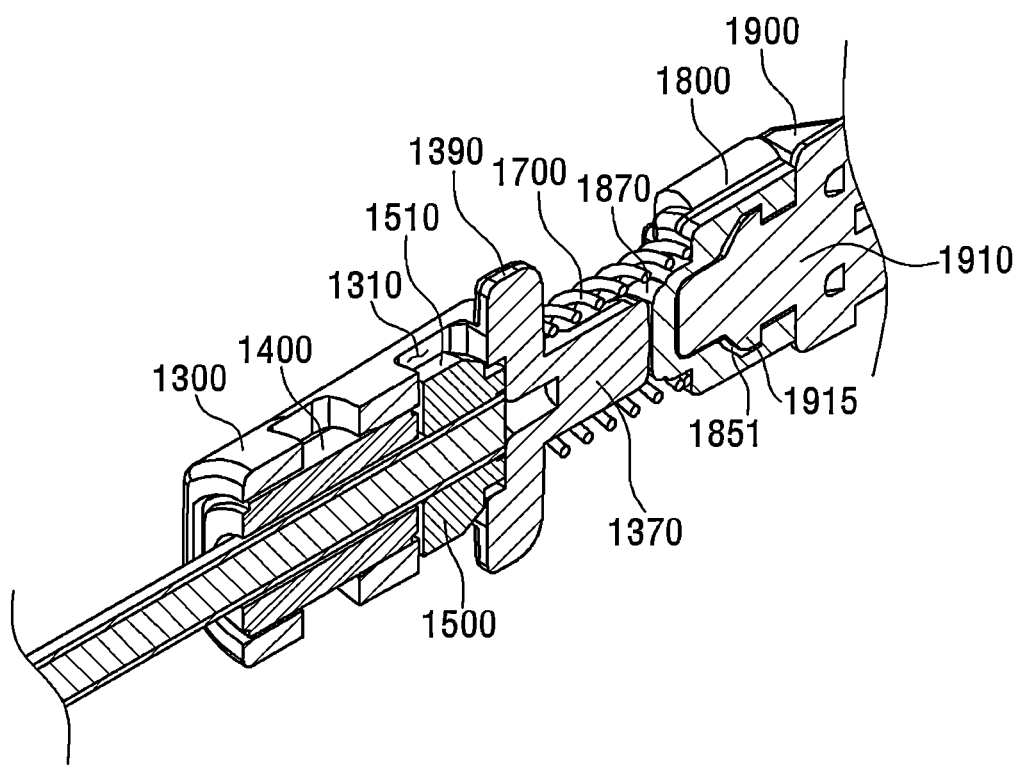
FIG. 41 is a cross-sectional view of FIG. 39.

FIG. 39 is a perspective view from which the inductor unit 1200 and the fixing bracket 1600 in FIG. 35 are removed, FIG. 40 is a perspective view of FIG. 39 viewed from another direction, and FIG. 41 is a cross-sectional view of FIG. 39.

Referring to FIGS. 34 to 39, the moving bracket 1300 is moved in synchronization with the core body 1020. When one end of the core body 1020 receives external force from the outside, the core body 1020 is moved into the housing 1010, and the moving bracket 1300 is moved together with the core body 1020.

The moving bracket 1300 accommodates the other end of the core body 1020, the magnetic body 1400, and the protection member 1500. The moving bracket 1300 may include an accommodation part for accommodating the other end of the core body 1020, the magnetic body 1400, and the protection member 1500.

In the accommodation part, the magnetic body 1400 and the protection member 1500 are disposed to surround the other end of the core body 1020. To this end, the magnetic body 1400 may have a container shape with a through-hole through which the other end of the core body 1020 passes, and the protection member 1500 may have a container shape with a through-hole through which the other end of the core body 1020 passes.

The magnetic body 1400 includes a magnetic material and is moved together with the core body 1020 in synchronization with the movement of the core body 1020. The movement of the magnetic body 1400 changes a distance to the inductor unit 1200 fixed in the housing 1010. An inductance of the inductor unit 1200 is varied by the change in distance.

The protection member 1500 may include an elastic material and be inserted between the other end of the core body 1020 and the moving bracket 1300. The protection member 1500 may protect the other end of the core body 1020. Since the protection member 1500 is inserted between the other end of the core body 1020 and the moving bracket 1300, the moving bracket 1300 may be synchronized with the movement of the core body 1020.

As illustrated in FIG. 38, the protection member 1500 may include a protrusion 1510 that protrudes from an outer surface thereof to the outside. The protrusion 1510 may be inserted into an insertion groove 1310 defined in the moving bracket 1300. The protection member 1500 may be stably fixed to the moving bracket 1300 by the protrusion 1510 of the protection member 1500 and the insertion groove 1310 of the moving bracket 1300, and thus the other end of the core body 1020 may be fixed to the moving bracket 1300.

The moving bracket 1300 may include a first protrusion 1330a and a second protrusion 1330b. The first protrusion 1330a and the second protrusion 1330b may protrude in an outward direction from the outer surface of the moving bracket 1300 or in a direction perpendicular to a longitudinal direction of the stylus pen 1000. The first protrusion 1330a and the second protrusion 1330b may be disposed in the guide hole 1630 of the fixing bracket 1600 in FIG. 35. When the moving bracket 1300 is moved in synchronization with the movement of the core body 1020, the first protrusion 1330a and the second protrusion 1330b may be moved along the guide hole 1630 of the fixing bracket 1600.

The moving bracket 1300 may include a third protrusion 1350. The third protrusion part 1350 may protrude in an outward direction from the outer surface of the moving bracket 1300 or in a direction perpendicular to the longitudinal direction of the stylus pen 1000. The third protrusion 1350 may be disposed in the guide hole 1650 of the fixing bracket 1600 in FIG. 35. When the moving bracket 1300 is moved in synchronization with the movement of the core body 1020, the third protrusion 1350 may be moved along the guide hole 1650 of the fixing bracket 1600.

The moving bracket 1300 may include an extension part 1370. The extension part 1370 may extend along the longitudinal direction of the stylus pen 1000 from the outer surface of the moving bracket 1300. Alternatively, the extension part 1370 may extend along the longitudinal direction of the core body 1020 from the outer surface of the moving bracket 1300. The extension part 1370 may have a structure and a shape to be disposed in the elastic member 1700. An extension part 1870 of the elastic member 1800 may be disposed on an end of the extension part 1370.

The moving bracket 1300 may include an electrode pattern 1390. The electrode pattern 1390 may be disposed on the outer surface of the moving bracket 1300, on which the extension part 1370 is formed, among the outer surfaces of the moving bracket and on the first and second protrusions 1330a and 1330b.

The electrode pattern 1390 may be in contact with and electrically connected to the elastic body 1700 surrounding the extension part 1370 of the moving bracket 1300. The electrode pattern 1390 may be in contact with and electrically connected to the electrode pattern 1690 of the fixing bracket 1600 in FIG. 35, and detached and electrically disconnected from the electrode pattern 1690 of the fixing bracket 1600 by the movement of the core body 1020.

The electrode pattern 1390 may be plated on the outer surface of the moving bracket 1300 made of non-conductive material. For example, the electrode pattern 1390 may be formed on the outer surface of the moving bracket 1300 by using a laser direct structuring (LDS) and a laser manufacturing antenna (LMA).

The electrode pattern 1390 may include a base electrode pattern 1391 and first and second extension patterns 1393a and 1393b.

The base electrode pattern 1391 may be disposed on the outer surface of the moving bracket 1300 and arranged to surround the extension part 1370 of the moving bracket 1300. The base electrode pattern 1391 contacts one end of the elastic member 1700.

The first and second extension patterns 1393a and 1393b may extend respectively from both sides of the first electrode pattern 1391, the first extension pattern 1393a may be disposed on the first protrusion 1330a, and the second extension pattern 1393b may be disposed on the second protrusion 1330b. The first and second extension patterns 1393a and 1393b may contact the electrode pattern 1690 of the fixing bracket 1600 in FIG. 35 or may be separated therefrom by a movement of the core body 1020.

The elastic body 1700 may be made of a conductive material and have a spring shape. The elastic body 1700 may be disposed between the moving bracket 1300 and the elastic member 1800. Here, the elastic body 1700 may be inserted between the moving bracket 1300 and the elastic member 1800 in a partially pressed state instead of being completely pressed. When the external force applied to the moving bracket 1300 synchronized with the movement of the core body 1020 is less than elastic force of pushing outward from the partially pressed elastic body 1700, the elastic member 1700 is not pressed. When the external force is greater than the elastic force, the elastic body 1700 is initiated to be pressed.

In the elastic body 1700, the extension part 1370 of the moving bracket 1300 and the extension part 1870 of the elastic member 1800 may be disposed together. Through this, there is an advantage in that an inner volume of the stylus pen 1000 may be reduced because an inner space of the elastic body 1700 is usable.

The elastic body 1700 has one end electrically connected to the electrode pattern 1390 of the moving bracket 1300 and the other end electrically connected to the terminal 2110 of the substrate 2100. The elastic body 1700 may include a connecting wire 1710 that connects the elastic body 1700 and the terminal 2110 of the substrate 2100. The connecting wire 1710 may have one end connected to the elastic body 1700 and the other end connected to the terminal 2110 of the substrate 2100. Each of the elastic member 1800 and the substrate bracket 1900 may have a guide groove in which the connecting wire 1710 is disposed in order to protect and guide the connecting wire 1710.

The elastic member 1800 is made of a non-conductive material and has a predetermined elasticity. For example, the elastic member 1800 may be made of rubber.

The elastic member 1800 may be disposed between the moving bracket 1300 and the substrate bracket 1900.

Figure 42A:
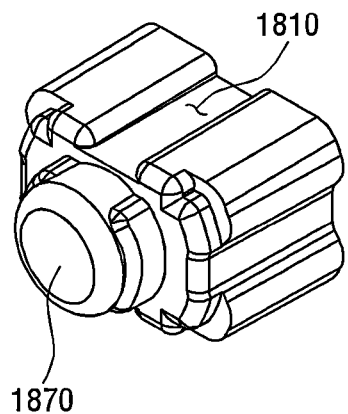
FIGS. 42A and 42B are perspective views illustrating only elastic member 1800 in FIG. 39.
Figure 42B:
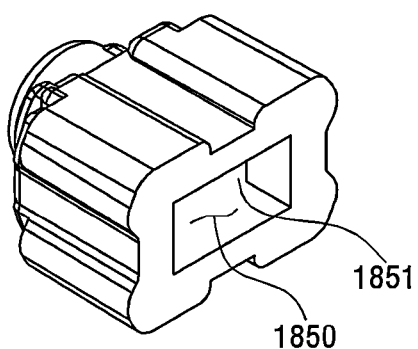
Figure 43:
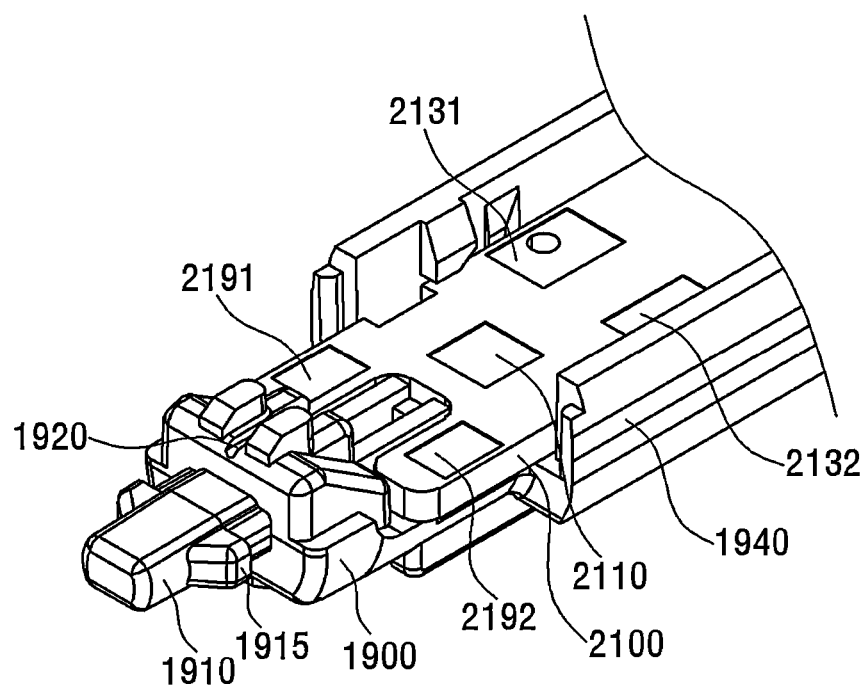
FIG. 43 is a perspective view illustrating a substrate bracket 1900 and a substrate 2100 in FIG. 39.

FIGS. 42A and 42B are perspective views illustrating only the elastic member 1800 in FIG. 39, and FIG. 43 is a perspective view illustrating the substrate bracket 1900 and the substrate 2100 in FIG. 39.

Referring to FIGS. 36 to 43, the elastic member 1800 may include an extension part 1870. The extension part 1870 may extend in a direction from an outer surface of the elastic member 1800 to the moving bracket 1300. The extension part 1870 may be disposed in the elastic body 1700.

The elastic member 1800 may include a guide groove 1810. The guide groove 1810 may be formed along the longitudinal direction of the stylus pen 1000 on the outer surface of the elastic member 1800. An extension line 1710 of the elastic body 1700 may be disposed in the guide groove 1810.

The elastic member 1800 may include a mounting groove 1850. The mounting groove 1850 is defined in the outer surface of the elastic member 1800. The mounting groove 1850 may be disposed at a side opposed to the extension part 1870. A mounting part 1910 of the substrate bracket 1900 may be inserted into the mounting groove 1850. A latch groove 1851 having a shape corresponding to a protrusion 1915 of the mounting part 1910 of the substrate bracket 1900 may be formed in the mounting groove 1850. Through this, the elastic member 1800 may be stably fixed and mounted to the substrate bracket 1900.

The substrate bracket 1900 supports the substrate 2100 in the housing 1010 and is coupled with the elastic member 1800 to support the elastic member 1800.

The substrate bracket 1900 may include a side part 1940 that guides and supports a side portion of the substrate 2100.

The substrate bracket 1900 may include a mounting part 1910 for being coupled with the elastic member 1800. The mounting part 1910 protrudes in a direction from the substrate bracket 1900 to the moving bracket 1300. The mounting part 1910 may include a protrusion 1915 that protrudes from an outer surface thereof. The protrusion 1915 may protrude in a direction perpendicular to a direction in which the mounting part 1910 protrudes.

The substrate bracket 1900 may include a guide groove 1920. The guide groove 1920 may guide and protect the connecting wire 1710 of the elastic member 1700.

The substrate 2100 is disposed on the substrate bracket 1900.

The substrate 2100 may include a plurality of terminals 2110, 2131, 2132, 2191, and 2192. Among the plurality of terminals 2110, 2131, 2132, the terminal 2110 is electrically connected to the elastic body 1700, and first and second terminals 2131 and 2132 are electrically connected to the coil 1230 of the inductor unit 1200. Third and fourth terminals 2191 and 2192 are electrically connected to electrode patterns 1690 disposed on both outer surfaces of the fixing bracket 1600, respectively.

The substrate 2100 includes a capacitor unit (not shown). One or more capacitors that constitute the capacitor unit (not shown) may be arranged on the substrate 2100.

The substrate 2100 may include a circuit pattern that electrically connects the one or more capacitors of the capacitor unit (not shown) and the plurality of terminals 2110, 2131, and 2132.

Figures 44A, 44B:
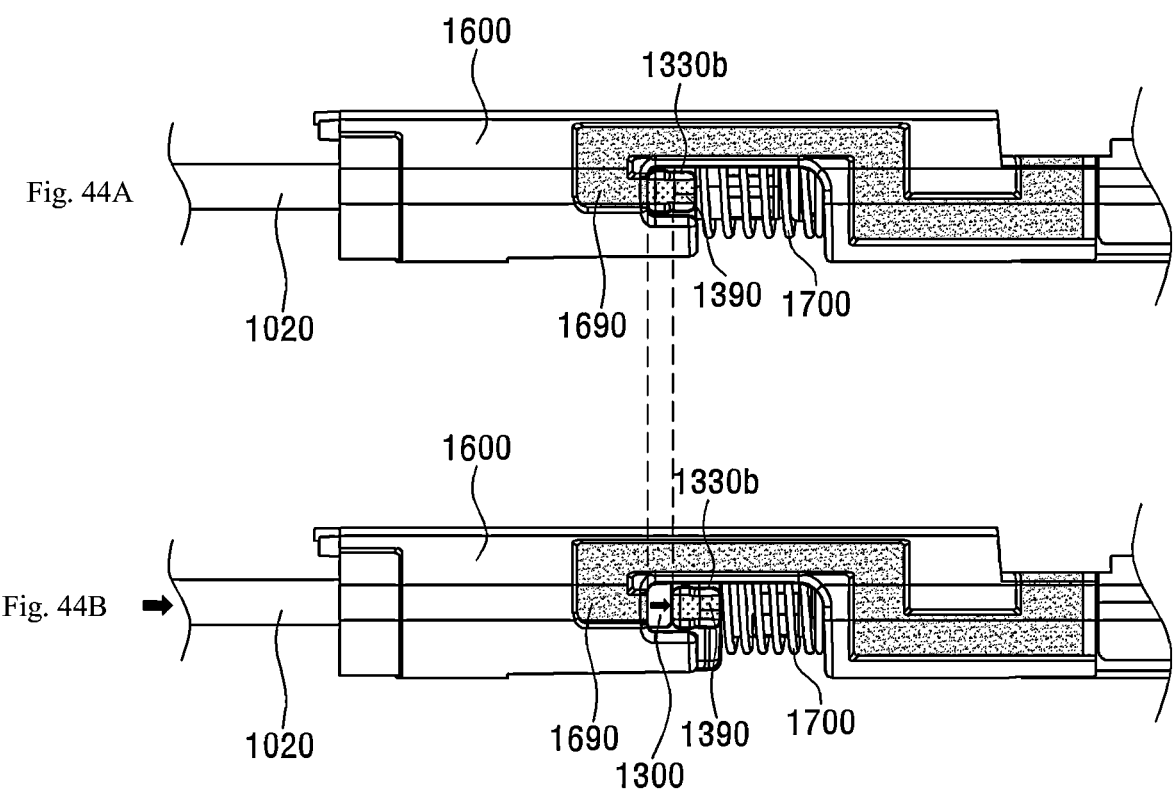
FIGS. 44A and 44B are views for explaining a movement of a moving bracket 1300 according to a movement of the core body 1020 in FIGS. 35 to 43, and an electrical contact and disconnection between the fixing bracket 1600 and the moving bracket 1300.

FIGS. 44A and 44B are views for explaining a movement of a moving bracket 1300 according to a movement of the core body 1020 in FIGS. 35 to 43, and an electrical contact and disconnection between the fixing bracket 1600 and the moving bracket 1300.

FIG. 44A illustrates a case when any external force is not applied to the core body 1020, and FIG. 44B illustrates a case when predetermined external force is applied to the core body 1020 to move the moving bracket 1300 in one direction.

First, referring to FIG. 44A, when any external force is not applied to the core body 1020, the electrode pattern 1390 of the moving bracket 1300 contacts the electrode pattern 1690 of the fixing bracket 1600. That is, the electrode pattern 1390 of the moving bracket 1300 and the electrode pattern 1690 of the fixing bracket 1600 are electrically connected to each other.

As the second protrusion 1330b of the moving bracket 1300 is pushed toward the core body 1020 by the elastic body 1700, a state in which the electrode pattern 1390 disposed on an outer surface of the second protrusion 1330b is in contact with the electrode pattern 1690 of the fixing bracket 1600 may be maintained.

Referring to FIG. 44B, when predetermined force is applied to the core body 1020 to move the core body 1020 in one direction, the moving bracket 1300 is moved together with the core body 1020 in the one direction. As the moving bracket 1300 is moved in the one direction, the second protrusion 1330b is also moved in the one direction. As the second protrusion 1330b is moved, a contact between the electrode pattern 1390 of the moving bracket 1300 and the electrode pattern 1690 of the fixing bracket 1600 is released. Likewise, as the first protrusion 1330a disposed at a side opposed to the second protrusion 1330b is also moved, the contact between the electrode pattern 1390 of the moving bracket 1300 and the electrode pattern 1690 of the fixing bracket 1600 is released. Also, as the moving bracket 1300 is moved, the elastic body 1700 is pressed.

As illustrated in FIG. 44B, when predetermined force is applied to the core body 1020 to move the core body 1020 in one direction, a contact between the electrode pattern 1390 of the moving bracket 1300 and the electrode pattern 1690 of the fixing bracket 1600 is released. The release of the contact causes a change in capacitance of the capacitor unit (not shown) mounted to the substrate 2100. The change of the capacitance changes a frequency of a pen signal emitted from the stylus pen 1000. A receiving side that receives the pen signal may detect the changed frequency to determine whether the stylus pen 1000 is brought into contact with a screen.

As the moving bracket 1300 is moved, the magnetic body 1400 disposed in the moving bracket 1300 is also moved. As the magnet 1400 is moved, a distance between the inductor unit 1200 and the magnetic body 1400 increases. The change in distance between the inductor unit 1200 and the magnetic body 1400 changes an inductance of the inductor unit (not shown). The change in inductance occurs together with the above-described change in capacitance. Here, the stylus pen may be configured such that the change of the capacitance is more dominantly changed than the change of the inductance. In a limited inner space of the housing of the stylus pen, it is easier to dramatically change the capacitance rather than the inductance. Alternatively, depending on cases, the stylus pen may be configured such that the change of the inductance is more dominantly changed than the change of the capacitance. Alternatively, the stylus pen may be configured such that the change of the capacitance is similar in phase to the change of the inductance. In any of the above-described three cases, the capacitance and the inductance are changed by the movement of the moving bracket 1300, and the changes of the capacitance and the inductance cause a change of the resonance frequency of the resonance circuit formed by the inductor unit 1200 and the capacitor unit. The receiver that receives the pen signal may detect the change of the resonance frequency to determine whether the stylus pen 1000 is in contact with the screen.

Figure 45A:
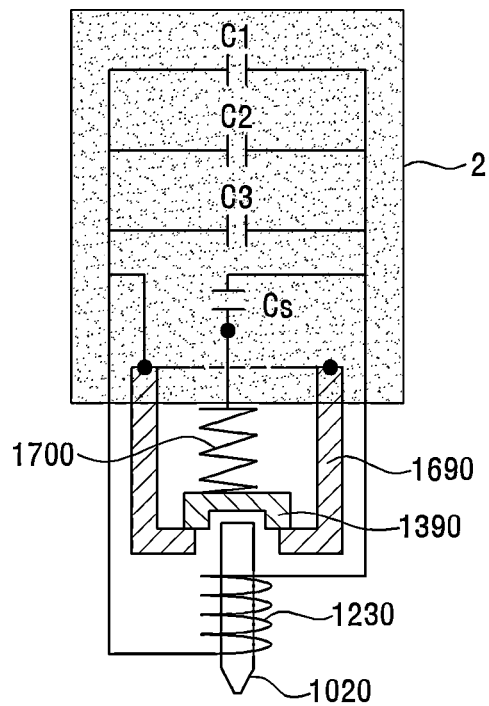
FIGS. 45A and 45B are views schematizing each of FIGS. 44A and 44B.
Figure 45B:
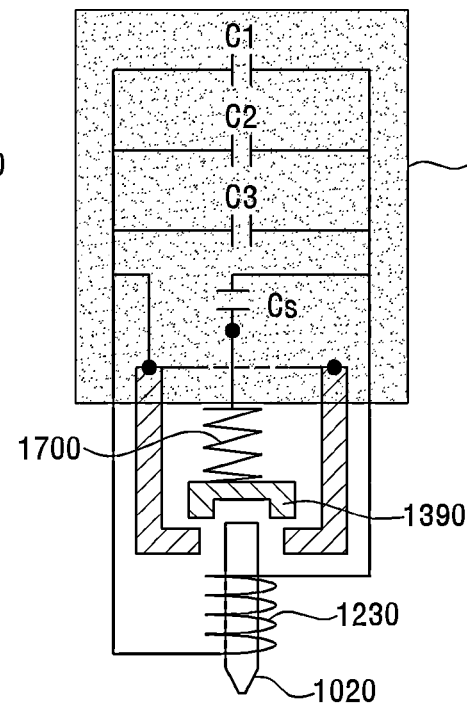

FIGS. 45A and 45B are views schematizing each of FIGS. 44A and 44B, and FIGS. 46A to 46C are views simplifying a stylus pen according to another embodiment of the present invention and showing equivalent circuit diagrams of FIGS. 44A and 44B.

Referring to FIGS. 45A and 45B and FIGS. 46B and 46C, a plurality of capacitors C1, C2, C3, and Cs are arranged on the substrate 2100. The capacitors C1, C2, C3, and Cs may form a capacitor unit (not shown). At least one or more capacitors C1, C2, and C3 of the plurality of capacitors C1, C2, C3, and Cs are connected in parallel to maintain a constant capacitance value, and an auxiliary capacitor Cs is connected in parallel to the basic capacitor according to the contact or release between the electrode pattern 1690 of the fixing bracket 1600 and the electrode pattern 1390 of the moving bracket 1300 as illustrated in FIGS. 44A and 44B.

Figure 46A:
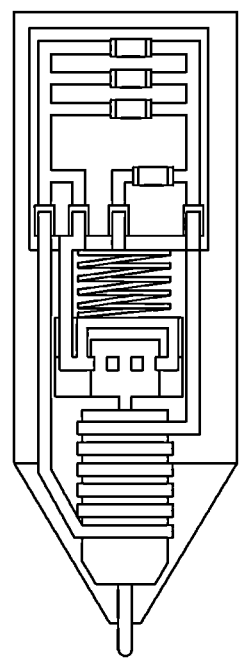
FIGS. 46A to 46C are views simplifying a stylus pen according to another embodiment of the present invention and showing equivalent circuit diagrams of FIGS. 44A and 44B.
Figure 46B:
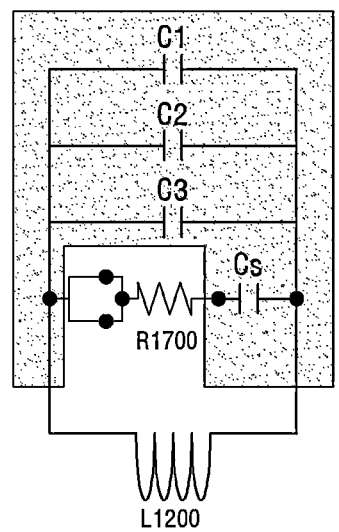

First, as illustrated in FIG. 45A and FIG. 46B, since the electrode pattern 1690 of the fixing bracket 1600 and the electrode pattern 1390 of the moving bracket 1300 are in contact with each other in a state in which external force is not applied to the core body 1020, an auxiliary capacitor Cs is connected in parallel with the basic capacitors C1, C2, and C3. Thus, a capacitance of the capacitor unit (not shown) is a sum of capacitance values of the basic capacitors C1, C2, and C3 and the auxiliary capacitor Cs.

Figure 46C:
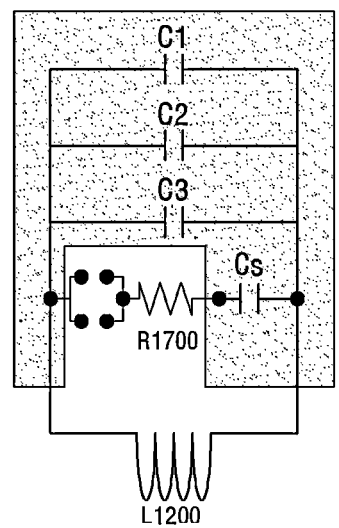

Thereafter, as illustrated in FIG. 45B and FIG. 46C, when predetermined external force is applied to the core body 1020, the electrode pattern 1390 of the moving bracket 1300 is released from the electrode pattern 1690 of the fixing bracket 1600 by the movement of the moving bracket 1300 synchronized with the movement of the core body 1020. Thus, the auxiliary capacitor Cs is not electrically connected to the basic capacitors C1, C2, and C3, and the capacitance of the capacitor unit (not shown) is changed to a capacitance value of the basic capacitors C1, C2, and C3.

In particular, referring to FIG. 46B, it may be known that the electrode pattern 1390 of the moving bracket 1300 is in contact with the electrode pattern 1690 of the fixing bracket 1600 at two points. As illustrated in FIGS. 39 and 40, it may be understood that the fixing bracket 1600 has two electrode patterns 1690, and the first and second extension patterns 1393a and 1393b are arranged on the first and second protrusions 1330a and 1330b of the moving bracket 1300.

When the external force applied to the core body 1020 is insufficient to separate both the first and second extension patterns 1393a and 1393b from two electrode patterns 1690 of the fixing bracket 1600, i.e., when the first extension pattern 1393a is separated from one electrode pattern 1690 of the fixing bracket 1600 while the second extension pattern 1393b is not separated from the other electrode pattern 1690 of the fixing bracket 1600, the auxiliary capacitor Cs remains connected in parallel with the basic capacitors C1, C2, and C3.

On the other hand, only when the external force applied to the core body 1020 is sufficient to completely separate both the first and second extension patterns 1393a and 1393b from the two electrode patterns 1690 of the fixing bracket 1600, the auxiliary capacitor Cs is electrically disconnected from the basic capacitors C1, C2, and C3. Thus, when the stylus pen 1000 according to another embodiment of the present invention is used, there is an advantage in that a clear distinguishment between the hover state and the contact state may be obtained by clearly setting a reference pressure for distinguishing the hover state and the contact state. In particular, since the stylus pen 1000 according to another embodiment of the present invention may still maintain the contact state between another extension pattern and another electrode pattern although one extension pattern of the first and second extension patterns 1393a and 1393b is not in contact with one of the two electrode patterns 1690 of the fixing bracket 1600 due to a limitation in manufacturing process while manufacturing the stylus pen or carelessness of a user while using the stylus pen.

Figure 47:
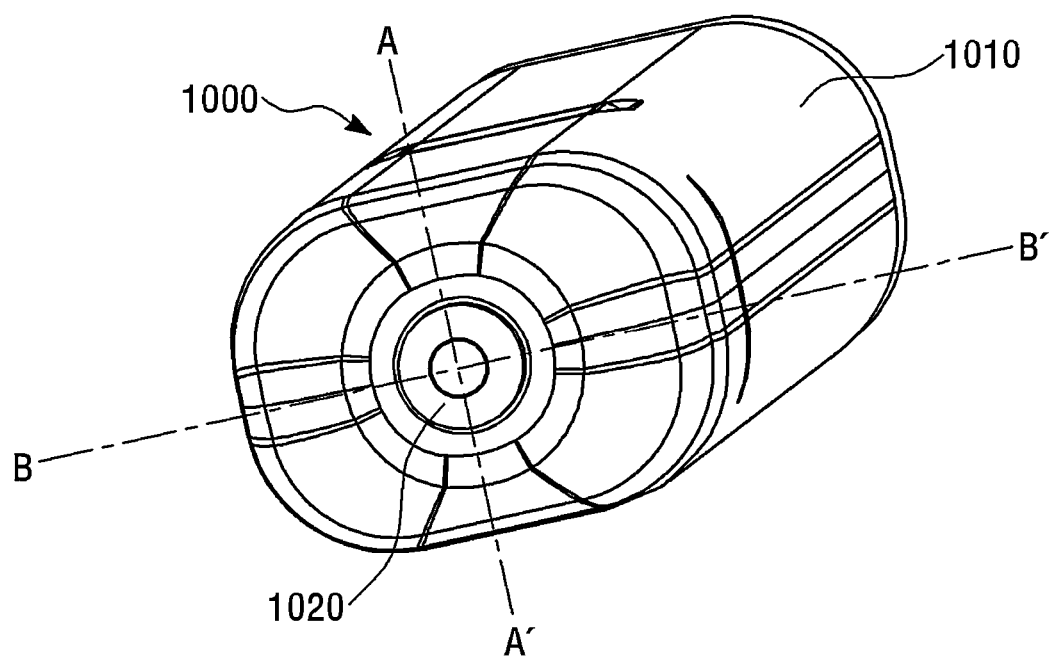
FIG. 47 is a perspective view illustrating a stylus pen 1000 in FIG. 33 according to another embodiment of the present invention viewed from the core body 1020.
Figure 48A:
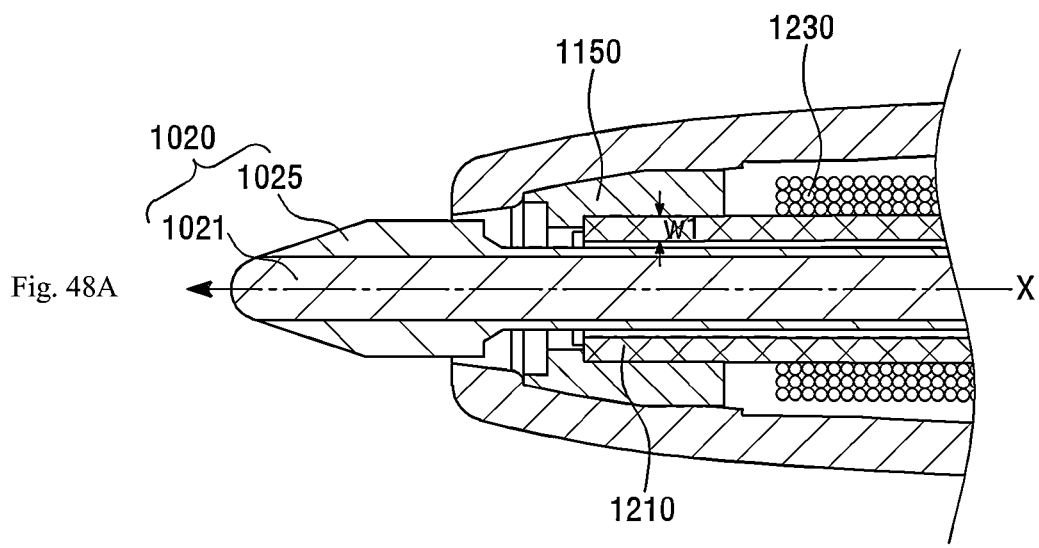
FIG. 48A is a partial cross-sectional view obtained by cutting the stylus pen 1000 along line A-A' in FIG. 47.
Figure 48B:
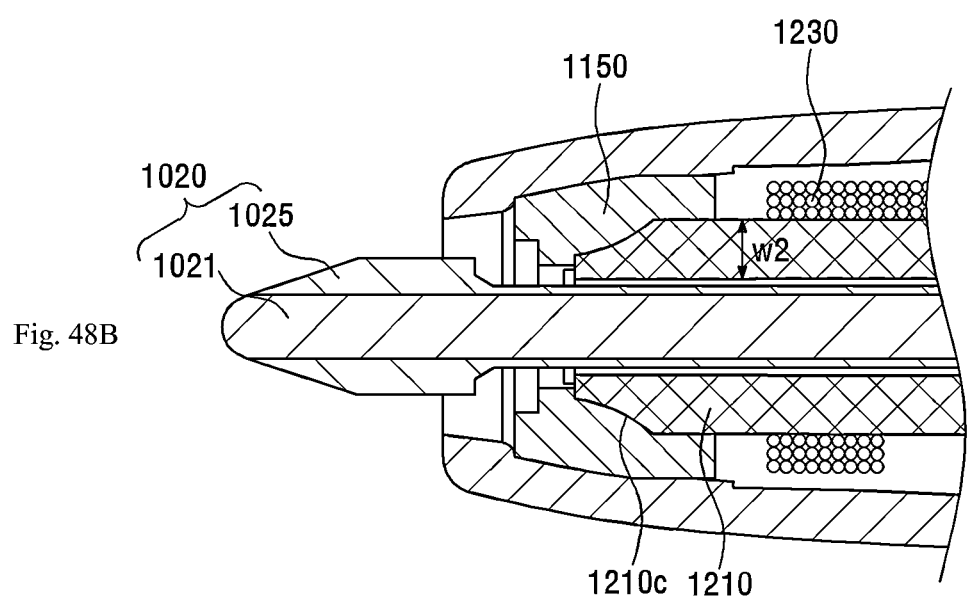
FIG. 48B is a partial cross-sectional view obtained by cutting the stylus pen 1000 along line B-B' in FIG. 47.
Figure 49:
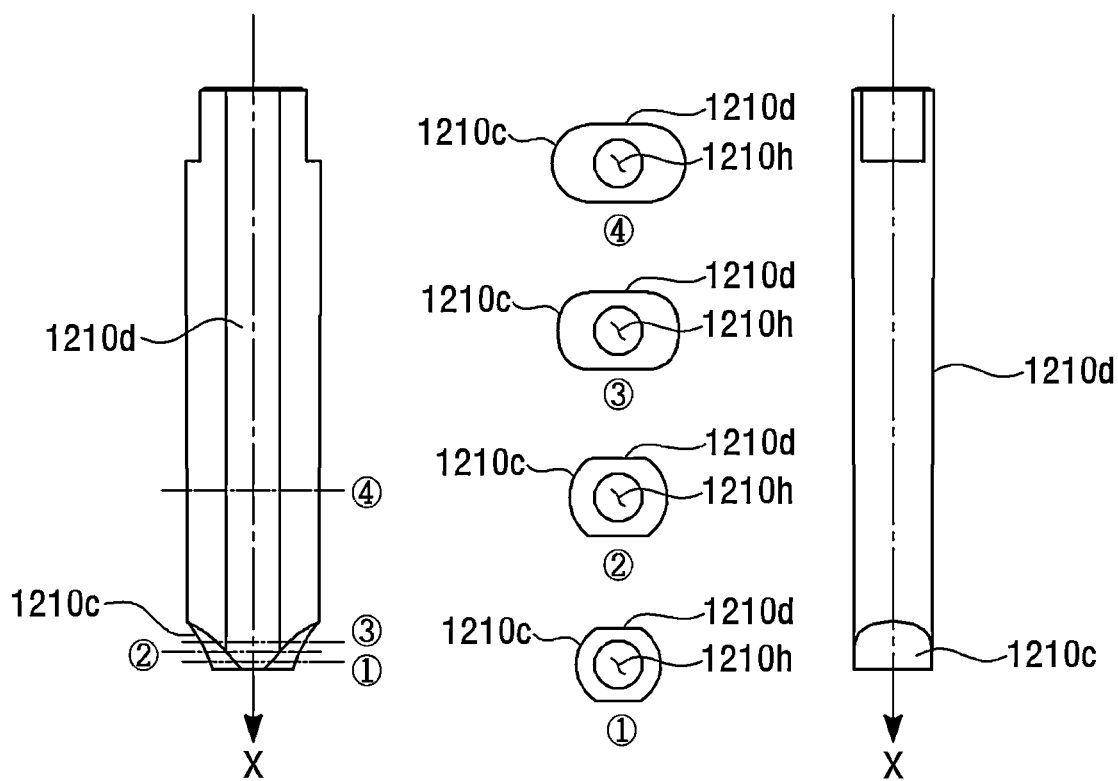
FIG. 49 is a view illustrating cross-sectional views and side views of a ferrite core 1210 in FIGS. 47, 48A and 48B.

FIG. 47 is a perspective view illustrating the stylus pen 1000 in FIG. 33 according to another embodiment of the present invention viewed from the core body 1020, FIG. 48A is a partial cross-sectional view taken along line A-A' of the stylus pen 1000 in FIG. 47, FIG. 48B is a partial cross-sectional view taken along line B-B' of the stylus pen 1000 in FIG. 47, and FIG. 49 is a view illustrating cross-sectional views and side views of the ferrite core 1210 in FIGS. 47, 48A and 48B.

Referring to FIGS. 35 and 47 to 49B, the housing 1010 of the stylus pen 1000 has a rectangular container shape having rounded corners, and an exposed portion of the core body 1020 in the housing 1010 has a width that gradually decreases in an outward direction.

Components disposed in the housing 1010 have shapes corresponding to the shape of the housing 1010 according to an outer shape of the housing 1010. Among the inner components, the ferrite core 1210 of the inductor unit 1200 also has an optimized structure corresponding to the outer shape of the housing 1010.

As illustrated in FIGS. 48A and 48B, in the ferrite core 1210, a first cross-sectional shape taken along a first vertical direction (A-A' direction in FIG. 47) perpendicular to an axial direction X (or the longitudinal direction of the stylus pen 1000) of the ferrite core 1210 is different from a second cross-section shape taken along a second vertical direction (B-B' direction in FIG. 47). Specifically, a thickness w1 of the ferrite core 1210 in the first vertical direction is different from a thickness w2 in the second vertical direction. More specifically, the thickness w1 in the first vertical direction is less than the thickness w2 in the second vertical direction. Here, the thickness w1 in the first vertical direction is defined as a minimum distance from the through-hole 1210h of the ferrite core 1210 to the outer surface of the ferrite core 1210 in the first cross-sectional shape, and the thickness w2 in the second vertical direction is defined as a minimum distance from the through-hole 1210h of the ferrite core 1210 to the outer surface of the ferrite core 1210 in the second cross-sectional shape. Alternatively, unlike as illustrated in the drawing, the thickness w1 in the first vertical direction may be a total thickness of the ferrite core 1210 in the first cross-sectional shape, and the thickness w2 in the second vertical direction may be a total thickness of the ferrite core 1210 in the second cross-sectional shape.

The ferrite core 1210 has a container or cylinder shape. A flat portion 1210d may be disposed on at least a portion of the outer surface of the ferrite core 1210. A flat portion corresponding to the flat portion 1210d may be disposed on another portion of the outer surface of the ferrite core 1210. The ferrite core 1210 may be stably disposed in the housing 1010 by the flat portion 1210d. The flat portion 1210d extends from one end to the other end of the ferrite core 1210 along the axial direction X of the ferrite core 1210.

One end of the ferrite core 1210 may include at least two curved portions 1210c. As illustrated in FIGS. 48A and 48B, at least a portion of the curved portion 1210c may be shown in the second cross-sectional shape, but may not be shown in the first cross-sectional shape. The curved portion 1210c may be curved from one side surface of one end of the ferrite core 1210 to a portion adjacent to the through-hole 1210h of the ferrite core 1210 in a direction toward the through-hole 1210h. The curved portion 1210c may be disposed on each of both sides opposed to each other at one end of the ferrite core 1210 based on the through-hole 1210h.

As illustrated in ①, ②, and ③ of FIGS. 49, the curved portion 1210c is changed in shape from an aspherical shape to a spherical shape along the axial direction X of the ferrite core 1210. ③ of FIG. 49 shows the curved portion 1210c having an aspherical shape, and ① of FIG. 49 shows the curved portion 1210c having a spherical shape. Also, ② of FIG. 49 shows that the curved portion 1210c has an intermediate shape between the aspherical shape and the spherical shape.

At one end of the ferrite core 1210, the flat portion 1210d has a shape having a width that gradually decreases along the axial direction X of the ferrite core 1210. Here, the width of the flat portion 1210*d* may decrease non-linearly.

As described in FIGS. 6 to 8, when the above-described ferrite core 1210 is used, the inductor unit 1200 including the ferrite core 1210 may be disposed closer to a tip of the stylus pen 1000 in the stylus pen 1000. Thus, since the inductor unit 1200 may be moved relatively closer to the receiver (not shown), the pen signal received by the receiver may increase.

On the other hand, the ferrite core 1210 in FIGS. 47 to 49 may be applied to the stylus pen in FIG. 3 or 22. Furthermore, the ferrite core of the stylus pen in FIG. 3 or 22 may be applied to the stylus pen in FIG. 33.

Figure 50:
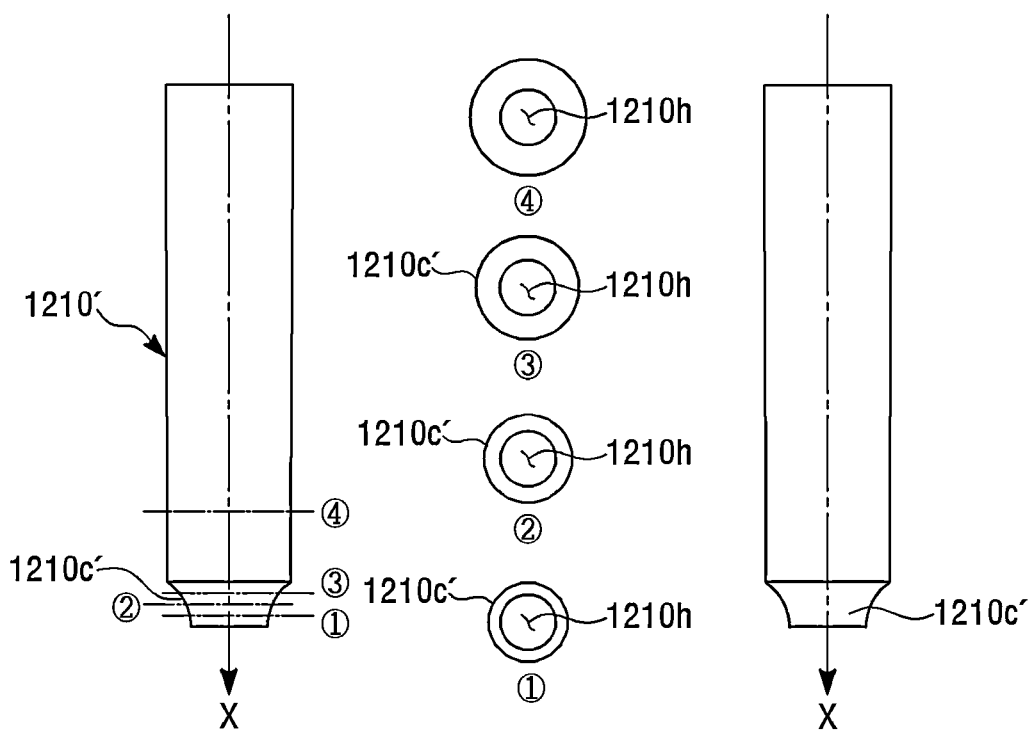
FIG. 50 is a view for explaining a modified example of the ferrite core 1210 in FIG. 49.
Figure 51:
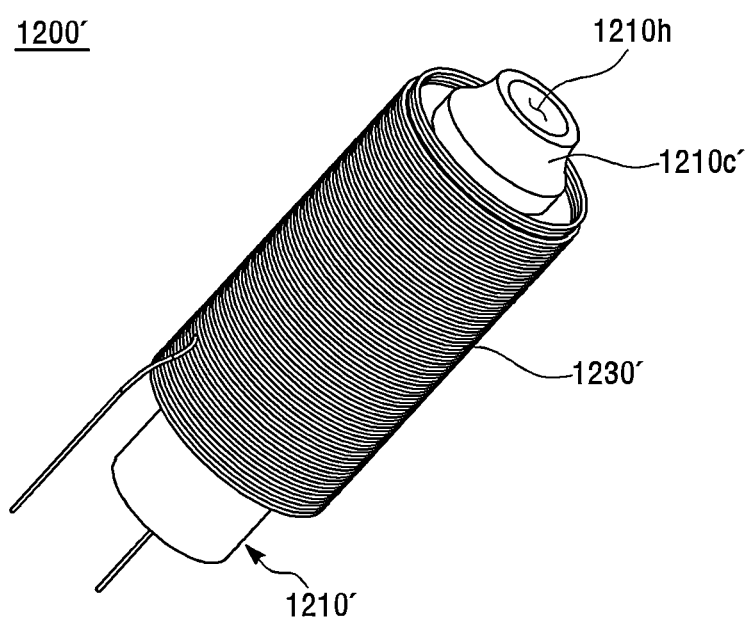
FIG. 51 is a perspective view illustrating an inductor unit 1200' in which a coil 1230' is wound around an outer surface of the ferrite core 1210' in FIG. 50.

FIG. 50 is a view for explaining a modified example of the ferrite core 1210 in FIG. 49, and FIG. 51 is a perspective view illustrating an inductor unit 1200' in which a coil 1230' is wound around an outer surface of the ferrite core 1210' in FIG. 50.

Referring to FIG. 50, the ferrite core 1210' has a cylindrical shape.

One end of the ferrite core 1210' may include a curved portion 1210*c'*. The curved portion 1210*c'* may be a curved surface extending from one end of the ferrite core 1210' to a portion adjacent to the through-hole 1210*h* of the ferrite core 1210' in a direction toward the through-hole 1210*h*.

The ferrite core 1210' has a through-hole 1210*h* along the axial direction X. The through-hole 1210*h* may have a constant diameter from one end to the other thereof.

As illustrated in ①, ②, and ③ of FIG. 50, the curved portion 1210*c'* has an outer diameter that gradually decreases in the axial direction X of the ferrite core 1210' and a constant inner diameter. Here, the inner diameter defines the through-hole 1210*h*. Alternatively, as illustrated in ①, ②, and ③ of FIG. 50, a thickness between the outer diameter and the inner diameter of the curved portion 1210*c'* gradually decreases in the axial direction X of the ferrite core 1210'.

A rate of decrease in the outer diameter or the thickness (between the outer diameter and the inner diameter) along the axial direction X of the ferrite core 1210' may be non-linear. More specifically, when dividing one end of the ferrite core 1210' into an upper portion (on which ③ is disposed), an intermediate portion (on which ② is disposed), and a lower portion (on which ① is disposed), the rate of decrease in the outer diameter or thickness from the upper portion to the intermediate portion may be relatively greater than that from the intermediate portion to the lower portion. That is, the rate of decrease from the upper portion to the intermediate portion may be relatively sharp, and the rate of decrease from the intermediate portion to the lower portion may be relatively mild.

Referring to FIG. 51, the coil 1230' may be wound around the outer surface (or outer circumference) of the ferrite core 1210'.

The inductor unit 1200' including the ferrite core 1210' and the coil 1230' may be disposed in a cylindrical housing (not shown) instead of the housing 1000 in FIG. 47. Although not shown in the drawing, the ferrite core of the inductor unit may have a shape corresponding to the inner shape of the housing.

When the ferrite core according to the embodiment of the present invention and the stylus pen including the same are used, the stylus pen may be optimized to the housing having the specific shape.

Also, the magnitude of the pen signal received by the receiver may be improved.

Also, the hover state and the contact state of the stylus pen may be clearly distinguished.

Also, the magnetic body may be synchronized with the movement of the core body.

Also, the electrical components may be electrically connected without using the inner wire.

Also, the stylus pen may be miniaturized.

Also, the inductor unit may be stably accommodated in the housing.

Also, the stylus pen may perform the drawing even in the state of being inclined at a predetermined angle.

Features, structures, and effects described in the above embodiments are incorporated into at least one embodiment of the present disclosure but are not limited to only one embodiment. Moreover, features, structures, and effects exemplified in one embodiment may easily be combined and modified for another embodiment by those skilled in the art. Therefore, these combinations and modifications should be construed as falling within the scope of the present disclosure. Moreover, features, structures, and effects exemplified in one embodiment may easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A ferrite core mounted in a stylus pen and having a through-hole formed along a longitudinal direction of the stylus pen,
    wherein the ferrite core comprises a curved portion disposed at one end of the ferrite core, and
    wherein the curved portion comprises at least two curved surfaces that are curved from one side surface of one end of the ferrite core to a portion adjacent to the through-hole of the ferrite core in a direction toward the through-hole.

2. The ferrite core of claim 1, further comprising a flat portion disposed on one portion of the outer surface of the ferrite core and formed between both ends of the ferrite core along the longitudinal direction, and
    wherein at one end of the ferrite core, the flat portion has a width that gradually decreases in a direction toward the one end of the ferrite core.

3. A stylus pen comprising:
    a housing;
    a core body having one end disposed outside the housing and the rest disposed in the housing and moved along a longitudinal direction by external force applied to the one end;
    an inductor unit comprising a ferrite core disposed in the housing and having a through-hole through which the core body passes and a coil wound around an outer surface of the ferrite core;
    a fixing bracket fixed in the housing and coupled to the other end of the ferrite core; and a moving bracket disposed in the fixing bracket, surrounding the other end of the core body, and synchronized with a movement of the core body in conjunction with the core body,
- wherein the ferrite core comprises a curved portion disposed at one end of the ferrite core, and
- wherein the curved portion comprises at least two curved surfaces that are curved from one side surface of one end of the ferrite core to a portion adjacent to the through-hole of the ferrite core in a direction toward the through-hole.

4. The stylus pen of claim 3, further comprising a magnetic body that is disposed in the moving bracket, surrounds the other end of the core body, and operates together with the moving bracket.

5. The stylus pen of claim 4, further comprising a protection member that is disposed in the moving bracket, surrounds the other end of the core body together with the magnetic body.

6. The stylus pen of claim 3, further comprising:
- a substrate bracket fixed in the housing and coupled to the other end of the fixing bracket; and
- a substrate on which a capacitor unit that forms a resonance circuit with the inductor unit and which is mounted to the substrate bracket.

7. The stylus pen of claim 6, further comprising:
- an elastic member disposed in the fixing bracket and mounted to the substrate bracket; and
- an elastic body disposed in the fixing bracket and disposed between the moving bracket and the elastic member,
- wherein the elastic body has an inner empty space, and
- wherein at least a portion of the moving bracket and at least a portion of the elastic member are in contact with each other and disposed in the empty space of the elastic body.

8. The stylus pen of claim 7, wherein the fixing bracket comprises a pair of electrode patterns disposed to face each other on an outer surface thereof,
- wherein the moving bracket comprises electrode patterns that is brought into contact with or spaced apart from the pair of electrode patterns according to a movement of the core body,
- wherein the elastic body is made of a conductive material,
- wherein one end of the elastic body is connected to the electrode patterns of the moving bracket,
- wherein the other end of the elastic body is connected to a first terminal of the substrate, and
- wherein the pair of electrode patterns of the fixing bracket are connected to second and third terminals of the substrate, respectively.

9. The stylus pen of claim 8, wherein the capacitor unit comprises at least one capacitor and an auxiliary capacitor connected in parallel to one end of the capacitor,
- wherein the first terminal is connected in series to the auxiliary capacitor, and
- wherein the second and third terminals are connected in parallel to the other end of the capacitor.

10. The stylus pen of claim 8, wherein the pair of electrode patterns on the fixing bracket are plated on grooves formed in the outer surface of the fixing bracket, and
- wherein the electrode patterns of the moving bracket are plated on grooves formed in the outer surface of the moving bracket.

11. The stylus pen of claim 6, wherein a resonance frequency of the resonance circuit is changed according to a movement of the moving bracket synchronized with a movement of the core body.

12. The stylus pen of claim 11, wherein a capacitance of the capacitor unit is configured to change more dominantly relative to an inductance of the inductor unit at a contact state of the stylus pen are distinguished.

13. The stylus pen of claim 3, further comprising a flat portion disposed on one portion of the outer surface of the ferrite core and formed between both ends of the ferrite core along the longitudinal direction,
- wherein at one end of the ferrite core, the flat portion has a width that gradually decreases in a direction toward the one end of the ferrite core.

14. A ferrite core mounted in a stylus pen and having a through-hole formed along a longitudinal direction of the stylus pen,
- wherein the ferrite core comprises a stepped portion disposed at one end of the ferrite core, and
- wherein the stepped portion includes at least three surfaces on one side of the one end of the ferrite core.

15. The ferrite core of claim 14,
- wherein the stepped portion comprises a first surface, a second surface connected to the first surface, and a third surface connected to the second surface,
- wherein the first surface is perpendicular to a direction in which the through-hole passes,
- wherein the third surface is parallel to the direction in which the through-hole passes, and
- wherein the second surface connects the first surface and the third surface.

16. The ferrite core of claim 15, wherein the second surface is a curved surface that is curved inward or outward.

17. A stylus pen comprising:
- a housing;
- a core body having one end disposed outside the housing and the rest disposed in the housing and moved along a longitudinal direction by external force applied to the one end;
- an inductor unit comprising a ferrite core disposed in the housing and having a through-hole through which the core body passes and a coil wound around an outer surface of the ferrite core;
- a fixing bracket fixed in the housing and coupled to the other end of the ferrite core; and
- a moving bracket disposed in the fixing bracket, surrounding the other end of the core body, and synchronized with a movement of the core body in conjunction with the core body,
- wherein the ferrite core comprises a stepped portion disposed at one end of the ferrite core, and
- wherein the stepped portion includes at least three surfaces on one side of the one end of the ferrite core.

18. The stylus pen of claim 17,
- wherein the stepped portion comprises a first surface, a second surface connected to the first surface, and a third surface connected to the second surface,
- wherein the first surface is perpendicular to a direction in which the through-hole passes,
- wherein the third surface is parallel to the direction in which the through-hole passes, and
- wherein the second surface connects the first surface and the third surface.

19. The stylus pen of claim 18, wherein the second surface is a curved surface that is curved inward or outward.

* * * * *